United States Patent
Ying et al.

(10) Patent No.: US 12,177,726 B2
(45) Date of Patent: Dec. 24, 2024

(54) COMMUNICATION METHOD AND APPARATUS

(71) Applicant: Huawei Technologies Co., Ltd., Shenzhen (CN)

(72) Inventors: Jiangwei Ying, Beijing (CN); Shiyong Tan, Shenzhen (CN); Yanmei Yang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 349 days.

(21) Appl. No.: 17/673,533

(22) Filed: Feb. 16, 2022

(65) Prior Publication Data

US 2022/0174553 A1   Jun. 2, 2022

Related U.S. Application Data

(63) Continuation of application No. PCT/CN2020/109306, filed on Aug. 14, 2020.

(30) Foreign Application Priority Data

Aug. 16, 2019   (CN) .......................... 201910760935.2

(51) Int. Cl.
*H04W 36/00* (2009.01)
*H04W 36/08* (2009.01)

(52) U.S. Cl.
CPC ........ *H04W 36/0011* (2013.01); *H04W 36/08* (2013.01)

(58) Field of Classification Search
CPC .......................... H04W 36/08; H04W 36/0011
See application file for complete search history.

(56) References Cited

U.S. PATENT DOCUMENTS

| | | |
|---|---|---|
| 2012/0230191 A1 | 9/2012 | Fang |
| 2018/0270778 A1 | 9/2018 | Bharatia |

(Continued)

FOREIGN PATENT DOCUMENTS

| | | |
|---|---|---|
| CN | 104125608 A | 10/2014 |
| CN | 106604329 A | 4/2017 |

(Continued)

OTHER PUBLICATIONS

Qiao Chu, "Research on End-to-End 5G Network Slicing Technology," Communication Technology, Total 3 pages (2018). With an English Abstract.

(Continued)

*Primary Examiner* — Elton Williams
(74) *Attorney, Agent, or Firm* — Leydig, Voit & Mayer, Ltd.

(57) ABSTRACT

A communication method may be applied to a scenario in which a terminal is handed over from a source access network element to a target access network element, and the method includes: obtaining session information of a first session of the terminal, where the session information includes first service type information; obtaining first information, where the first information indicates service type information of local offloading supported by the target access network element; and if the target access network element supports local offloading of a service corresponding to the first service type information, determining that the target access network element processes the first session.

20 Claims, 36 Drawing Sheets

(56) References Cited

U.S. PATENT DOCUMENTS

2018/0324645 A1\* 11/2018 Park .................. H04W 76/18
2019/0124589 A1    4/2019 Bogineni et al.

FOREIGN PATENT DOCUMENTS

| CN | 108377459 A  | 8/2018  |
|----|--------------|---------|
| CN | 109041138 A  | 12/2018 |
| CN | 109673060 A  | 4/2019  |
| CN | 109951824 A  | 6/2019  |
| EP | 2422578 B1   | 8/2016  |
| WO | 2018169382 A1| 9/2018  |

OTHER PUBLICATIONS

"Update of user plane security policy for TS 38.413," 3GPP TSG-RAN WG3 #99bis, Sanya, China, R3-182370, Total 16 pages, 3rd Generation Partnership Project, Valbonne, France (Apr. 16-20, 2018).

\* cited by examiner

COMMUNICATION METHOD AND APPARATUS

CROSS-REFERENCE TO RELATED APPLICATIONS

This application is a continuation of International Patent Application No. PCT/CN2020/109306, filed on Aug. 14, 2020, which claims priority to Chinese Patent Application No. 201910760935.2, filed on Aug. 16, 2019. The disclosures of the aforementioned applications are hereby incorporated by reference in their entireties.

TECHNICAL FIELD

This application relates to the field of mobile communication technologies, and in particular, to a communication method and an apparatus.

BACKGROUND

A private network similar to a 3rd generation partnership project (3GPP) network is proposed in the current communication field. The private network may be understood as an independent 3GPP private network that supports only access of a private network user. Such a private network may include a terminal, a private network access network element, a private network core network element, and the like.

In the foregoing private network, a session of the terminal may be routed by using the private network access network element, or may be routed by using the private network core network element. When the terminal needs to be handed over from a currently accessed source access network element to a target access network element, how to process or hand over the session of the terminal is a technical problem that needs to be resolved.

SUMMARY

Embodiments of this application provide a communication method and an apparatus, to effectively process or hand over a session of a terminal in a terminal handover process.

According to a first aspect, this application provides a communication method, applied to a scenario in which a terminal is handed over from a source access network element to a target access network element. The method includes: obtaining, by a first network element, session information of a first session of the terminal, where the session information includes first service type information; obtaining, by the first network element, first information, where the first information is used to indicate service type information of local offloading supported by the target access network element; and if the first network element determines, based on the first information and the session information, that the target access network element supports local offloading of a service corresponding to the first service type information, determining, by the first network element, that the target access network element processes the first session. In this embodiment of this application, the session information of the first session may be a whole set or a subset of context information of the first session.

According to the foregoing method, in the scenario in which the terminal is handed over from the source access network element to the target access network element, the first network element determines, only when determining that the target access network element supports the local offloading of the service corresponding to the first service type information, that the target access network element processes the first session. In this way, a session is processed by the target access network element or the session is handed over to the target access network element only when it is ensured that the session is a session that can be processed by the target access network element, so that an error in session processing or handover can be avoided, and a handover success rate of the session can be improved.

In a first scenario, the first network element is the target access network element, and the first session is a session managed and controlled by the source access network element before the terminal is handed over. That the target access network element processes the first session can achieve an objective of offloading from the core network element. This can not only reduce an end-to-end latency of a data service, but also reduce network pressure. The following designs are based on the first scenario.

In a possible design, that the target access network element obtains the session information of the first session of the terminal includes: receiving, by the target access network element, the session information from the source access network element or the core network element.

In a possible design, that the target access network element obtains the first information includes: obtaining, by the target access network element, the preconfigured first information locally; or receiving, by the target access network element, the first information from the core network element. In this way, a method for obtaining the first information may be flexibly selected for different application scenarios.

In a possible design, after the target access network element determines that the target access network element processes the first session, the target access network element may further update the session information of the first session. For example, that the target access network element updates the session information of the first session includes: allocating a new internet protocol (IP) address to the first session, and updating the session information based on the new IP address; and notifying the source access network element, the terminal, or the core network element of the new IP address. In another possible design, if the target access network element determines that an IP address of the first session remains unchanged, the target access network element may perform address resolution protocol (ARP) route update on the IP address of the first session, to reuse the IP address. According to this method, after processing the first session, the target access network element may continue to use the old IP address of the session, or may allocate a new IP to the session, may flexibly process the IP address of the session based on different application scenarios, and may notify related network elements in time after allocating the new IP address to the session, to prevent a subsequent communication error.

In a possible design, the target access network element may further send a first indication to the source access network element, where the first indication is used to indicate that the new IP address has been allocated to the first session. According to this method, the source access network element may learn that the target access network element allocates the new IP address to the session, may notify the terminal of validity time of the old IP address accordingly, and may release the old IP address in time after the old IP address becomes invalid.

In a second scenario, the first network element is the core network element, and the first session is a session managed and controlled by the source access network element before the terminal is handed over. The following designs are based on the second scenario.

In a possible design, that the core network element obtains the session information of the first session of the terminal includes: receiving, by the core network element, the session information from the source access network element.

In a possible design, after the core network element determines that the target access network element processes the first session, the method further includes: sending, by the core network element, the session information to the target access network element. That a session corresponding to a service that the target access network element supports in local offloading is handed over to the target access network element can achieve an objective of offloading from the core network element. This can not only reduce an end-to-end latency of a data service, but also reduce network pressure.

In a third scenario, the first network element is the source access network element, and the first session is a session managed and controlled by the source access network element before the terminal is handed over. The following designs are based on the third scenario.

In a possible design, after the source access network element determines that the target access network element processes the first session, the method further includes: sending, by the source access network element, the session information to the target access network element. That a session corresponding to a service that the target access network element supports in local offloading is handed over to the target access network element can achieve an objective of offloading from the core network element. This can not only reduce an end-to-end latency of a data service, but also reduce network pressure.

In a fourth scenario, the first network element is a core network element, and the first session is a session managed and controlled by the core network element before the terminal is handed over. The following designs are based on the fourth scenario.

In a possible design, after the core network element determines that the target access network element processes the first session, the method further includes: sending, by the core network element, the session information to the target access network element. That the core network element hands over a session corresponding to a service that the target access network element supports in local offloading to the target access network element can achieve an objective of offloading from the core network element. This can not only reduce an end-to-end latency of a data service, but also reduce network pressure.

Based on the foregoing design, in a possible design, the core network element may further receive a path switch request from the target access network element. Based on this design, the sending, by the core network element, the session information to the target access network element includes: sending, by the core network element, a path switch request acknowledgment message to the target access network element, where the path switch request acknowledgment message includes the session information. According to this method, the session information may be sent by using an existing message, without using a new message to send the session information, so that signaling overheads can be reduced.

Based on the foregoing design, in a possible design, the core network element may further receive a handover required message from the source access network element, where the handover required message includes an identifier of the target access network element, and the handover required message is used to request to hand over the terminal to the target access network element. Based on this design, the sending, by the core network element, the session information to the target access network element includes: sending, by the core network element, a handover request message to the target access network element, where the handover request message includes the session information. According to this method, the session information may be sent by using an existing message, without using a new message to send the session information, so that signaling overheads can be reduced.

In a possible design, the core network element may further send core network tunnel information of another session to the target access network element, where the another session is a session other than the first session, and a service corresponding to service type information corresponding to the another session is a service that the target access network element does not support in local offloading. Optionally, the core network tunnel information of the another session may be carried in a handover request message or a path switch request acknowledgment message sent by the core network element to the target access network element, certainly may be carried in another existing message, or may be carried in a new message.

The following designs are based on the second scenario to the fourth scenario.

In a possible design, the obtaining, by the first network element, first information includes: obtaining, by the first network element, the preconfigured first information locally; or receiving, by the first network element, the first information from the target access network element. According to this method, different methods may be flexibly selected for different application scenarios to obtain the first information.

In a possible design, the first network element receives the new IP address of the first session from the target access network element. The first network element sends the new IP address of the first session to the terminal.

In a possible design, the first network element receives the first indication from the target access network element, where the first indication is used to indicate that the new IP address has been allocated to the first session. The first network element sends validity time of an old IP address of the first session to the terminal according to the first indication. According to this method, the new IP addresses can be synchronized between network elements in time.

The following designs are based on the first scenario to the fourth scenario.

In a possible design, the first information and the first service type information each may include at least one piece of the following service type identification information: network slice selection assistance information (NSSAI), a data network name (DNN), or an application ID (App-ID).

In a possible design, the first information further includes a local support indication, and the local support indication is used to indicate that the target access network element supports local offloading of a service corresponding to the service type identification information. By using this method, it may be explicitly indicated that the target access network element supports the local offloading of the service corresponding to the service type identification information.

In a possible design, that the first network element determines, based on the first information and the session information, that the target access network element supports local offloading of a service corresponding to the first service type information includes: if the first service type information matches the service type information that is of the local offloading supported by the target access network element and that is indicated by the first information, determining, by the first network element, that the target access network element supports the local offloading of the service corresponding to the first service type information, and determining, by the first network element, that the target access network element processes the first session.

In a possible design, the first information and the first service type information each include the NSSAI and the DNN. Based on this design, the determining, by the first network element, that the target access network element processes the first session includes: if the NSSAI and the DNN that are included in the first service type information respectively match the NSSAI and the DNN that are included in the first information, determining, by the first network element, that the target access network element supports the local offloading of the service corresponding to the first service type information, and determining, by the first network element, that the target access network element processes the first session.

In a possible design, the first information and the first service type information each include the NSSAI, the DNN, and the APP ID. Based on this design, the determining, by the first network element, that the target access network element processes the first session includes: if the NSSAI, the DNN, and the APP ID that are included in the first service type information respectively match the NSSAI, the DNN, and the APP ID that are included in the first information, determining, by the first network element, that the target access network element supports the local offloading of the service corresponding to the first service type information, and determining, by the first network element, that the target access network element processes the first session.

According to a second aspect, this application provides a communication method, applied to a scenario in which a terminal is handed over from a source access network element to a target access network element. The method includes: receiving, by the target access network element, session information of a first session of the terminal from a first network element, where the session information includes first service type information, and the target access network element supports local offloading of a service corresponding to the first service type information; and updating, by the target access network element, the session information. In this embodiment of this application, the session information of the first session may be a whole set or a subset of context information of the first session.

According to the foregoing method, in the scenario in which the terminal is handed over from the source access network element to the target access network element, session information corresponding to a service of local offloading supported by the target access network element may be sent to the target access network element, so that the target access network element processes a session. It may be understood as that the session is handed over to the target access network element. That the target access network element processes the first session can achieve an objective of offloading from a core network element. This can not only reduce an end-to-end latency of a data service, but also reduce network pressure.

In a first scenario, the first network element is the core network element, and the first session is a session managed and controlled by the source access network element before the terminal is handed over.

In a second scenario, the first network element is the source access network element, and the first session is a session managed and controlled by the source access network element before the terminal is handed over.

In a third scenario, the first network element is the core network element, and the first session is a session managed and controlled by the core network element before the terminal is handed over.

The following designs are based on the first scenario to the third scenario.

In a possible design, the updating, by the target access network element, the session information includes: allocating, by the target access network element, a new IP address to the first session, updating the session information based on the new IP address, and sending the new IP address to the first network element or the terminal.

In a possible design, the target access network element sends a first indication to the first network element, where the first indication is used to indicate that the new IP address has been allocated to the first session, so that the first network element sends validity time of an old IP address of the first session to the terminal according to the first indication.

In a possible design, when determining that the IP address of the first session remains unchanged, the target access network element may further perform ARP route update on the IP address of the first session, to reuse the IP address.

The following designs are based on the third scenario.

In a possible design, the target access network element may send a path switch request to the core network element. Based on this design, the receiving, by the target access network element, session information of a first session from a first network element includes: receiving, by the target access network element, a path switch request acknowledgment message from the core network element, where the path switch request acknowledgment message includes the session information.

In a possible design, that the target access network element receives the session information of the first session from the core network element includes: receiving, by the target access network element, a handover request message from the core network element, where the handover request message includes the session information.

In a possible design, the target access network element may further receive core network tunnel information of another session from the core network element, and a service corresponding to service type information corresponding to the another session is a service that the target access network element does not support in local offloading. Optionally, the core network tunnel information of the another session may be carried in a handover request message or a path switch request acknowledgment message sent by the core network element to the target access network element, certainly may be carried in another existing message, or may be carried in a new message.

According to a third aspect, this application provides a communication method, applied to a scenario in which a terminal is handed over from a source access network element to a target access network element. The method includes: obtaining, by a first network element, session information of a first session of the terminal, where the session information includes first service type information; obtaining, by the first network element, first information, where the first information is used to indicate service type information of local offloading supported by the target access network element; and if the first network element determines, based on the first information and the session information, that the target access network element does not support local offloading of a service corresponding to the first service type information, determining, by the first network element, that a core network element processes the session. In this embodiment of this application, the session information of the first session may be a whole set or a subset of context information of the first session.

According to the foregoing method, in the scenario in which the terminal is handed over from the source access network element to the target access network element, when determining that the target access network element does not support the local offloading of the service corresponding to the first service type information, the first network element determines that the core network element processes the first session or the first session is handed over to the core network element. In this way, a problem that a handover error occurs when the session is handed over to the target access network element that cannot process the session can be avoided, and a handover success rate can be improved.

In a first scenario, the first network element is the target access network element, and the first session is a session managed and controlled by the source access network element before the terminal is handed over. The following designs are based on the first scenario.

In a possible design, that the target access network element obtains the session information of the first session of the terminal includes: receiving, by the target access network element, the session information from the source access network element.

In a possible design, after the target access network element determines that the core network element processes the first session, the method further includes: sending, by the target access network element, the session information and access network tunnel information of the first session to the core network element. In this way, the first session is handed over to the core network element in time.

In a possible design, the target access network element receives core network tunnel information of the first session from the core network element, to complete handover of the first session.

In a possible design, that the target access network element obtains the first information includes: obtaining, by the target access network element, the preconfigured first information locally; or receiving, by the target access network element, the first information from the core network element.

In a second scenario, the first network element is the core network element, and the first session is a session managed and controlled by the source access network element before the terminal is handed over. The following designs are based on the second scenario.

In a possible design, that the core network element obtains the session information of the first session of the terminal includes: receiving, by the core network element, the session information from the source access network element.

In a possible design, the core network element updates the session information after receiving the session information. For example, that the core network element updates the session information includes: allocating, by the core network element, a new IP address to the first session, updating the session information based on the new IP address, and sending the new IP address to the source access network element or the terminal.

In a possible design, the core network element may further send a first indication to the source access network element, where the first indication is used to indicate that the new IP address has been allocated to the first session. In this way, the source access network element sends validity time of an old IP address of the first session to the terminal according to the first indication.

In a possible design, when determining that the IP address of the first session remains unchanged, the core network element may further perform ARP route update on the IP address of the first session, to reuse the IP address.

In a possible design, after determining that the core network element processes the first session, the core network element may further send the core network tunnel information of the first session to the target access network element. In this way, the target access network element can set up a data transmission channel between the terminal, the access network element, and the core network element for the first session based on the core network tunnel information of the first session.

In a possible design, the core network element may further receive access network tunnel information of the first session from the target access network element. In this way, the core network element sets up, for the first session based on the access network tunnel information of the first session, a data transmission channel between the target access network element and the core network element, to complete handover of the first session.

In a third scenario, the first network element is the source access network element, and the first session is a session managed and controlled by the source access network element before the terminal is handed over. The following design is based on the third scenario.

In a possible design, after determining that the core network element processes the first session, the source access network element may further send the session information to the core network element.

The following design is based on the second scenario and the third scenario.

In a possible design, the obtaining, by the first network element, first information includes: obtaining, by the first network element, the preconfigured first information locally; or receiving, by the first network element, the first information from the target access network element.

The following designs are based on the first scenario and the third scenario.

In a possible design, the first network element receives the new IP address of the first session from the core network element. The first network element sends the new IP address of the first session to the terminal.

In a possible design, the first network element receives the first indication from the core network element, where the first indication is used to indicate that the new IP address has been allocated to the first session. The first network element, validity time of an old IP address of the first session to the terminal according to the first indication.

The following designs are based on the first scenario to the third scenario.

In a possible design, the first information and the first service type information each may include at least one piece of the following service type identification information: NSSAI, a DNN, or an App ID.

In a possible design, the first information further includes a local support indication, and the local support indication is used to indicate that the target access network element supports local offloading of a service corresponding to the service type identification information.

In a possible design, that the first network element determines, based on the first information and the session information, that the target access network element does not support local offloading of a service corresponding to the first service type information includes: if the first service type information does not match the service type information that is of the local offloading supported by the target access network element and that is indicated by the first information, determining, by the first network element, that the target access network element does not support the local offloading of the service corresponding to the first service type information, and determining, by the first network element, that the core network element processes the first session.

In a possible design, the first information and the first service type information each include the NSSAI and the DNN. Based on this design, the determining, by the first network element, that the core network element processes the first session includes: if the NSSAI and the DNN that are included in the first service type information do not match the NSSAI and the DNN that are included in the first information, determining, by the first network element, that the target access network element does not support the local offloading of the service corresponding to the first service type information, and determining, by the first network element, that the core network element processes the first session.

In a possible design, the first information and the first service type information each include the NSSAI, the DNN, and the APP ID. Based on this design, the determining, by the first network element, that the core network element processes the first session includes: if the NSSAI, the DNN, and the APP ID that are included in the first service type information do not match the NSSAI, the DNN, and the APP ID that are included in the first information, determining, by the first network element, that the target access network element does not support the local offloading of the service corresponding to the first service type information, and determining, by the first network element, that the core network element processes the first session.

According to a fourth aspect, this application provides a communication method, applied to a scenario in which a terminal is handed over from a source access network element to a target access network element. The method includes: receiving, by a core network element, session information of a first session of the terminal and access network tunnel information of the first session from the target access network element, where the session information includes first service type information, the first session is a session managed and controlled by the source access network element before the terminal is handed over, and the target access network element does not support local offloading of a service corresponding to the first service type information; and sending, by the core network element, core network tunnel information of the first session to the target access network element.

According to the foregoing method, in the scenario in which the terminal is handed over from the source access network element to the target access network element, a session corresponding to a service that the target access network element does not support in local offloading may be handed over to the core network element. In this way, a processing error when a session is handed over to a network element that cannot process the session can be avoided, and a handover success rate of the session can be improved.

According to a fifth aspect, this application provides a communication method, applied to a scenario in which a terminal is handed over from a source access network element to a target access network element, and the method includes: receiving, by the target access network element, core network tunnel information of a first session of the terminal from a core network element, where the first session is a session managed and controlled by the source access network element before the terminal is handed over, session information of the first session includes first service type information, and the target access network element does not support local offloading of a service corresponding to the first service type information; and sending, by the target access network element, access network tunnel information of the first session to the core network element.

According to the foregoing method, in the scenario in which the terminal is handed over from the source access network element to the target access network element, a session corresponding to a service that the target access network element does not support in local offloading may be handed over to the core network element. In this way, a processing error when a session is handed over to a network element that cannot process the session can be avoided, and a handover success rate of the session can be improved.

According to a sixth aspect, this application provides a communication method, applied to a scenario in which a terminal is handed over from a source access network element to a target access network element. The method includes: receiving, by a core network element, session information of a first session of the terminal from the source access network element, where the session information includes first service type information, the first session is a session managed and controlled by the source access network element before the terminal is handed over, and the target access network element does not support local offloading of a service corresponding to the first service type information; and updating, by the core network element, the session information.

According to the foregoing method, in the scenario in which the terminal is handed over from the source access network element to the target access network element, a session corresponding to a service that the target access network element does not support in local offloading may be handed over to the core network element. In this way, a processing error when a session is handed over to a network element that cannot process the session can be avoided, and a handover success rate of the session can be improved.

In a possible design, updating, by the core network element, the session information includes: allocating, by the core network element, a new IP address to the first session, updating the session information based on the new IP address, and sending the new IP address to the source access network element or the terminal.

In a possible design, the core network element may further send a first indication to the source access network element, where the first indication is used to indicate that the new IP address has been allocated to the first session. In this way, the source access network element sends validity time of an old IP address of the first session to the terminal according to the first indication.

In a possible design, when determining that the IP address of the first session remains unchanged, the core network element may further perform ARP route update on the IP address of the first session, to reuse the IP address.

According to a seventh aspect, this application provides an apparatus. The apparatus may be a target access network element, or may be a chip. The apparatus has a function of implementing the embodiments of the first aspect, the second aspect, the third aspect, or the fifth aspect. The function may be implemented by using hardware, or may be implemented by hardware executing corresponding software. The hardware or the software includes one or more modules corresponding to the function.

According to an eighth aspect, this application provides an apparatus, including at least one processor and a memory. The memory is configured to store instructions. When the apparatus runs, the at least one processor executes the instructions stored in the memory, so that the apparatus performs the first aspect or any implementation of the first aspect, the second aspect or any implementation of the second aspect, the third aspect or any implementation of the third aspect, or the fifth aspect or any implementation of the fifth aspect. It should be noted that the memory may be integrated into the at least one processor, or may be independent of the at least one processor.

According to a ninth aspect, this application provides an apparatus. The apparatus includes at least one processor. The at least one processor is configured to be coupled to a memory, read instructions in the memory, and perform the first aspect or any implementation of the first aspect, the second aspect or any implementation of the second aspect, the third aspect or any implementation of the third aspect, or the fifth aspect or any implementation of the fifth aspect according to the instructions.

According to a tenth aspect, this application provides an apparatus. The apparatus may be a source access network element, or may be a chip. The apparatus has a function of implementing the embodiments of the first aspect or the third aspect. The function may be implemented by using hardware, or may be implemented by hardware executing corresponding software. The hardware or the software includes one or more modules corresponding to the function.

According to an eleventh aspect, this application provides an apparatus, including at least one processor and a memory. The memory is configured to store instructions. When the apparatus runs, the at least one processor executes the instructions stored in the memory, so that the apparatus performs the first aspect or any implementation of the first aspect or the third aspect or any implementation of the third aspect. It should be noted that the memory may be integrated into the at least one processor, or may be independent of the at least one processor.

According to a twelfth aspect, this application provides an apparatus. The apparatus includes at least one processor. The at least one processor is configured to be coupled to a memory, read instructions in the memory, and perform the first aspect or any implementation of the first aspect or the third aspect or any implementation of the third aspect according to the instructions.

According to a thirteenth aspect, this application provides an apparatus. The apparatus may be a core network element, or may be a chip. The apparatus has a function of implementing the embodiments of the first aspect, the third aspect, the fourth aspect, or the sixth aspect. The function may be implemented by using hardware, or may be implemented by hardware executing corresponding software. The hardware or the software includes one or more modules corresponding to the function.

According to a fourteenth aspect, this application provides an apparatus, including at least one processor and a memory. The memory is configured to store instructions. When the apparatus runs, the at least one processor executes the instructions stored in the memory, so that the apparatus performs the first aspect or any implementation of the first aspect, the third aspect or any implementation of the third aspect, the fourth aspect or any implementation of the fourth aspect, or the sixth aspect or any implementation of the sixth aspect. It should be noted that the memory may be integrated into the at least one processor, or may be independent of the at least one processor.

According to a fifteenth aspect, this application provides an apparatus. The apparatus includes at least one processor. The at least one processor is configured to be coupled to a memory, read instructions in the memory, and perform the first aspect or any implementation of the first aspect, the third aspect or any implementation of the third aspect, the fourth aspect or any implementation of the fourth aspect, or the sixth aspect or any implementation of the sixth aspect according to the instructions.

According to a sixteenth aspect, this application further provides a computer storage medium. The computer storage medium stores a program or instructions. When the program or the instructions are run on a computer, any communication method in the foregoing aspects is enabled to be performed.

According to a seventeenth aspect, this application further provides a computer program product including instructions. When the computer program product runs on a computer, the computer is enabled to perform any communication method in the foregoing aspects.

According to an eighteenth aspect, this application further provides a communication system. The communication system includes a first network element. The first network element is configured to implement the first aspect or any implementation of the first aspect and/or the second aspect or any implementation of the second aspect.

In a possible implementation, when the first network element is a source access network element, the communication system may further include a target access network element and/or a core network element.

In a possible implementation, when the first network element is a target access network element, the communication system may further include a source access network element and/or a core network element.

In a possible implementation, when the first network element is a core network element, the communication system may further include a source access network element and/or a target access network element.

According to a nineteenth aspect, this application further provides a communication system. The communication system includes a first network element. The first network element is configured to implement at least one of the third aspect or any implementation of the third aspect, the fourth aspect or any implementation of the fourth aspect, the fifth aspect or any implementation of the fifth aspect, or the sixth aspect or any implementation of the sixth aspect.

In a possible implementation, when the first network element is a source access network element, the communication system may further include a target access network element and/or a core network element.

In a possible implementation, when the first network element is a target access network element, the communication system may further include a source access network element and/or a core network element.

In a possible implementation, when the first network element is a core network element, the communication system may further include a source access network element and/or a target access network element.

These aspects or other aspects of this application are clearer and more comprehensible in the following descriptions of the embodiments.

DESCRIPTION OF EMBODIMENTS

Figure 1A:
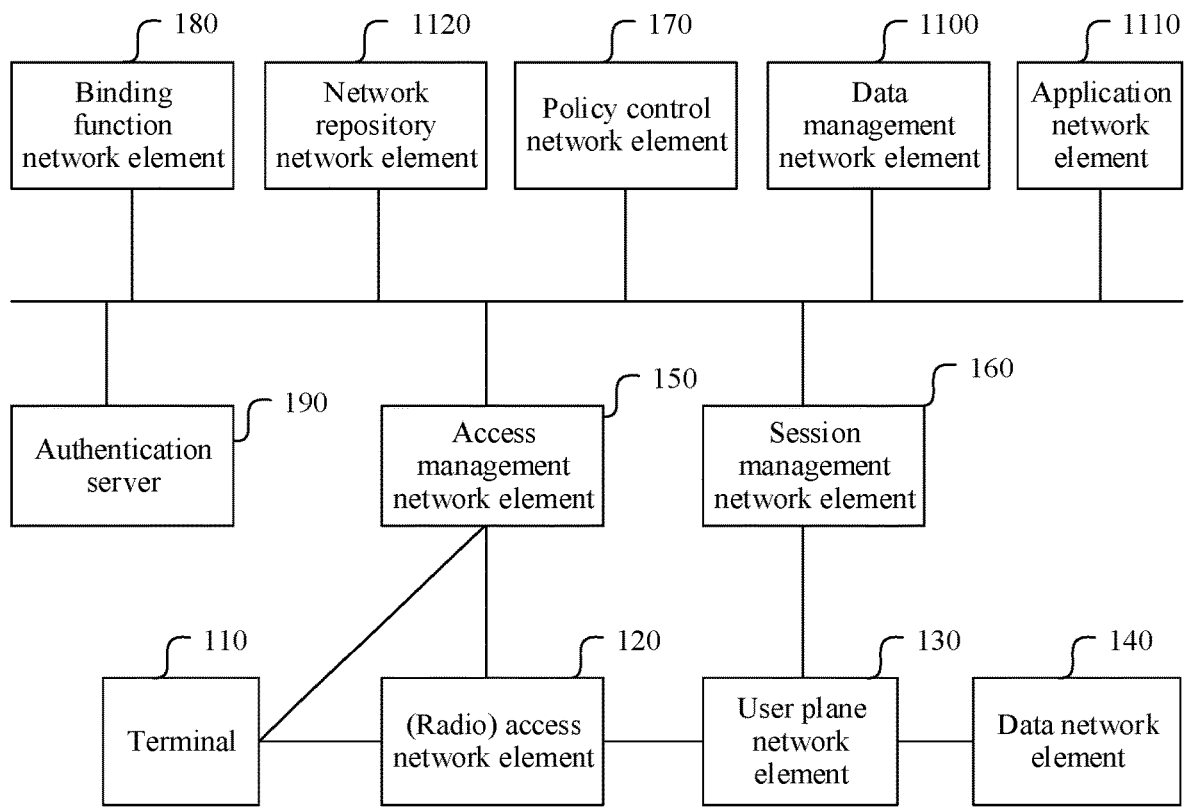
FIG. 1a is a schematic diagram of a possible network architecture to which an embodiment of this application is applicable.

To make objectives, technical solutions, and advantages of this application clearer, the following further describes this application in detail with reference to the accompanying drawings. A specific operation in a method embodiment may also be applied to an apparatus embodiment or a system embodiment. In the descriptions of this application, unless otherwise specified, "a plurality of" means two or more, and another quantifier is similar to this. "And/or" describes the association relationship between the associated objects and represents that three relationships may exist. For example, A and/or B may represent the following three cases: Only A exists, both A and B exist, and only B exists. In addition, an element that appears in singular forms "a", "an", and "the" does not mean "one or only one" unless otherwise specified in the context, but means "one or more". For example, "a device" means one or more such devices. Further, "at least one of . . ." means one or any combination of subsequent associated objects. For example, "at least one of A, B, or C" includes A, B, C, AB, AC, BC, or ABC. In addition, it should be understood that, in the descriptions of the embodiments of this application, terms such as "first" and "second" are merely intended for differentiated description, and should not be construed as an indication or an implication of relative importance, or an indication or an implication of a sequence.

A network architecture and a service scenario that are described in the embodiments of this application are intended to describe the technical solutions in the embodiments of this application more clearly, and constitute no limitation to the technical solutions provided in the embodiments of this application. A person of ordinary skill in the art may know that with evolution of the network architecture and emergence of new service scenarios, the technical solutions provided in the embodiments of this application are also applicable to similar technical problems.

Currently, a concept of a private network is proposed in the communication field. The private network is a concept proposed to be distinguished from a public network. The private network can be considered as a privately owned network, for example, an internal network built by a company, a school, or a factory. A terminal that does not subscribe to the private network is not allowed to access the private network. The public network is usually a network operated by an operator and satisfying a requirement of the third generation partnership project (3GPP) standard, and is referred to as a 3GPP network for short. Usually, the 3GPP network includes but is not limited to a 5th generation mobile communication technology (5G) network, a 4th generation mobile communication technology (4G) network, a 3rd generation mobile communication technology (3G) network, a 2nd generation wireless telephone technology (2G) network, or the like. It should be noted that the private network may also be constructed based on the requirement of the 3GPP standard. It may be understood that the private network may also be a 3GPP network. A method provided in the embodiments of this application is applicable to both the private network and the public network. In this application, descriptions are provided mainly by using an example in which the method is applied to the private network.

FIG. 1a is a schematic diagram of a network architecture to which an embodiment of this application is applicable. The following separately describes each part in the network architecture shown in FIG. 1a.

1. A terminal 110 may include various handheld devices that have a wireless communication function, vehicle-mounted devices, wearable devices, computing devices or other processing devices connected to a wireless modem, and terminals in various forms, for example, a mobile station (MS), a terminal, user equipment (UE), and a soft client. For example, the terminal 110 may be a water meter, an electricity meter, or a sensor.

2. A (radio) access network ((R)AN) network element 120 is configured to provide a network access function for authorized terminals in a specific area, and can use transmission tunnels with different quality based on levels of the terminals, service requirements, and the like. The (R)AN network element can manage a radio resource and provide an access service for the terminal, to forward a control signal and terminal data between the terminal and a core network. The (R)AN network element may also be understood as a base station in a conventional network.

3. A user plane network element 130 is used for packet routing and forwarding, quality of service (QoS) processing on user plane data, and the like. In a 5G communication system, the user plane network element may be a user plane function (UPF) network element. In a future communication system, the user plane network element may still be the UPF network element, or may have another name. This is not limited in this application.

4. A data network element 140 is configured to provide a network for data transmission. In the 5G communication system, the data network element may be a data network (DN) element. In the future communication system, the data network element may still be the DN network element, or may have another name. This is not limited in this application.

5. An access management network element 150 is mainly used for mobility management, access management, and the like, and may be configured to implement functions, for example, lawful interception and access authorization/authentication, other than session management in functions of a mobility management entity (MME). In the 5G communication system, the access management network element may be an access and mobility management function (AMF) network element. In the future communication system, the access management network element may still be the AMF network element, or may have another name. This is not limited in this application.

6. A session management network element 160 is mainly configured to manage a session, assign and manage an internet protocol (IP) address of the terminal, select a termination point that can manage a user plane function interface and a policy control and charging function interface, notify downlink data, and the like. In the 5G communication system, the session management network element may be a session management function (SMF) network element. In the future communication system, the session management network element may still be the SMF network element, or may have another name. This is not limited in this application.

7. A policy control network element 170 is configured to guide a unified policy framework of network behavior, and provide policy rule information for a control plane function network element (for example, the AMF or SMF network element), and the like. In a 4G communication system, the policy control network element may be a policy and charging rules function (PCRF) network element. In the 5G communication system, the policy control network element may be a policy control function (PCF) network element. In the future communication system, the policy control network element may still be the PCF network element, or may have another name. This is not limited in this application.

8. A binding support network element 180 is configured to search for a PCF associated with a session. In the 5G communication system, the binding support network element may be a binding support function (BSF) network element. In the future communication system, the binding support network element may still be the BSF network element, or may have another name. This is not limited in this application.

9. An authentication server 190 is configured to authenticate a service, generate a key to implement bidirectional authentication for the terminal, and support a unified authentication framework. In the 5G communication system, the authentication server may be an authentication server function (AUSF) network element. In the future communication system, the authentication server function network element may still be the AUSF network element, or may have another name. This is not limited in this application.

10. A data management network element 1100 is configured to process a terminal identifier, perform access authentication, registration, and mobility management, and the like. In the 5G communication system, the data management network element may be a unified data management (UDM) network element. In the future communication system, the unified data management network element may still be the UDM network element, or may have another name. This is not limited in this application.

11. An application network element 1110 is configured to perform application-affected data routing, access a network exposure function network element, interact with a policy framework to perform policy control, and the like. In the 5G communication system, the application network element may be an application function (AF) network element. In the future communication system, the application network element may still be the AF network element, or may have another name. This is not limited in this application.

12. A network repository network element 1120 is configured to maintain real-time information of all network function services in a network. In the 5G communication system, the network repository network element may be a network repository function (NRF) network element. In the future communication system, the network repository network element may still be the NRF network element, or may have another name. This is not limited in this application.

It may be understood that the foregoing network element or function may be a network element in a hardware device, a software function running on dedicated hardware, or a virtualized function instantiated on a platform (for example, a cloud platform).

When the method in the embodiments of this application is applied to the network architecture shown in FIG. 1*a*, a source access network element and a target access network element in this application may be the (radio) access network element 120 in FIG. 1*a*, a core network element may be a core network element such as the user plane network element 130, the session management network element 160, or the policy control network element 170 in FIG. 1*a*.

Figure 1B:
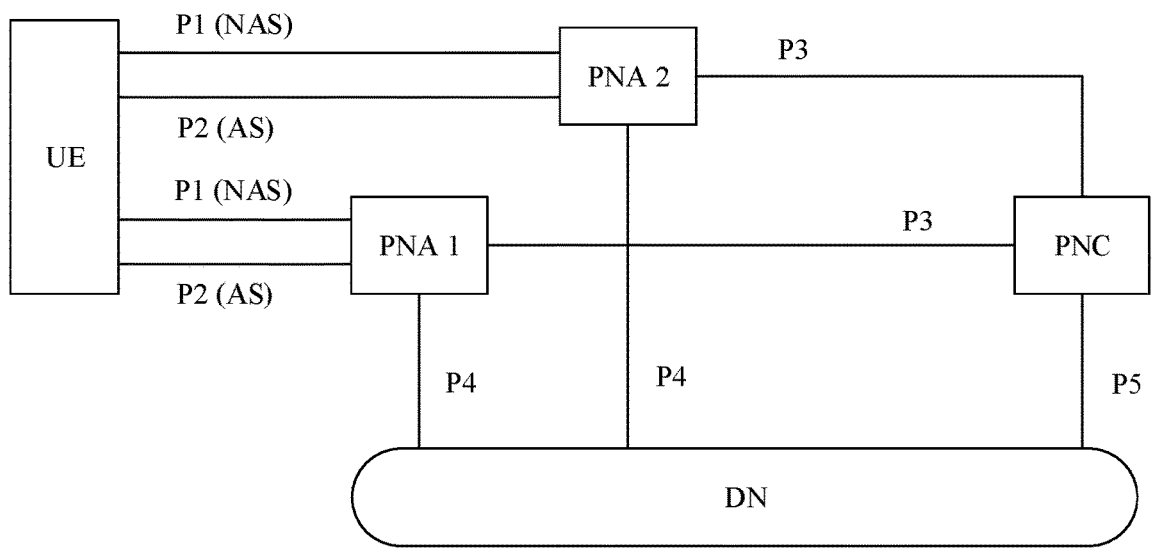
FIG. 1b is a schematic diagram of another possible network architecture to which an embodiment of this application is applicable.

In application scenarios of future communication technologies, a vertical industry is a quite important field, for example, an internet of things (IoT), machine to machine (M2M), and Industry 4.0. A large quantity of private enterprises exist in these fields. These private enterprises propose to use a faster and more reliable 3GPP technology to cover enterprise campuses, and the private enterprises expect to directly manage and control mobile devices in enterprise campuses of the private enterprises without relying on mobile communication networks. A possible solution is to independently deploy private networks for the private enterprises based on the 3GPP technology to implement network coverage of the enterprise campuses. If a private network is deployed based on the architecture shown in FIG. 1*a*, the network architecture with a plurality of network elements and a plurality of interfaces is excessively thick for the private network, and a requirement on a network management operation and maintenance also exceeds an actual capability of a private network user. Therefore, an extremely simplified private network architecture based on the 3GPP technology emerges as the times require. FIG. 1b is a schematic diagram of a possible private network architecture used in this application. The private network architecture includes UE, a private network access network element (PNA) 1, a PNA 2, a private network core network element (PNC), and a data network (DN). Quantities of network elements in FIG. 1b are merely used as an example, and the quantities of network elements are not limited.

The UE in the private network architecture shown in FIG. 1b is mainly private network UE, namely, UE that subscribes to a private network and can access the private network. For specific examples of the private network UE, refer to the related descriptions about the terminal 110 in FIG. 1a. Details are not described herein again.

It should be noted that functions of the PNA and the PNC in the extremely simplified private network architecture shown in FIG. 1b are not limited in this application. For example, the PNA and the PNC each may include some or all functions of the network elements shown in FIG. 1a, or may include a function that the network elements shown in FIG. 1a do not have.

For example, the PNA in the embodiments of this application may include all functions required for all users other than a network management center to access a control plane and data routing. For example, the PNA may include a function of a RAN, a non-access stratum (NAS) termination function, a mobility management function, a P4 session management function, some subscription management functions, and the like. Certainly, the PNA may further include other functions. This is not limited in this application. It may be understood that a private network may include a plurality of PNAs, and private network UE may be handed over between the plurality of PNAs. For example, when the private network UE roams from a coverage area of the PNA 1 to a coverage area of the PNA 2, the private network UE may be handed over from the PNA 1 to the PNA 2.

For example, the PNC in the embodiments of this application is a core network element having a network management function. In addition to the network management function, the PNC can implement functions such as mobility management, subscription management, and P5 session management to resolve a service continuity problem in some scenarios in which a medium-sized or large-sized private network supports mobility management in a large area. It should be noted that, in this application, the PNC may manage and control a plurality of PNAs in a same private network. For example, in FIG. 1b, the PNC may manage and control the PNA 1 and the PNA 2.

In FIG. 1b, P1 is a 3GPP-based NAS interface, and implements signaling exchange between the UE and a network side non-access stratum; P2 is a 3GPP-based Uu interface, and implements signaling and data exchange between the UE and a network side access stratum; P3 is an interface between the PNA and the PNC, and has a network management function, a control plane function, and a data plane function; P4 is an interface from the PNA to the DN, and is used to route a data packet transmitted from the PNA; P5 is an interface from the PNC to the DN, and is used to route a data packet transmitted from the PNC.

The private network architecture shown in FIG. 1b is used as an example. When service data transmission is performed between the UE and the DN, a PNA (for example, the PNA 1 or the PNA 2) that the UE currently accesses and the PNC may offload service data. For example, some services (for example, an ultra-reliable and low-latency communications (URLLC) service) that have a relatively high latency requirement in the private network may be locally offloaded or locally routed by the PNA, where a service that may be locally offloaded by the PNA may also be referred to as a local service supported by the PNA. Specifically, for a service of the UE, if the PNA supports the service, data of the service may be locally offloaded by the PNA; or if the PNA does not support the service, data of the service needs to be routed by the PNC. It may be understood that when the service data between the UE and the DN is carried by a session, if the service data is routed by the PNA, it may be understood as that the session carrying the service data is routed by the PNA or managed by the PNA; or if the service data is routed by the PNC, it may be understood that the session carrying the service data is routed by the PNC or managed by the PNC. When the UE is handed over between different PNAs, because local services supported by the different PNAs are incompletely the same, in a process of handing over the UE from a source PNA to a target PNA, there may be a type of service that is a local service in the source PNA but a non-local service in the target PNA, another type of service that is a local service in the source PNA and also a local service in the target PNA, and still another type of service that is a non-local service in the source PNA but a local service in the target PNA. Currently, there is no related solution to how to adjust session anchors of these services in a UE handover process, that is, how to process a session of the UE.

In view of the foregoing problem, the embodiments of this application provide a communication method, to effectively hand over or process the session of the UE in a scenario in which UE is handed over from the source access network element to the target access network element.

Figure 2:
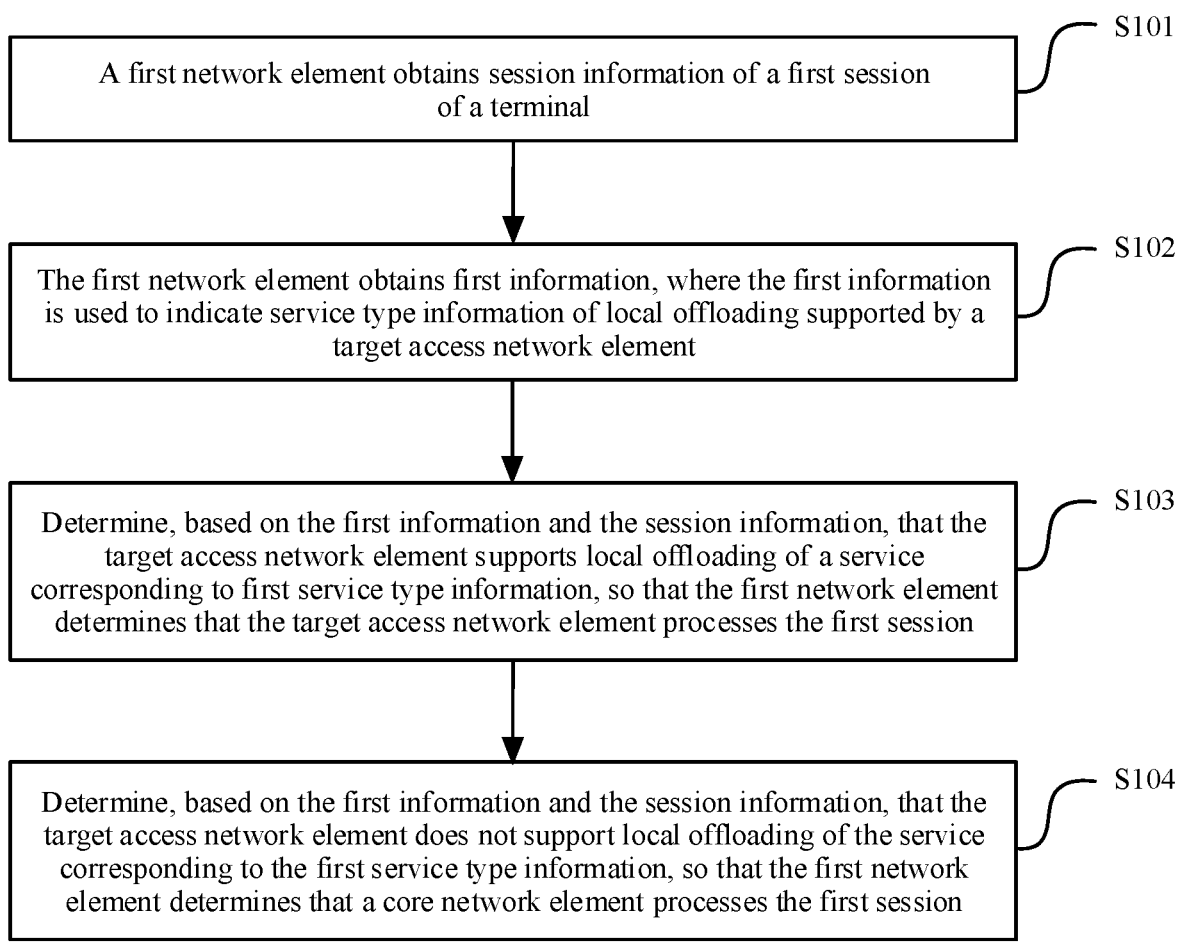
FIG. 2 is a schematic diagram of a communication method according to an embodiment of this application.

FIG. 2 is a flowchart of a communication method according to an embodiment of this application. The method may be applied to a scenario in which a terminal is handed over from a source access network element to a target access network element. The method includes the following steps.

S101: A first network element obtains session information of a first session of the terminal, where the session information includes first service type information. In this application, a session may be a protocol data unit (PDU) session. The first service type information is used to indicate a first service type, and a service belonging to the first service type corresponds to the first session. A plurality of services may belong to a same service type, and one or more services belonging to the first service type all correspond to the first session. That the service corresponds to the first session may be understood as that service data corresponding to the service is carried by the first session for transmission.

In this application, the session information of the first session may be a whole set or a subset of context information of the first session. Correspondingly, when the session information is the whole set of the context information of the first session, the whole set of the context information includes the first service type information. Alternatively, when the session information is the subset of the context information of the first session, the subset of context information includes the first service type information. The context information of the first session includes information generated when the first session is set up and/or information used for setting up the first session. The context information of the first session may include one or more of a terminal identifier (UE ID), a first session identifier (session ID), network slice selection assistance information (NSSAI), a data network name (DNN), an application identifier (App-ID), a quality of service (QoS) parameter (QoS parameter) and an IP address. The QoS parameter may further include, for example, a 5G QoS identifier (5QI), an address resolution protocol (ARP), a guaranteed flow bit rate (GFBR), a maximum flow bit rate (MFBR), and a priority level. The first service type information may be at least one of the NSSAI, the DNN, or the App-ID included in the context information of the first session.

S102: The first network element obtains first information, where the first information is used to indicate service type information of local offloading supported by the target access network element, or the first information is used to indicate service type information corresponding to a service type to which a service that the target access network element supports in local offloading belongs. The service that the target access network element supports in local offloading may also be described as a local service supported by the target access network element. In this application, the local service supported by the target access network element may be locally routed by the target access network element, data of the service may be locally routed by the target access network element, or a session that carries the service or the data of the service may be locally routed by the target access network element.

In this embodiment of this application, the first information may explicitly or implicitly indicate the service type information of the local offloading supported by the target access network element. For example, when the first information implicitly indicates the service type information of the local offloading supported by the target access network element, the first information may include at least one piece of the following service type identification information: the NSSAI, the DNN, or the App-ID. An implicit indication manner is used, and the first network element may learn, after obtaining the first information, that a service identified by the service type identification information included in the first information is a service of the local offloading supported by the target access network element. For example, when the first information explicitly indicates the service type information of the local offloading supported by the target access network element, the first information may further include a local support indication in addition to the service type identification information, and the local support indication is used to indicate that the target access network element supports the local offloading of the service identified by the service type identification information.

In a possible implementation, the first network element may further prestore all service type information of the terminal, and the first information may be further used to indicate type information of a service that the target access network element does not support in local offloading. For example, if the first information may be used to indicate that type information of services that the target access network element does not support in local offloading includes service type information 4, service type information 5, and service type information 6, and the first network element prestores all the service type information of the terminal, including service type information 1 to the service type information 6, the first network element may learn, based on the first information and all the stored service type information after obtaining the first information, that type information of services that the target access network element supports in local offloading includes the service type information 1 to the service type information 3.

In all of the following descriptions of this embodiment of this application, an example in which the first information is used to indicate the service type information of the local offloading supported by the target access network element is used for description. The first information may be in a form of a table. Table 1, Table 2, and Table 3 are schematic diagrams of three pieces of possible first information according to this embodiment of this application. In Table 1, an example in which the first information indicates, in an implicit indication manner, the service type information of the local offloading supported by the target access network element, and the first information indicates that a quantity of pieces of service type information of the local offloading supported by the target access network element is 4 is used for illustration. Service type information 1 includes NSSAI 11, a DNN 11, and an App-ID 11, service type information 2 includes NSSAI 22, a DNN 22, and an App-ID 22, service type information 3 includes NSSAI 33, a DNN 33, and an App-ID 33, and service type information 4 includes NSSAI 44, a DNN 44, and an App-ID 44. Each piece of service type information may indicate one service type, and a plurality of services may belong to a same service type. For example, service types to which a service 1, a service 2, and a service 3 belong may all be a service type indicated by the service type information 4. In Table 2, an example in which the first information indicates, in an implicit indication manner, the service type information of the local offloading supported by the target access network element, and the first information indicates that a quantity of pieces of service type information of the local offloading supported by the target access network element is 4 is used for illustration. Service type information 11 includes NSSAI 11 and a DNN 11, service type information 22 includes NSSAI 22 and a DNN 22, service type information 33 includes NSSAI 33 and a DNN 33, and service type information 44 includes NSSAI 44 and a DNN 44. Each piece of service type information may indicate one service type, and a plurality of services may belong to a same service type. For example, service types to which a service 11, a service 22, and a service 33 belong may all be a service type indicated by the service type information 33. In Table 3, an example in which the first information indicates, in an explicit indication manner, the service type information of the local offloading supported by the target access network element, and the first information indicates that a quantity of pieces of service type information of the local offloading supported by the target access network element is 4 is used for illustration. Service type information 111 includes NSSAI 1, a DNN 1, and an App-ID 1, service type information 222 includes NSSAI 2, a DNN 2, and an App-ID 2, service type information 333 includes NSSAI 3, a DNN 3, and an App-ID 3, and service type information 444 includes NSSAI 4, a DNN 4, and an App-ID 4. Each piece of service type information may indicate one service type, and a plurality of services may belong to a same service type. For example, service types to which a service 111, a service 222, and a service 333 belong may all be a service type indicated by the service type information 111.

TABLE 1

| NSSAI 11 | DNN 11 | App-ID 11 |
| NSSAI 22 | DNN 22 | App-ID 22 |
| NSSAI 33 | DNN 33 | App-ID 33 |
| NSSAI 44 | DNN 44 | App-ID 44 |

TABLE 2

| NSSAI 11 | DNN 11 |
|---|---|
| NSSAI 22 | DNN 22 |
| NSSAI 33 | DNN 33 |
| NSSAI 44 | DNN 44 |

TABLE 3

| Local support indication | NSSAI 1 | DNN 1 | App-ID 1 |
|---|---|---|---|
| | NSSAI 2 | DNN 2 | App-ID 2 |
| | NSSAI 3 | DNN 3 | App-ID 3 |
| | NSSAI 4 | DNN 4 | App-ID 4 |

It should be noted that a sequence of performing S101 and S102 is not limited in this embodiment of this application. For example, S101 may be performed first and then S102 is performed, S102 may be performed first and then S101 is performed, or certainly S101 and S102 may be performed simultaneously.

S103: If the first network element determines, based on the first information and the first service type information included in the session information of the first session, that the target access network element supports local offloading of a service corresponding to the first service type information, the first network element determines that the target access network element processes the first session. That the target access network element processes the first session may include that the target access network element updates the session information of the first session. Updating the session information of the first session may include adding some locally stored session-related information to the session information, updating, by using the some locally stored session-related information, information included in the session information, or deleting some information included in the session information.

In a possible implementation, if the first service type information matches the service type information that is of the local offloading supported by the target access network element and that is indicated by the first information, the first network element determines that the target access network element supports the local offloading of the service corresponding to the first service type information, and the first network element determines that the target access network element processes the first session. In this application, that the first service type information matches the service type information that is of the local offloading supported by the target access network element and that is indicated by the first information may be understood as that the service type information that is of the local offloading supported by the target access network element and that is indicated by the first information includes the first service type information, may be understood as that if there are a plurality of pieces of service type information that are of the local offloading supported by the target access network element and that are indicated by the first information, the first service type information is the same as or matches a piece of service type information indicated by the first information, may be understood as that content included in the first service type information is completely the same as content included in at least one piece of service type information that is of the local offloading supported by the target access network element and that is indicated by the first information, may be understood as that the first service type information is the service type information of the local offloading supported by the target access network element, or may be understood as that the service corresponding to the service type indicated by the first service type information is the service of local offloading supported by the target access network element. For example, when service type information includes NSSAI, a DNN, and an App-ID, that the first service type information matches the service type information that is of the local offloading supported by the target access network element and that is indicated by the first information means that the NSSAI, the DNN, and the App-ID that are included in the first service type information are completely the same as NSSAI, a DNN, and an App-ID that are included in a piece of service type information indicated by the first information. This implementation is described in detail below by using three examples.

In a possible example, the first information is the first information shown in Table 1, the first service type information includes NSSAI 44, a DNN 44, and an App-ID 44, and the first network element determines, based on the first service type information and the first information shown in Table 1, that the NSSAI 44, the DNN 44, and the App-ID 44 that are included in the first service type information respectively match the NSSAI 44, the DNN 44, and the App-ID 44 that are included in the service type information 4 shown in Table 1. In this case, the first network element determines that the target access network element supports local offloading of services (for example, the service 1, the service 2, and the service 3) corresponding to the first service type information, and then the first network element determines that the target access network element processes the first session. That the target access network element processes the first session may include updating the session information of the first session. For details of updating, refer to the following descriptions.

In another possible example, the first information is the first information shown in Table 2, the first service type information includes NSSAI 33 and a DNN 33, and the first network element determines, based on the first service type information and the first information shown in Table 2, that the NSSAI 33 and the DNN 33 that are included in the first service type information respectively match the NSSAI 33 and the DNN 33 that are included in the service type information 33 shown in Table 2. In this case, the first network element determines that the target access network element supports local offloading of services (for example, the service 11, the service 22, and the service 33) corresponding to the first service type information, and then the first network element determines that the target access network element processes the first session. That the target access network element processes the first session may include updating the session information of the first session. For details of updating, refer to the following descriptions.

In still another possible example, the first information is the first information shown in Table 3, the first service type information includes NSSAI 1, a DNN 1, and an App-ID 1, and the first network element determines, based on the first service type information and the first information shown in Table 3, that the NSSAI 1, the DNN 1, and the App-ID 1 that are included in the first service type information respectively match the NSSAI 1, the DNN 1, and the App-ID 1 that are included in the service type information 111 shown in Table 3. In this case, the first network element determines that the target access network element supports local offloading of services (for example, the service 111, the service 222, and the service 333) corresponding to the first service type information, and then the first network element determines that the target access network element processes the first session. That the target access network element processes the first session may include updating the session information of the first session. For details of updating, refer to the following descriptions.

According to the foregoing method, that the first network element determines, only when determining that the target access network element supports the local offloading of the service corresponding to the first service type information, that the target access network element processes the first session may be understood as handing over the first session to the target access network element. In this way, that the target access network element processes the first session can not only reduce a transmission latency of service data, but also offload data of a core network element to reduce network pressure.

S104: If the first network element determines, based on the first information and the first service type information included in the session information of the first session, that the target access network element does not support the local offloading of the service corresponding to the first service type information, the first network element determines that the core network element processes the first session. That the core network element processes the first session may include that the core network element updates the session information of the first session. Updating the session information of the first session may include adding some locally stored session-related information to the session information, updating, by using the some locally stored session-related information, information included in the session information, or deleting some information included in the session information. It should be noted that, in this embodiment of this application, either S103 or S104 may be performed, or S103 and S104 may be performed in parallel. For example, two sessions of the terminal are used as an example, and are a session 1 and a session 2. Session information of the session 1 includes service type information a, and session information of the session 2 includes service type information b. If the target access network element supports local offloading of services corresponding to the service type information a and the service type information b, the terminal performs S103 when being handed over from the source access network element to the target access network element. If the target access network element supports local offloading of a service corresponding to the service type information a, and the target access network element does not support local offloading of a service corresponding to the service type information b, the terminal may perform S103 and S104 in parallel when being handed over from the source access network element to the target access network element. If the target access network element does not support local offloading of services corresponding to the service type information a and the service type information b, the terminal performs S104 when being handed over from the source access network element to the target access network element.

In a possible implementation, if the first service type information does not match the service type information that is of the local offloading supported by the target access network element and that is indicated by the first information, the first network element determines that the target access network element does not support the local offloading of the service corresponding to the first service type information, and the first network element determines that the core network element processes the first session. In this application, that the first service type information does not match the service type information that is of the local offloading supported by the target access network element and that is indicated by the first information may be understood as that the service type information that is of the local offloading supported by the target access network element and that is indicated by the first information does not include the first service type information, may be understood as that if there are a plurality of pieces of service type information that are of the local offloading supported by the target access network element and that are indicated by the first information, the first service type information is not the same as or does not match any piece of service type information indicated by the first information, may be understood as that content included in the first service type information is incompletely the same as content included in any piece of service type information that is of the local offloading supported by the target access network element and that is indicated by the first information, may be understood as that the first service type information is not the service type information of the local offloading supported by the target access network element, or may be understood as that the service corresponding to the service type indicated by the first service type information is not the service of local offloading supported by the target access network element. This implementation is described in detail below by using three examples.

In a possible example, the first information is the first information shown in Table 1, the first service type information includes NSSAI 77, a DNN 77, and an App-ID 77, and the first network element determines, based on the first service type information and the first information shown in Table 1, that the NSSAI 77, the DNN 77, and the App-ID 77 that are included in the first service type information do not match information included in the first information shown in Table 1. In this case, the first network element determines that the target access network element does not support the local offloading of the service corresponding to the first service type information, and then the first network element determines that the core network element processes the first session. That the core network element processes the first session may include updating the session information of the first session. For details of updating, refer to the following descriptions.

In another possible example, the first information is the first information shown in Table 2, the first service type information includes NSSAI 88 and a DNN 88, and the first network element determines, based on the first service type information and the first information shown in Table 2, that the NSSAI 88 and the DNN 88 that are included in the first service type information do not match information included in the first information shown in Table 2. In this case, the first network element determines that the target access network element does not support the local offloading of the service corresponding to the first service type information, and then the first network element determines that the core network element processes the first session. That the core network element processes the first session may include updating the session information of the first session. For details of updating, refer to the following descriptions.

In still another possible example, the first information is the first information shown in Table 3, the first service type information includes NSSAI 6, a DNN 6, and an App-ID 6, and the first network element determines, based on the first service type information and the first information shown in Table 3, that the NSSAI 6, the DNN 6, and the App-ID 6 that are included in the first service type information do not match information included in the first information shown in Table 3. In this case, the first network element determines that the target access network element does not support the local offloading of the service corresponding to the first service type information, and then the first network element determines that the core network element processes the first session. That the core network element processes the first session may include updating the session information of the first session. For details of updating, refer to the following descriptions.

According to the foregoing method, that the first network element determines, when determining that the target access network element does not support the local offloading of the service corresponding to the first service type information, that the core network element processes the first session may be understood as handing over the first session to the core network element. It can be avoided that the first session is handed over to the target access network element when the target access network element does not support the local offloading of the service corresponding to the first service type information, so that a session handover error can be avoided, a handover success rate of a session is improved, and service continuity of communication data carried by the session is ensured.

In this embodiment of this application, for different application scenarios, the first network element may be different network elements. For the different network elements, different methods may be used to obtain the first information and the session information of the first session of the terminal. In addition, for the different network elements, after that the target access network element or the core network element processes the first session is determined, different operations may be performed. The method shown in FIG. 2 in this application is described in detail below in this application for different application scenarios by using an example in which the first network element is the target access network element, the core network element serving the terminal, or the source access network element.

Application scenario 1: In the scenario in which the terminal is handed over from the source access network element to the target access network element, the first network element shown in FIG. 2 is the target access network element, and the first session in the method shown in FIG. 2 is a session managed and controlled by the source access network element before the terminal is handed over. The session managed and controlled by the source access network element may also be understood as a session locally routed from the source access network element, or may be understood as that a service corresponding to service type information included in session information of the session is a service of local offloading or a local service supported by the source access network element.

Based on the scenario 1, the target access network element may obtain the session information of the first session of the terminal in the following manner: The target access network element receives the session information from the source access network element or the core network element. It should be noted that, in this case, in addition to the first service type information, the session information that is of the first session and that is obtained by the target access network element may further include information other than the first service type information in the context information of the first session. For example, the session information of the first session may further include one or more of the terminal identifier, the first session identifier, the QoS parameter, and the IP address.

Based on the scenario 1, the target access network element may obtain the first information in the following manner and the like.

Manner 1: The target access network element obtains the preconfigured first information locally. Optionally, the first information may be preconfigured by the core network element for the target access network element or predefined.

Manner 2: The target access network element receives the first information from the core network element.

Based on the scenario 1, in a first possible implementation, in step S103, after it is determined that the target access network element processes the first session, the target access network element may process the first session in the following manner: updating the session information of the first session. For example, the updating the session information of the first session may include allocating a new IP address to the first session, updating the session information of the first session based on the new IP address, and notifying the source access network element, the terminal, or the core network element of the new IP address of the first session, so that the new IP address allocated to the first session is synchronized on the network elements in time, and the new IP address may be used to address the first session subsequently. For example, if the session information of the first session includes an old IP address of the first session, the target access network element may update the old IP address of the first session by using the new IP address. For another example, if the session information of the first session does not include an old IP address of the first session, the target access network element may add the new IP address to the session information of the first session. The target access network element may send the new IP address by using a user plane or a signaling plane. For details, refer to the following specific examples. It should be noted that the manner of updating an IP address in the scenario 1 may also be applied to a subsequent scenario.

Based on the scenario 1, in the first possible implementation, if the target access network element allocates the new IP address to the first session, the target access network element may further send a first indication to the source access network element, where the first indication is used to indicate that the new IP address has been allocated to the first session. In this way, after receiving the first indication, the source access network element may learn that the target access network element allocates the new IP address to the first session, may send validity time of the old IP address of the first session to the terminal accordingly, and may release the old IP address when the validity time of the old IP address expires.

Based on the scenario 1, in the first possible implementation, if the session information that is of the first session and that is obtained by the target access network element includes the IP address of the first session, when the IP address remains unchanged, after it is determined that the target access network element processes the first session, the target access network element may further perform ARP route update on the IP address of the first session, to reuse the IP address. In this way, the old IP address may continue to be used to address the first session subsequently. For example, the target access network element may send the IP address to a peripheral network element according to a protocol. For example, the peripheral network element may include a peripheral access network element, a peripheral core network element, a router node, or the like. In this way, the peripheral network element may further address the first session based on the IP address subsequently.

According to the foregoing method, the first session is handed over from the source access network element to the target access network element. In this way, that the target access network element processes the first session can achieve an objective of offloading from the core network element. This can not only reduce an end-to-end latency of a data service, but also reduce network pressure.

Based on the scenario 1, in a second possible implementation, in step S104, after determining that the core network element processes the first session, the target access network element may further send the session information of the first session and access network tunnel information of the first session to the core network element, so that the core network element may set up a data transmission channel between the target access network element and the core network element for the first session based on the session information of the first session and the access network tunnel information of the first session, to complete handover of the first session. The access network tunnel information may be a tunnel endpoint identifier (fully qualified tunnel endpoint identifier, F-TEID) of a tunnel (GPRS tunneling protocol-U, GTP-U) protocol allocated by the target access network element to the terminal. Further, after the target access network element sends the session information and the access network tunnel information to the core network element, the target access network element may further receive core network tunnel information of the first session from the core network element, so that the target access network element can set up a data transmission channel between the terminal, the access network element, and the core network element for the first session based on the core network tunnel information of the first session, to complete handover of the first session. The core network tunnel information may be an F-TEID that is of a GTP-U protocol and that is allocated by the core network element to the terminal.

According to the foregoing method, when it is determined that the target access network element does not support the local offloading of the service corresponding to the first service type information, the first session is handed over from the source access network element to the core network element. A problem that the handover error occurs when the session is handed over to the target access network element that cannot process the session can be avoided, and the handover success rate can be improved.

Application scenario 2: In the scenario in which the terminal is handed over from the source access network element to the target access network element, the first network element shown in FIG. 2 is the core network element that serves the terminal, and the first session in the method shown in FIG. 2 is a session managed and controlled by the source access network element before the terminal is handed over. For a meaning of the session managed and controlled by the source access network element, refer to the descriptions in the foregoing scenario 1.

Based on the scenario 2, the core network element may obtain the session information of the first session of the terminal in the following manner and the like: The core network element receives the session information from the source access network element. Optionally, the session information received by the core network element from the source access network element may be sent by the source access network element to the core network element after the method shown in FIG. 2 is performed. It should be noted that, in this case, in addition to the first service type information, the session information that is of the first session and that is obtained by the core network element may further include information other than the first service type information in the context information of the first session, where the information other than the first service type information may include, for example, one or more of the terminal identifier, the first session identifier, the QoS parameter, and the IP address. In the scenario 2, all of the following session information of the first session refers to the session information that includes more content.

Based on the scenario 2, in a first possible implementation, in step S103, after determining that the target access network element processes the first session, the core network element may further send the session information of the first session to the target access network element. After receiving the session information, the target access network element processes the first session. For how to process the first session, refer to the related descriptions in the scenario 1. According to the method, the first session is handed over to the target access network element. In this way, that the target access network element processes the first session can not only reduce the transmission latency of the service data, but also offload the data of the core network element to reduce the network pressure.

Based on the scenario 2, in a second possible implementation, in step S104, after determining that the core network element processes the first session, the core network element may process the first session in the following manner: updating the session information of the first session. For example, the updating the session information of the first session may include allocating a new IP address to the first session, updating the session information of the first session based on the new IP address, and notifying the source access network element or the terminal of the new IP address of the first session, so that the new IP address allocated to the first session is synchronized on the network elements in time, and the new IP address may be used to address the first session subsequently. For example, if the session information of the first session includes an old IP address of the first session, the core network element may update the old IP address of the first session by using the new IP address. For another example, if the session information of the first session does not include an old IP address of the first session, the core network element may add the new IP address to the session information of the first session. The core network element may send the new IP address by using a user plane or a signaling plane. For details, refer to the following specific examples. It should be noted that the manner of updating an IP address in the scenario 2 may also be applied to a subsequent scenario.

Based on the scenario 2, in the second possible implementation, if the core network element allocates the new IP address to the first session, the core network element may further send a first indication to the source access network element, where the first indication is used to indicate that the new IP address has been allocated to the first session. In this way, after receiving the first indication, the source access network element may learn that the core network element allocates the new IP address to the first session, may send validity time of the old IP address of the first session to the terminal accordingly, and may release the old IP address after the validity time of the old IP address.

Based on the scenario 2, in the second possible implementation, if the session information that is of the first session and that is obtained by the core network element includes the IP address of the first session, when the IP address remains unchanged, after it is determined that the core network element processes the first session, the core network element may further perform ARP route update on the IP address of the first session, to reuse the IP address. In this way, the old IP address may continue to be used to address the first session subsequently. For how the core network element performs ARP route update on the IP address of the first session, refer to the method used by the target access network element to perform ARP route update on the IP address of the first session in the scenario 1.

Based on the scenario 2, in the second possible implementation, after determining that the core network element processes the first session, the core network element may further send core network tunnel information of the first session and the QoS parameter of the first session to the target access network element, so that the target access network element may set up a data transmission channel between the terminal, the access network element, and the core network element for the first session based on the core network tunnel information and the QoS parameter of the first session. For content included in the QoS parameter, refer to the foregoing descriptions. Further, after the core network element sends the core network tunnel information of the first session and the QoS parameter to the target access network element, the core network element may further receive access network tunnel information of the first session from the target access network element, so that the core network element sets up a data transmission channel between the target access network element and the core network element for the first session based on the access network tunnel information of the first session, to complete handover of the first session.

Application scenario 3: In the scenario in which the terminal is handed over from the source access network element to the target access network element, the first network element shown in FIG. 2 is the source access network element, and the session in the method shown in FIG. 2 is a session managed and controlled by the source access network element before the terminal is handed over. For a meaning of the session managed and controlled by the source access network element, refer to the descriptions in the foregoing scenario 1.

Based on the scenario 3, in a first possible implementation, in step S103, after determining that the target access network element processes the first session, the source access network element may further send the session information of the first session to the target access network element. After receiving the session information, the target access network element processes the first session. For how to process the first session, refer to the related descriptions in the scenario 1. Details are not described herein again. It should be noted that, in this case, in addition to the first service type information, the session information sent by the source access network element to the target access network element may further include information other than the first service type information in the context information of the first session, where the information other than the first service type information may include, for example, one or more of the terminal identifier, the first session identifier, the QoS parameter, and the IP address. All the session information of the first session in the following design in the scenario 3 refers to this meaning.

According to the foregoing method, the first session is handed over to the target access network element. In this way, that the target access network element processes the first session can not only reduce the transmission latency of the service data, but also offload the data of the core network element to reduce the network pressure.

Based on the scenario 3, in a second possible implementation, in step S104, after determining that the core network element processes the first session, the source access network element may further send the session information of the first session to the core network element. After receiving the session information, the core network element processes the first session. For how to process the first session, refer to the related descriptions in the scenario 2. Details are not described herein again.

Application scenario 4: In the scenario in which the terminal is handed over from the source access network element to the target access network element, the first network element shown in FIG. 2 is the core network element that serves the terminal, and the session in the method shown in FIG. 2 is a session managed and controlled by the core network element before the terminal is handed over. The session managed and controlled by the core network element may also be understood as a session routed from the core network element. Alternatively, it may also be understood as that a first service corresponding to the session is a service that the source access network element does not support in local offloading, or the first service is a service supported by the core network element.

Based on the scenario 4, in a first possible implementation, in step S103, after determining that the target access network element processes the first session, the core network element may further send the session information of the first session to the target access network element. After receiving the session information, the target access network element processes the first session. For how to process the first session, refer to the related descriptions in the scenario 1. Details are not described herein again. It should be noted that, in this case, in addition to the first service type information, the session information sent by the core network element to the target access network element may further include information other than the first service type information in the context information of the first session, where the information other than the first service type information may include, for example, one or more of the terminal identifier, the first session identifier, the QoS parameter, and the IP address. All the session information of the first session in the following design in the scenario 4 refers to this meaning.

In the scenario 4, for different sub-scenarios, the core network element may send the session information to the target access network element by using different methods.

In a sub-scenario, the terminal has successfully accessed the target access network element. In this scenario, before sending the session information to the target access network element, the core network element may further receive a path switch request from the target access network element. Sending the session information to the target access network element by using a path switch request acknowledgment message may be understood as including or carrying the session information in the path switch request acknowledgment message. Optionally, in this scenario, the core network element may further carry core network tunnel information of another session in the path switch request acknowledgment message, and a service corresponding to service type information corresponding to the another session is a service that the target access network element does not support in local offloading.

In another sub-scenario, the source access network element determines to hand over the terminal to the target access network element, but the terminal has not accessed the target access network element yet. In this scenario, before sending the session information to the target access network element, the core network element may further receive a handover required message from the source access network element, where the handover required message includes an identifier of a target access network element, and the handover required message is used to request to hand over the terminal to the target access network element. The core network element may send the session information to the target access network element by using a handover request message. Optionally, in this scenario, the core network element may further carry core network tunnel information of another session in the handover request message, and a service corresponding to service type information corresponding to the another session is a service that the target access network element does not support in local offloading.

Based on the scenario 2 to the scenario 4, the first network element may obtain the first information in the following manners and the like.

Manner a: The first network element obtains the preconfigured first information locally. Optionally, the first information may be preconfigured by the core network element for the first network element, or may be predefined.

Manner b: The first network element receives the first information from the target access network element.

Based on the scenario 2 to the scenario 4, in step S103, in a first possible implementation, if the target access network element allocates a new IP address to the first session, the first network element may further receive the new IP address of the first session from the target access network element, and send the new IP address of the first session to the terminal, so that the new IP address allocated to the first session is synchronized on the terminal and the target access network element in time.

Based on the scenario 2 to the scenario 4, in the first possible implementation, the first network element may further receive a first indication from the target access network element, where the first indication is used to indicate that the new IP address has been allocated to the first session. The first network element sends validity time of an old IP address of the first session to the terminal according to the first indication.

Based on the scenario 2 to the scenario 4, in step S104, in a second possible implementation, if the core network element allocates a new IP address to the first session, the first network element may further receive the new IP address of the first session from the core network element, and send the new IP address of the first session to the terminal, so that the new IP address allocated to the first session is synchronized on the terminal and the core network element in time.

Based on the scenario 2 to the scenario 4, in the second possible implementation, the first network element may further receive a first indication from the core network element, where the first indication is used to indicate that the new IP address has been allocated to the first session. The first network element sends validity time of an old IP address of the first session to the terminal according to the first indication.

It should be noted that the methods in the foregoing various scenarios in the embodiments of this application may be used separately or in combination. This is not limited in this application. That the methods in the various scenarios are used separately has been described above in this application, and cases of use in combination are described below by using several examples. For example, that the methods performed in the application scenario 3 and the application scenario 1 are used in combination is used as an example for description. First, in the application scenario 3, in the scenario in which the terminal is handed over from the source access network element to the target access network element, the source access network element may first perform the method shown in FIG. 2. After S103 is performed, the source access network element determines that the target access network element processes the first session, and may further send the session information of the first session to the target access network element. After receiving the session information, the target access network element may further perform the method in the scenario 1. For example, after receiving the session information, the target access network element may perform again the method shown in FIG. 2. In this way, it is equivalent to that S103 is performed twice. Performing S103 twice to determine that the target access network element supports the local offloading of the service corresponding to the first service type information can improve accuracy, and further can more efficiently process or hand over the first session. For another example, that the methods performed in the application scenario 4 and the application scenario 1 are used in combination is used as an example for description. First, in the application scenario 4, in the scenario in which the terminal is handed over from the source access network element to the target access network element, the core network element that serves the terminal may first perform the method shown in FIG. 2. After S103 is performed, the core network element determines that the target access network element processes the first session, and may further send the session information of the first session to the target access network element. After receiving the session information, the target access network element may further perform the method in the scenario 1. For example, after receiving the session information, the target access network element may perform again the method shown in FIG. 2. In this way, it is equivalent to that S103 is performed twice. Performing S103 twice to determine that the target access network element supports the local offloading of the service corresponding to the first service type information can improve accuracy, and further can more efficiently process or hand over the first session. The cases in which the methods in the various scenarios are used in combination are described in detail in the following specific examples.

The following uses the network architecture shown in FIG. 1b as an example to describe, by using several examples, in detail the communication method provided in the embodiments of this application. Based on the architecture shown in FIG. 1b, in the embodiments of this application, the core network element may be the PNC in FIG. 1b, the terminal may be the UE in FIG. 1b, the source access network element may be the PNA 1 or the PNA 2 in FIG. 1b, and the target access network element may be the PNA 1 or the PNA 2 in FIG. 1b. In the following descriptions, an example in which the source access network element of the UE is the PNA 1, the target access network element is the PNA 2, and a session is a PDU session is used for description.

Figure 3A:
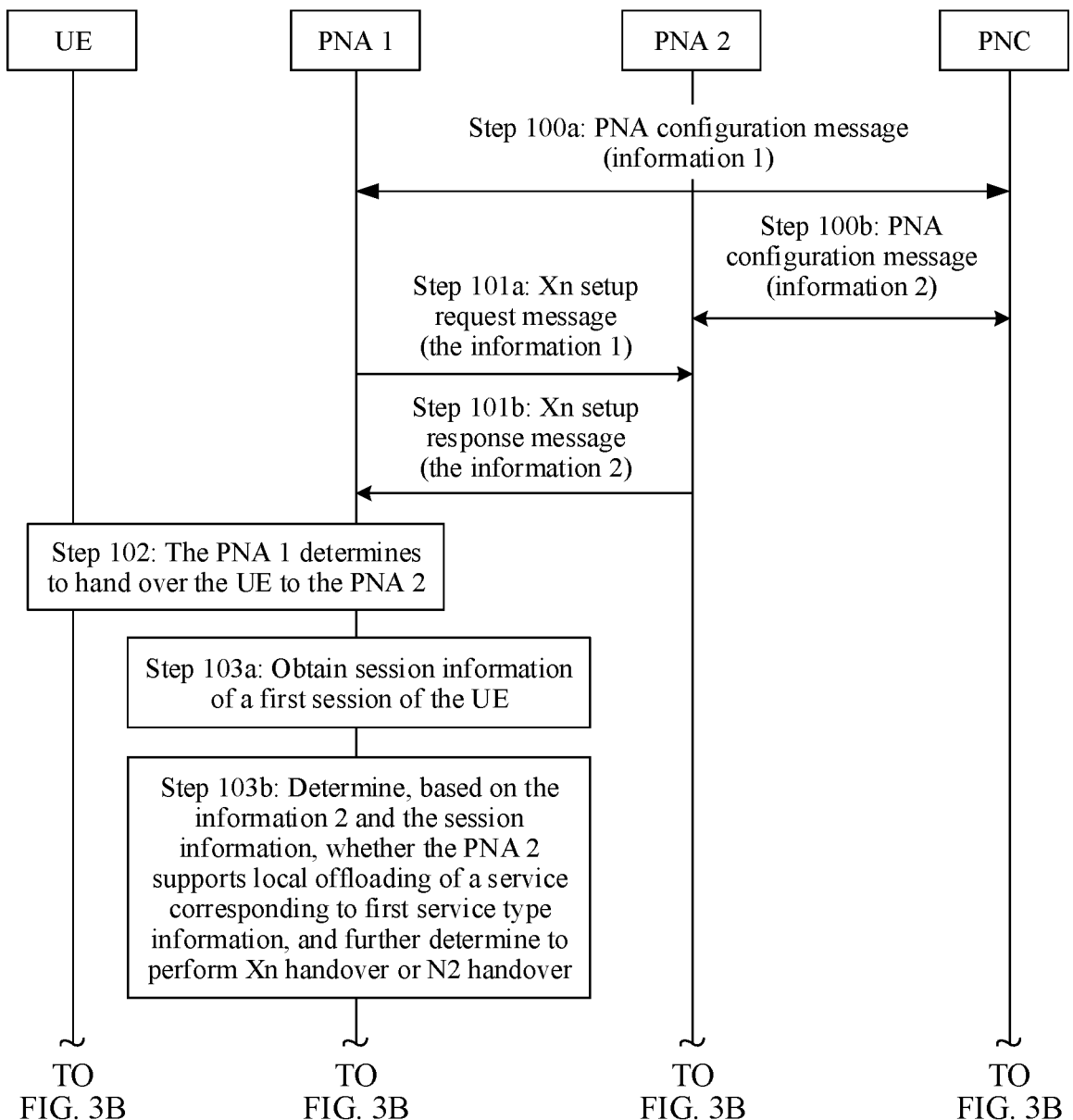
FIG. 3A to FIG. 3C are a schematic diagram of another communication method according to an embodiment of this application.
Figure 3B:
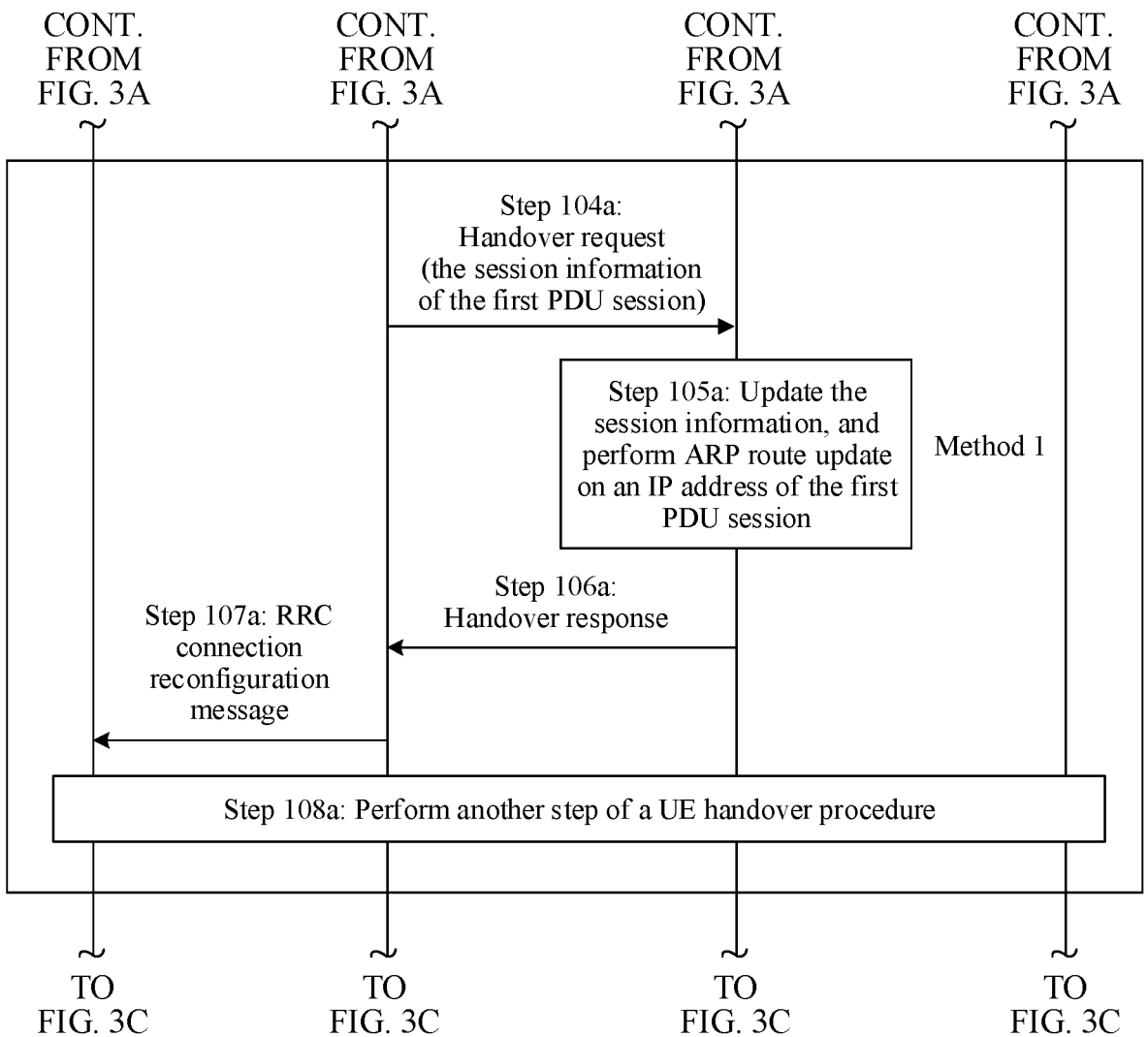
Figure 3C:
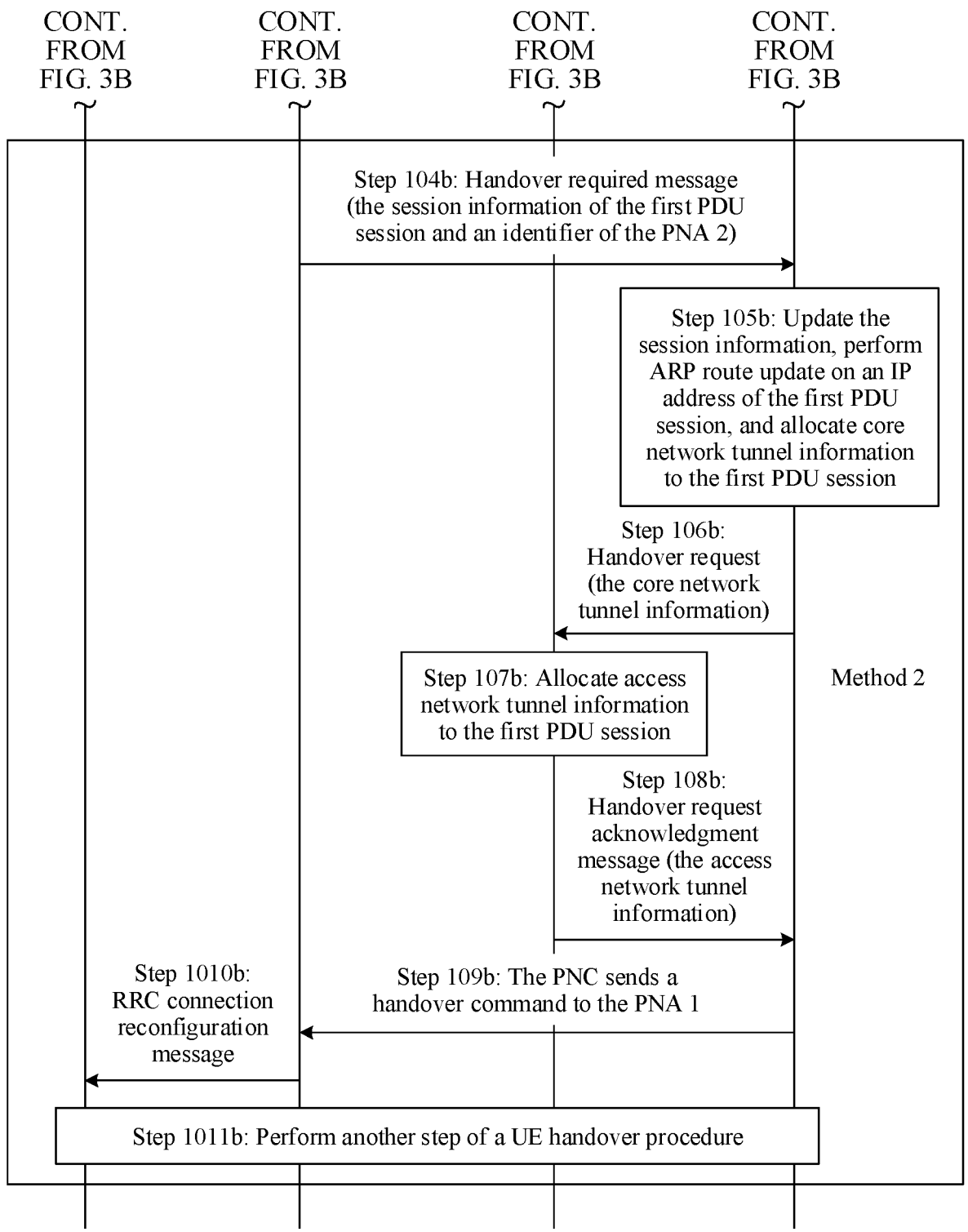

FIG. 3A to FIG. 3C are a schematic diagram of another communication method according to an embodiment of this application. The method is applied to a scenario in which UE is handed over from a PNA 1 to a PNA 2. In the method shown in FIG. 3A to FIG. 3C, the PNA 1 is equivalent to the first network element in FIG. 2. The method includes the following steps.

Step 101a: In a process of setting up an Xn interface connection between the PNA 1 and the PNA 2, the PNA 1 sends an Xn setup request message to the PNA 2. Optionally, the Xn setup request message includes information 1, and the information 1 is used to indicate service type information of local offloading supported by the PNA 1. For content included in the information 1, refer to content included in the foregoing first information. In FIG. 3A to FIG. 3C, an example in which the information 1 includes local support indications, NSSAIs, DNNs, and App-IDs is used for illustration. In this application, the NSSAIs represent a plural of NSSAI, and may represent a plurality of types of NSSAI. Other representations in a plural form are similar to the NSSAIs. For example, the DNNs represent a plurality of types of DNNs. For another example, the App-IDs represent a plurality of types of App-IDs. Optionally, referring to step 100*a* in FIG. 3A to FIG. 3C, the information 1 about the PNA 1 may be configured by a PNC for the PNA 1 by using a PNA configuration message. Alternatively, the information 1 about the PNA 1 may be predefined.

Step 101*b*: In the process of setting up the Xn interface connection between the PNA 1 and the PNA 2, the PNA 2 sends an Xn setup response message to the PNA 1, where the message includes information 2. A meaning of the information 2 is the same as a meaning of the foregoing first information, and the information 2 is used to indicate service type information of local offloading supported by the PNA 2. For content included in the information 2, refer to the content included in the foregoing first information. In FIG. 3A to FIG. 3C, an example in which the information 2 includes the local support indications, the NSSAIs, the DNNs, and the App-IDs is used for illustration. Optionally, referring to step 100*b* in FIG. 3A to FIG. 3C, the information 2 about the PNA 2 may be configured by the PNC for the PNA 2 by using a PNA configuration message. Alternatively, the information 2 about the PNA 2 may be predefined.

Step 102: The PNA 1 determines to hand over the UE to the PNA 2.

Step 103*a*: The PNA 1 obtains session information of a first PDU session of the UE, where the session information may be a whole set or a subset of context information of the first PDU session, and the session information may include first service type information. The first PDU session is a session managed and controlled by the PNA 1 before the UE is handed over. That is, the first PDU session is a session locally routed from the PNA 1 before the UE is handed over. In this application, a sequence of obtaining the information 2 and obtaining the session information of the first PDU session by the PNA 1 is not limited.

Step 103*b*: The PNA 1 determines, based on the information 2 and the session information of the first PDU session that are received, whether the PNA 2 supports local offloading of a service corresponding to the first service type information, and further determines to perform Xn handover or N2 handover. If the PNA 1 determines, based on the information 2 and the session information, that the PNA 2 supports the local offloading of the service corresponding to the first service type information, the PNA 1 determines that the PNA 2 processes the first PDU session, that is, performs Xn handover. This corresponds to a method 1 in FIG. 3A to FIG. 3C. Refer to step 104*a* to step 108*a*. On the contrary, if the PNA 1 determines, based on the information 2 and the session information, that the PNA 2 does not support the local offloading of the service corresponding to the first service type information, the PNA 1 determines that the PNC processes the first PDU session, that is, performs N2 handover. This corresponds to a method 2 in FIG. 3A to FIG. 3C. Refer to step 104*b* to step 1011*b*. It should be noted that, in this example, either the method 1 or the method 2 may be performed, or the method 1 and the method 2 may be performed in parallel. For example, the UE includes two PDU sessions that are a PDU session 1 and a PDU session 2. Session information of the PDU session 1 includes service type information 1, and session information of the PDU session 2 includes service type information 2. If the PNA 2 supports local offloading of services corresponding to the service type information 1 and the service type information 2, the method 1 is performed when the UE is handed over from the PNA 1 to the PNA 2. Alternatively, if the PNA 2 supports local offloading of a service corresponding to the service type information 1, and the PNA 2 does not support local offloading of a service corresponding to the service type information 2, the PNA 1 may perform the method 1 and the method 2 in parallel. Alternatively, if the PNA 2 does not support local offloading of services corresponding to the service type information 1 and the service type information 2, the PNA 1 performs the method 2.

The method 1 is as follows.

Step 104*a*: When the PNA 1 determines that the PNA 2 supports the local offloading of the service corresponding to the first service type information, the PNA 1 sends a handover request (Xn HO request) to the PNA 2, where the handover request includes the session information of the first PDU session. In this step, the session information of the first PDU session may further include information other than the first service type information in context information of the first PDU session, for example, may further include one or more of a UE identifier, a first PDU session identifier, a QoS parameter, and an IP address.

Step 105*a*: After receiving the session information of the first PDU session, the PNA 2 may update the session information. The PNA 2 may further perform ARP route update on the IP address of the first PDU session, to reuse the IP address. The PNA 2 updates the session information, for example, may delete some information in the session information, or add a PDU session-related parameter to the session information. For details, refer to the foregoing descriptions.

Optionally, before performing step 105*a*, the PNA 2 may further determine, based on the pre-obtained information 2 and the received session information of the first PDU session, whether the PNA 2 supports the local offloading of the service corresponding to the first service type information. When determining that the PNA 2 supports the local offloading of the service corresponding to the first service type information, the PNA 2 performs step 105*a*; or when determining that the PNA 2 does not support the local offloading of the service corresponding to the first service type information, the PNA 2 may send the session information of the first PDU session to the PNC. For details of a processing procedure of the PNC, refer to the following examples. According to this method, it may be repeatedly determined whether the PNA 2 supports the local offloading of the service corresponding to the first service type information, so that accuracy can be improved, and the first PDU session can be more effectively processed or handed over.

Step 106*a*: The PNA 2 sends a handover response (Xn HO response) to the PNA 1.

Step 107*a*: The PNA 1 sends a radio resource control (RRC) connection reconfiguration message (RRC connection reconfiguration) to the UE.

Step 108*a*: Perform another step of a UE handover procedure.

According to the foregoing method 1, in the scenario in which the UE is handed over from the PNA 1 to the PNA 2, when it is determined that the PNA 2 supports the local offloading of the service corresponding to the first service type information of the first PDU session, the first PDU session may be handed over from the PNA 1 to the PNA 2. In this way, that the PNA 2 processes the first PDU session can achieve an objective of offloading from the PNC. This can not only reduce an end-to-end latency of a data service, but also reduce network pressure.

The method 2 is as follows.

Step 104b: When the PNA 1 determines that the PNA 2 does not support the local offloading of the service corresponding to the first service type information, the PNA 1 sends a handover required message (N2 HO required) to the PNC, where the handover required message includes the session information of the first PDU session. In this step, the session information of the first PDU session may further include information other than the first service type information in context information of the first PDU session, for example, may further include one or more of a UE identifier, a first PDU session identifier, a QoS parameter, and an IP address. In addition, the handover required message may further include an identifier of the PNA 2.

Step 105b: After receiving the session information of the first PDU session, the PNC may update the session information. For details about how to update the session information, refer to the foregoing descriptions. The PNC may further perform ARP route update on the IP address of the first PDU session, to reuse the IP address, and may allocate core network tunnel information (CN tunnel info) to the first PDU session. For content included in the core network tunnel information, refer to the foregoing descriptions. For example, the core network tunnel information may include the QoS parameter of the first PDU session.

Step 106b: The PNC sends a handover request (N2 HO request) to the PNA 2, where the handover request includes the core network tunnel information allocated to the first PDU session.

Optionally, before performing step 105b, the PNC may further determine, based on the pre-obtained information 2, the received session information of the first PDU session, and the identifier of the PNA 2, whether the PNA 2 supports the local offloading of the service corresponding to the first service type information. When determining that the PNA 2 does not support the local offloading of the service corresponding to the first service type information, the PNC performs step 105b; or when determining that the PNA 2 supports the local offloading of the service corresponding to the first service type information, the PNC may send the session information of the first PDU session to the PNA 2, for example, the PNC may send the session information of the first PDU session to the PNA 2 by using the handover request in step 106b. For details of a processing procedure of the PNA 2, refer to the foregoing descriptions. For example, the UE includes two PDU sessions that are a PDU session a and a PDU session b. Session information of the PDU session a includes service type information a, and session information of the PDU session b includes service type information b. If the PNC determines that the PNA 2 does not support local offloading of a service corresponding to the service type information a, and determines that the PNA 2 supports local offloading of a service corresponding to the service type information b, the PNC may allocate core network tunnel information to the PDU session a, and may carry the core network tunnel information allocated to the PDU session a and the session information of the PDU session b in the handover request sent by the PNC to the PNA 2 in step 106b. According to this method, it may be repeatedly determined whether the PNA 2 supports the local offloading of the service corresponding to the first service type information, so that accuracy can be improved, and the first PDU session can be more effectively processed or handed over.

Step 107b: The PNA 2 allocates access network tunnel information (AN tunnel info) to the first PDU session, where for content included in the access network tunnel information, refer to the foregoing descriptions.

Step 108b: The PNA 2 sends a handover request acknowledgment message to the PNC, where the handover request acknowledgment message includes the access network tunnel information.

Step 109b: The PNC sends a handover command to the PNA 1.

Step 1010b: The PNA 1 sends an RRC connection reconfiguration message to the UE.

Step 1011b: Perform another step of a UE handover procedure.

According to the foregoing method 2, in the scenario in which the UE is handed over from the PNA 1 to the PNA 2, when it is determined that the PNA 2 does not support the local offloading of the service corresponding to the first service type information of the first PDU session, the first PDU session may be handed over from the PNA 1 to the PNC, so that a problem of a handover error occurs when the first PDU session is handed over to the PNA 2 that cannot process the session can be avoided, and a handover success rate can be improved.

Figure 4A:
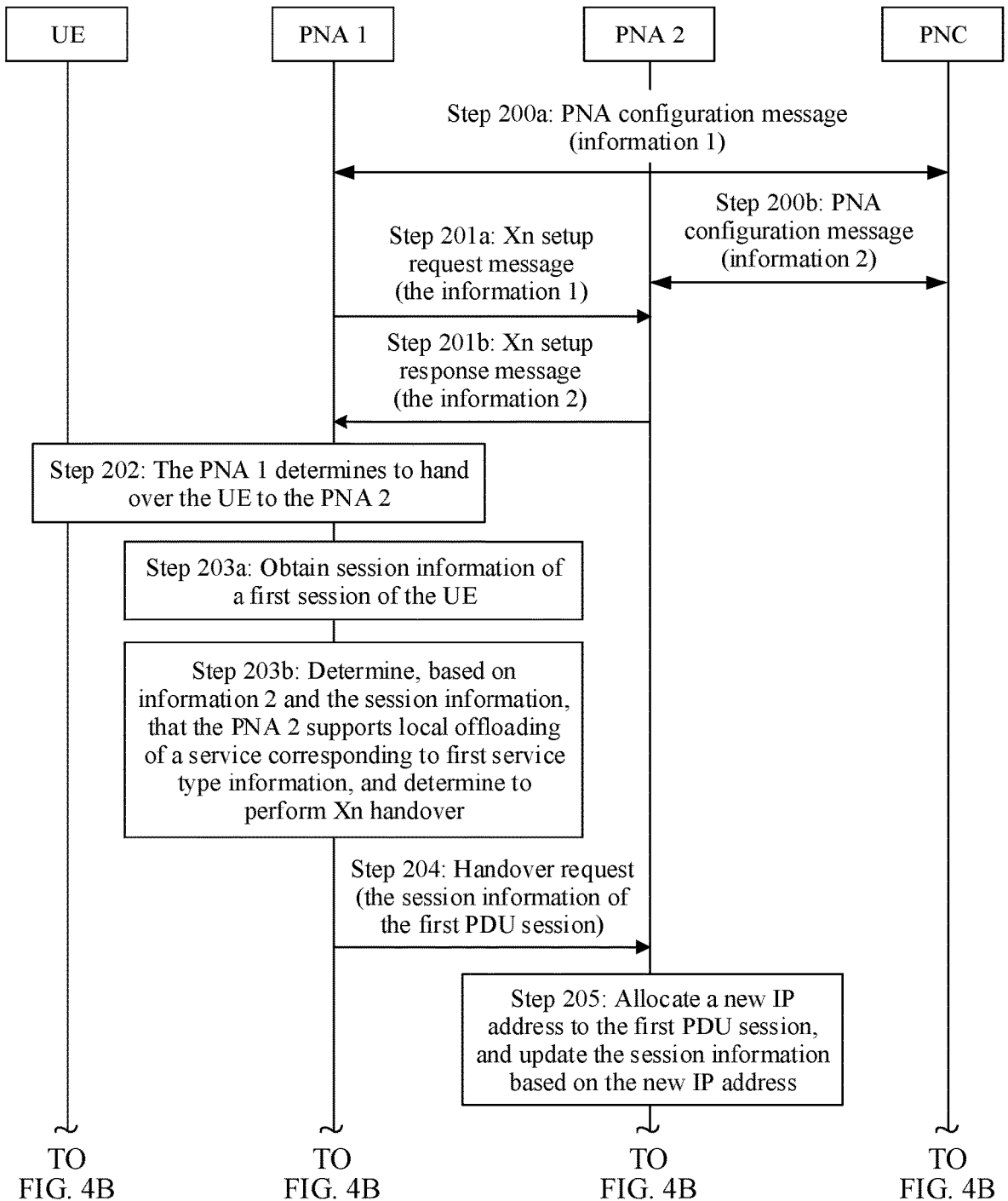
FIG. 4A and FIG. 4B are a schematic diagram of still another communication method according to an embodiment of this application.
Figure 4B:
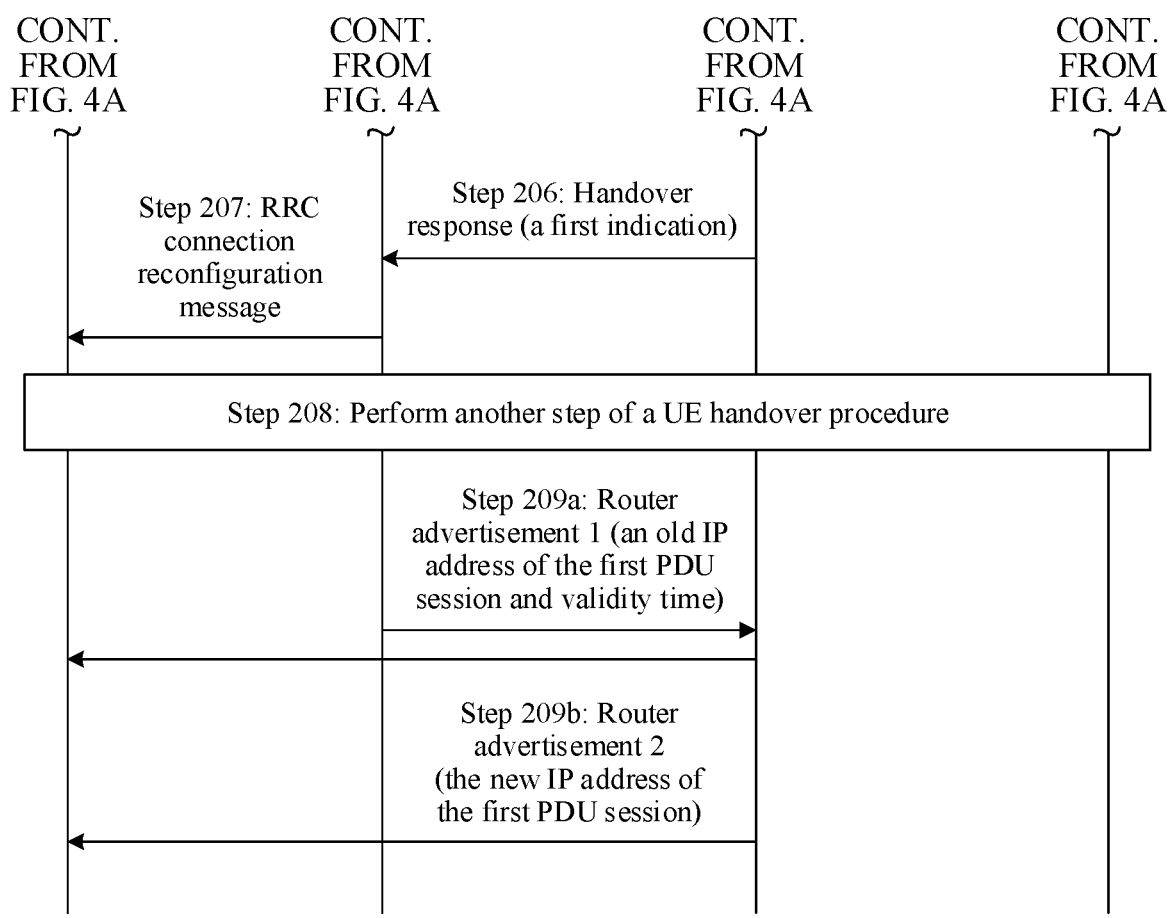

FIG. 4A and FIG. 4B are a schematic diagram of still another communication method according to an embodiment of this application. The method is applied to a scenario in which UE is handed over from a PNA 1 to a PNA 2. In the method shown in FIG. 4A and FIG. 4B, the PNA 1 is equivalent to the first network element in FIG. 2. The method includes the following steps.

Step 200a to step 203a in FIG. 4A and FIG. 4B are the same as step 100a to step 103a in FIG. 3A to FIG. 3C. For related descriptions in step 200a to step 203a, refer to the descriptions in step 100a to step 103a. Details are not described herein again.

Step 203b: The PNA 1 determines, based on information 2 and session information of a first PDU session, that the PNA 2 supports local offloading of a service corresponding to first service type information, and further determines to perform Xn handover.

Step 204 is the same as step 104a. For related descriptions in step 204, refer to the descriptions in step 104a. Details are not described herein again.

Step 205: After receiving the session information of the first PDU session, the PNA 2 may update the session information. For example, updating the session information may include updating an IP address. For example, the PNA 2 may allocate a new IP address to the first PDU session, and update the session information based on the new IP address. For example, if the session information includes an old IP address, the new IP address may be used to update the old IP address; or if the session information does not include an old IP address, the new IP address may be updated to the session information.

Optionally, before performing step 205, the PNA 2 may further determine, based on the pre-obtained information 2 and the received session information of the first PDU session, whether the PNA 2 supports the local offloading of the service corresponding to the first service type information. When determining that the PNA 2 supports the local offloading of the service corresponding to the first service type information, the PNA 2 performs step 205; or when determining that the PNA 2 does not support the local offloading of the service corresponding to the first service type information, the PNA 2 may send the session information of the first PDU session to a PNC. For details of a processing procedure of the PNC, refer to the foregoing descriptions.

Step 206: The PNA 2 sends a handover response (Xn HO response) to the PNA 1. Optionally, the Xn HO response may carry a first indication, and the first indication is used to indicate that the new IP address has been allocated to the first PDU session. In this way, the PNA 1 may learn that the PNA 2 allocates the new IP address to the first PDU session, may notify the UE of validity time of the old IP address of the first PDU session accordingly, and may release the old IP address in time after the old IP address becomes invalid.

Step 207: The PNA 1 sends an RRC connection reconfiguration message to the UE.

Step 208: Perform another step of a UE handover procedure. For example, the another step may include: sending, by the UE, an RRC connection reconfiguration complete message to the PNA 2. In this example, after the another step of the UE handover procedure is performed, the UE accesses the PNA 2.

Step 209a: The PNA 1 sends the validity time of the old IP address of the first PDU session to the UE. For example, the PNA 1 may send a router advertisement 1 to the UE through the PNA 2, to notify the UE of the validity time of the old IP address of the first PDU session. For example, the PNA 1 may send the router advertisement 1 to the PNA 2, where the router advertisement 1 includes the old IP address of the first PDU session and the validity time of the old IP address of the first PDU session. After receiving the router advertisement 1, the PNA 2 forwards the router advertisement 1 to the UE. It should be noted that, in this application, the old IP address of the first PDU session is an IP address of the first PDU session before the UE is handed over.

Step 209b: In addition, the PNA 2 sends a router advertisement 2 to the UE, where the router advertisement 2 includes the new IP address of the first PDU session, to notify the UE of the new IP address of the first PDU session, so that the new IP address is synchronized between the UE and the PNA 2 in time.

According to the foregoing method, in the scenario in which the UE is handed over from the PNA 1 to the PNA 2, when it is determined that the PNA 2 supports the local offloading of the service corresponding to the first service type information of the first PDU session, the first PDU session may be handed over from the PNA 1 to the PNA 2. In this way, that the PNA 2 processes the first PDU session can achieve an objective of offloading from the PNC. This can not only reduce an end-to-end latency of a data service, but also reduce network pressure. Further, the PNA 2 may allocate the new IP address to the first PDU session, to avoid a case in which the first PDU session is unavailable because the old IP address is unavailable.

Figure 5:
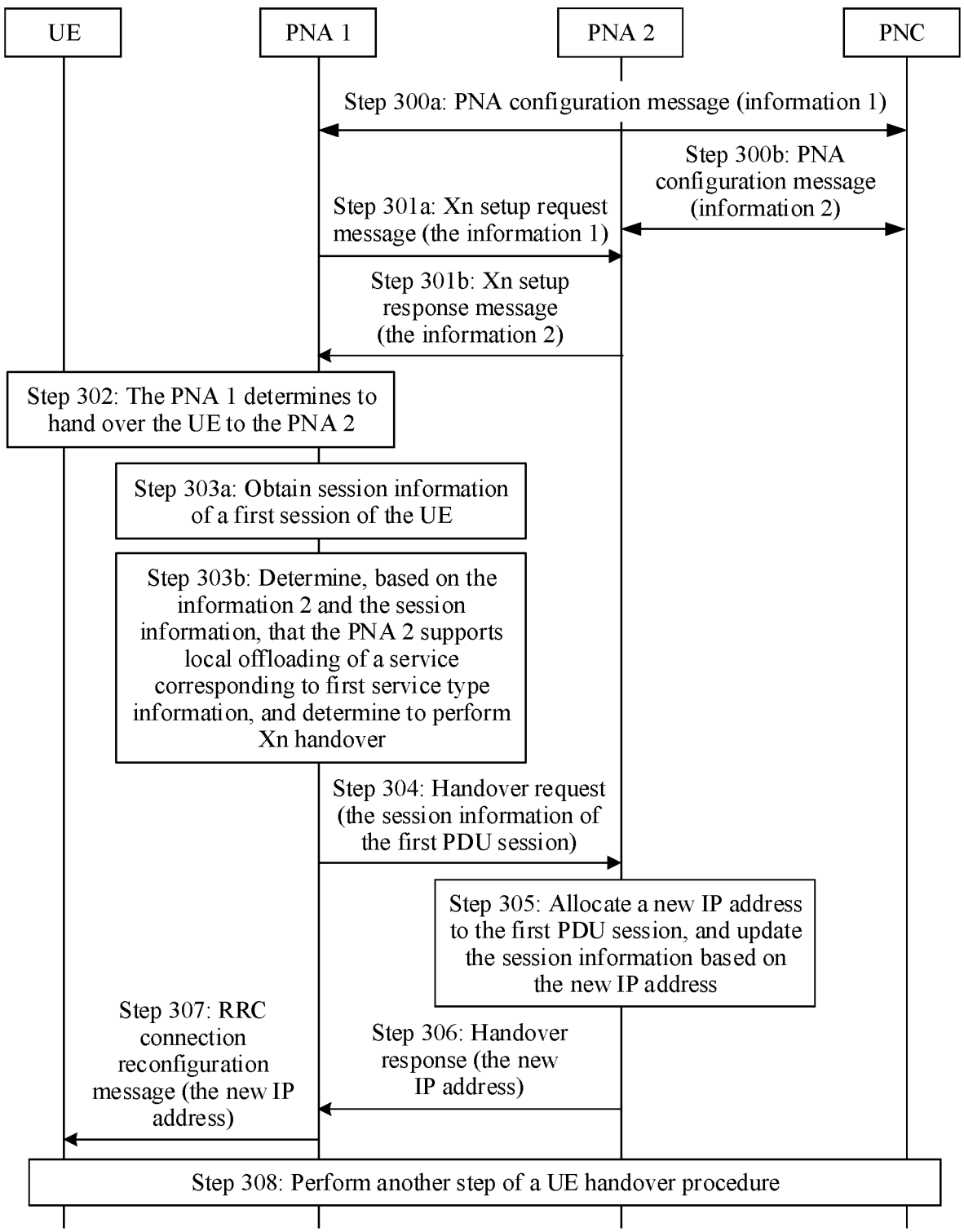
FIG. 5 is a schematic diagram of still another communication method according to an embodiment of this application.

FIG. 5 is a schematic diagram of still another communication method according to an embodiment of this application. The method is applied to a scenario in which UE is handed over from a PNA 1 to a PNA 2. In the method shown in FIG. 5, the PNA 1 is equivalent to the first network element in FIG. 2. The method includes the following steps.

Step 300a to step 303a in FIG. 5 are the same as step 100a to step 103a in FIG. 3A to FIG. 3C. For related descriptions in step 300a to step 303a, refer to the descriptions in step 100a to step 103a. Details are not described herein again. Step 303b in FIG. 5 is the same as step 203b in FIG. 4A and FIG. 4B. For related descriptions in step 303b, refer to the descriptions in step 203b. Details are not described herein again. Step 304 in FIG. 5 is the same as step 104a in FIG. 3A to FIG. 3C. For related descriptions in step 304, refer to the descriptions in step 104a. Details are not described herein again. Step 305 in FIG. 5 is the same as step 205 in FIG. 4A and FIG. 4B. For related descriptions in step 305, refer to the descriptions in step 205. Details are not described herein again.

Step 306: The PNA 2 sends a handover response (Xn HO response) to the PNA 1, where the Xn HO response includes a new IP address allocated to a first PDU session after the first PDU session is handed over.

Step 307: The PNA 1 sends an RRC connection reconfiguration message to the UE, where the RRC connection reconfiguration message includes the new IP address.

Step 308: Perform another step of a UE handover procedure.

According to the foregoing method, in the scenario in which the UE is handed over from the PNA 1 to the PNA 2, when it is determined that the PNA 2 supports local offloading of a service corresponding to first service type information of the first PDU session, the first PDU session may be handed over from the PNA 1 to the PNA 2. In this way, that the PNA 2 processes the first PDU session can achieve an objective of offloading from a PNC. This can not only reduce an end-to-end latency of a data service, but also reduce network pressure. Further, the PNA 2 may allocate the new IP address to the first PDU session, to avoid a case in which the first PDU session is unavailable because an old IP address is unavailable.

Figure 6A:
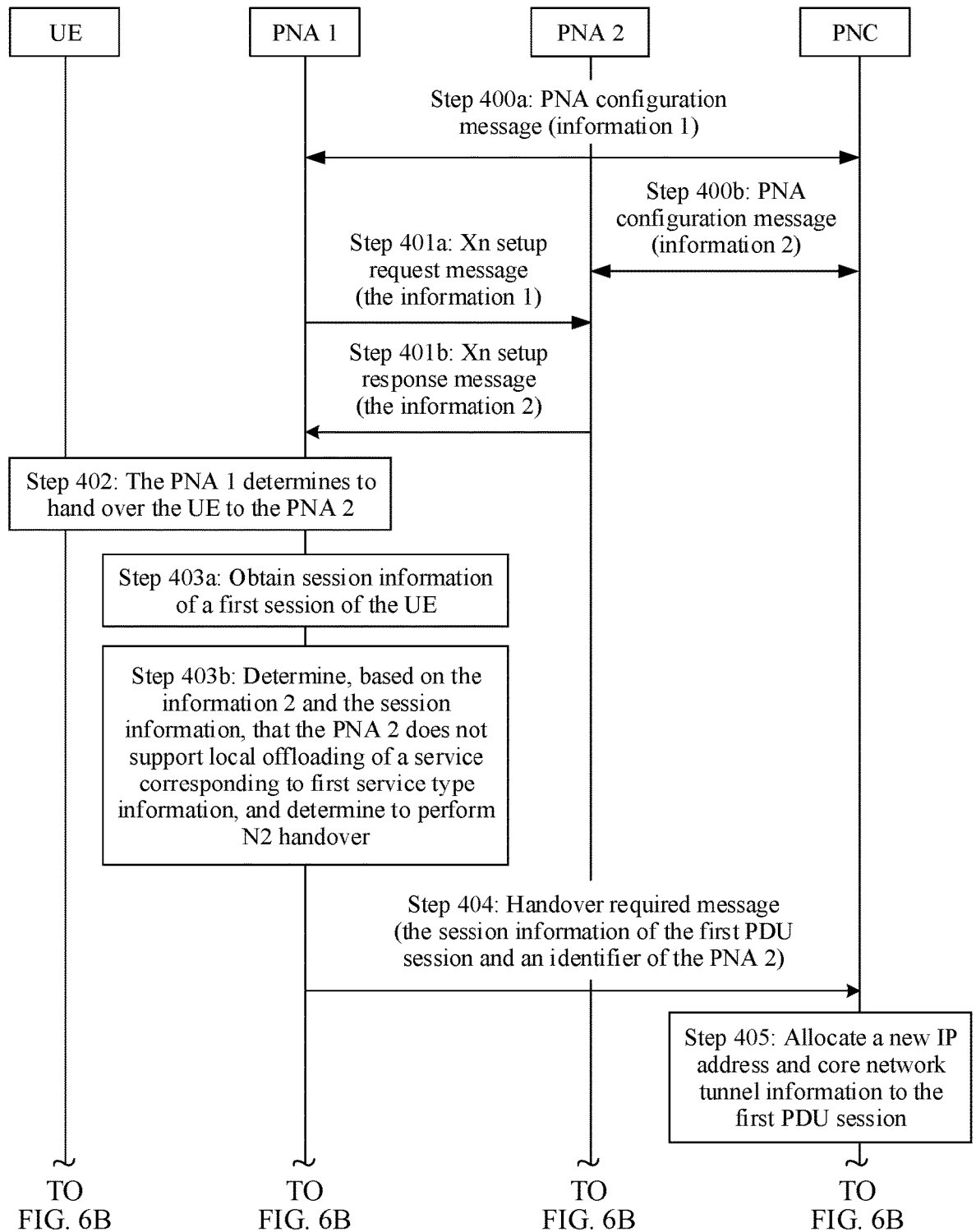
FIG. 6A and FIG. 6B are a schematic diagram of still another communication method according to an embodiment of this application.
Figure 6B:
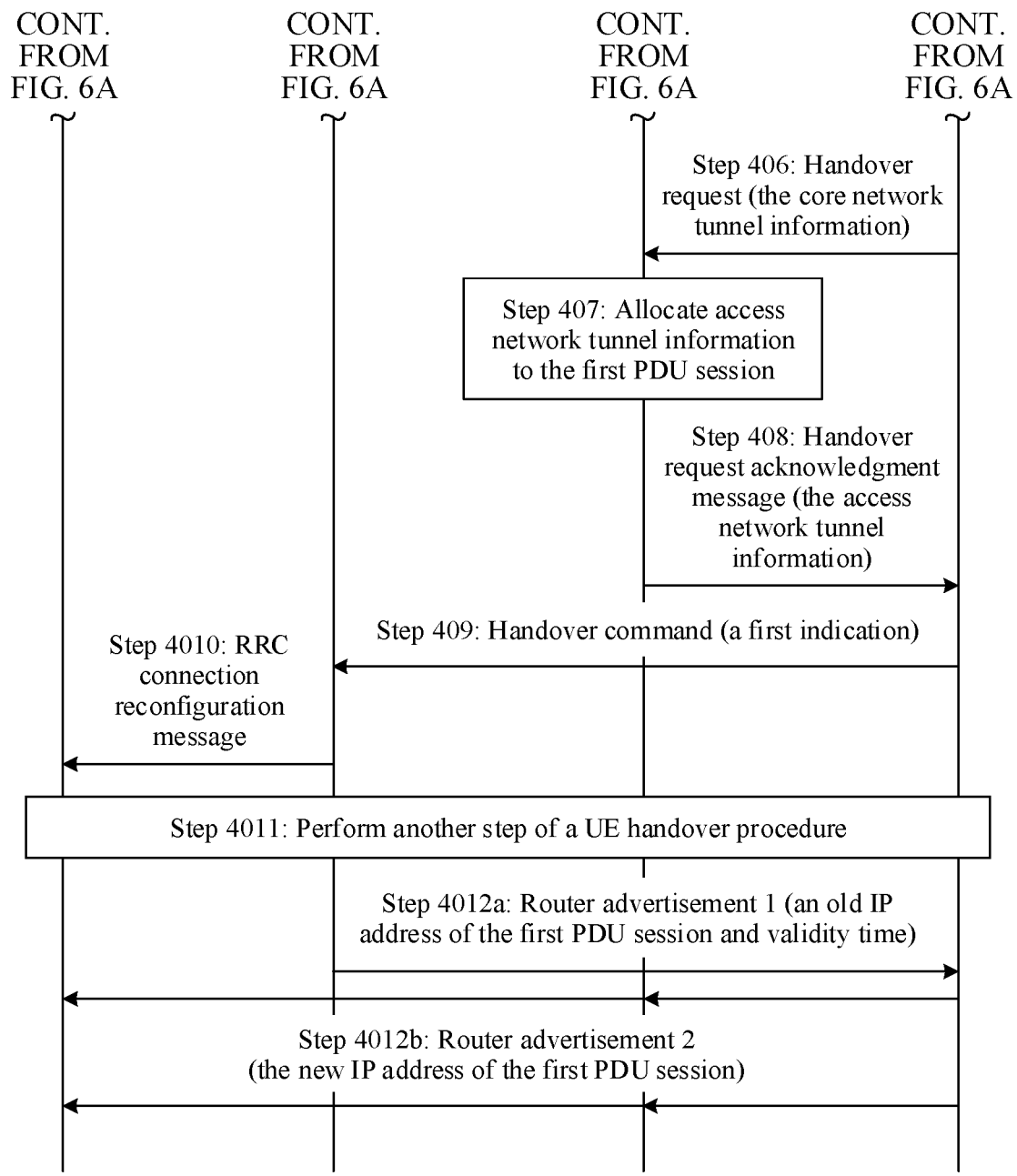

FIG. 6A and FIG. 6B are a schematic diagram of still another communication method according to an embodiment of this application. The method is applied to a scenario in which UE is handed over from a PNA 1 to a PNA 2. In the method shown in FIG. 6A and FIG. 6B, the PNA 1 is equivalent to the first network element in FIG. 2. The method includes the following steps.

Step 400a to step 403a in FIG. 6A and FIG. 6B are the same as step 100a to step 103a in FIG. 3A to FIG. 3C. For related descriptions in step 400a to step 403a, refer to the descriptions in step 100a to step 103a. Details are not described herein again.

Step 403b: The PNA 1 determines, based on information 2 and session information of a first PDU session, that the PNA 2 does not support local offloading of a service corresponding to first service type information, determines that a PNC processes the first PDU session, and performs N2 handover.

Step 404 is the same as step 104b. For related descriptions in step 404, refer to the descriptions in step 104b. Details are not described herein again.

Step 405: After receiving the session information of the first PDU session, the PNC may update the session information. For example, updating the session information may include updating an IP address. For example, the PNC may allocate a new IP address to the first PDU session, and update the session information based on the new IP address. For example, if the session information includes an old IP address, the new IP address may be used to update the old IP address; or if the session information does not include an old IP address, the new IP address may be updated to the session information. The PNC may further allocate core network tunnel information (CN tunnel info) to the first PDU session. For content included in the core network tunnel information, refer to the foregoing descriptions. For example, the core network tunnel information may include a QoS parameter of the first PDU session.

Step 406 to step 408 are the same as step 106b to step 108b. For related descriptions in step 406 to step 408, refer to the descriptions in step 106b to step 108b. Details are not described herein again.

Optionally, before performing step 405, the PNC may further determine, based on the pre-obtained information 2, the received session information of the first PDU session, and an identifier of the PNA 2, whether the PNA 2 supports the local offloading of the service corresponding to the first service type information. When determining that the PNA 2 does not support the local offloading of the service corresponding to the first service type information, the PNC performs step 405; or when determining that the PNA 2 supports the local offloading of the service corresponding to the first service type information, the PNC may send the session information of the first PDU session to the PNA 2, for example, the PNC may send the session information of the first PDU session to the PNA 2 by using a handover request in step 406. For details of a processing procedure of the PNA 2, refer to the foregoing descriptions. For example, the UE includes two PDU sessions that are a PDU session a and a PDU session b. Session information of the PDU session a includes service type information a, and session information of the PDU session b includes service type information b. If the PNC determines that the PNA 2 does not support local offloading of a service corresponding to the service type information a, and determines that the PNA 2 supports local offloading of a service corresponding to the service type information b, the PNC may carry core network tunnel information allocated to the PDU session a and the session information of the PDU session b in the handover request sent by the PNC to the PNA 2 in step 406. According to this method, it may be repeatedly determined whether the PNA 2 supports the local offloading of the service corresponding to the first service type information, so that accuracy can be improved, and the first PDU session can be more effectively processed or handed over.

Step 409: The PNC sends a handover command to the PNA 1. Optionally, the handover command carries a first indication, and the first indication is used to indicate that the new IP address has been allocated to the first PDU session. In this way, the PNA 1 may learn that the PNA 2 allocates the new IP address to the first PDU session, may notify the UE of validity time of the old IP address of the first PDU session accordingly, and may release the old IP address in time after the old IP address becomes invalid.

Step 4010: The PNA 1 sends an RRC connection reconfiguration message to the UE.

Step 4011: Perform another step of a UE handover procedure. After the another step of the UE handover procedure is performed, the UE accesses the PNA 2.

Step 4012*a*: The PNA 1 sends a router advertisement 1 to the UE by using the PNC and the PNA 2, to notify the UE of the validity time of the old IP address of the first PDU session. Specifically, the PNA 1 may send the router advertisement 1 to the PNC, where the router advertisement 1 includes the old IP address of the first PDU session and the validity time of the old IP address of the first PDU session. The PNC sends the router advertisement 1 to the PNA 2 after receiving the router advertisement 1, and PNA 2 forwards the router advertisement 1 to the UE. It should be noted that, in this example, the old IP address of the first PDU session is an IP address of the first PDU session before the UE is handed over.

Step 4012*b*: The PNC sends a router advertisement 2 to the UE through the PNA 2, where the router advertisement 2 carries the new IP address of the first PDU session, to notify the UE of the new IP address of the first PDU session. Specifically, the PNC may send the router advertisement 2 to the PNA 2, and the PNA 2 forwards the router advertisement 2 to the UE after the PNA 2 receives the router advertisement 2.

According to the foregoing method, in the scenario in which the UE is handed over from the PNA 1 to the PNA 2, when it is determined that the PNA 2 does not support the local offloading of the service corresponding to the first service type information of the first PDU session, the first PDU session may be handed over from the PNA 1 to the PNC, so that a problem of a handover error occurs when the first PDU session is handed over to the PNA 2 that cannot process the session can be avoided, and a handover success rate can be improved. Further, the PNC may allocate the new IP address to the first PDU session, to avoid a case in which the first PDU session is unavailable because the old IP address is unavailable.

Figure 7A:
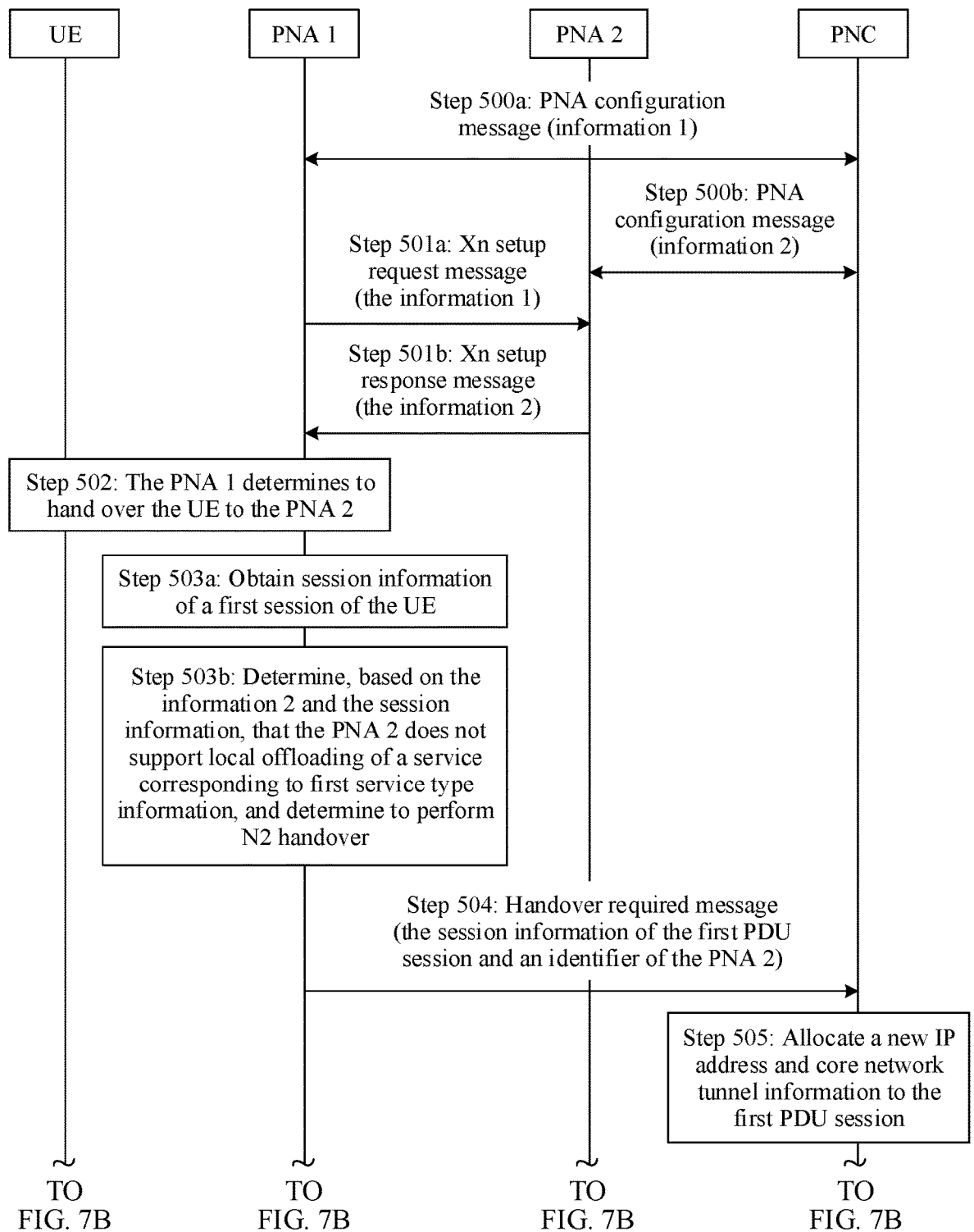
FIG. 7A and FIG. 7B are a schematic diagram of still another communication method according to an embodiment of this application.
Figure 7B:
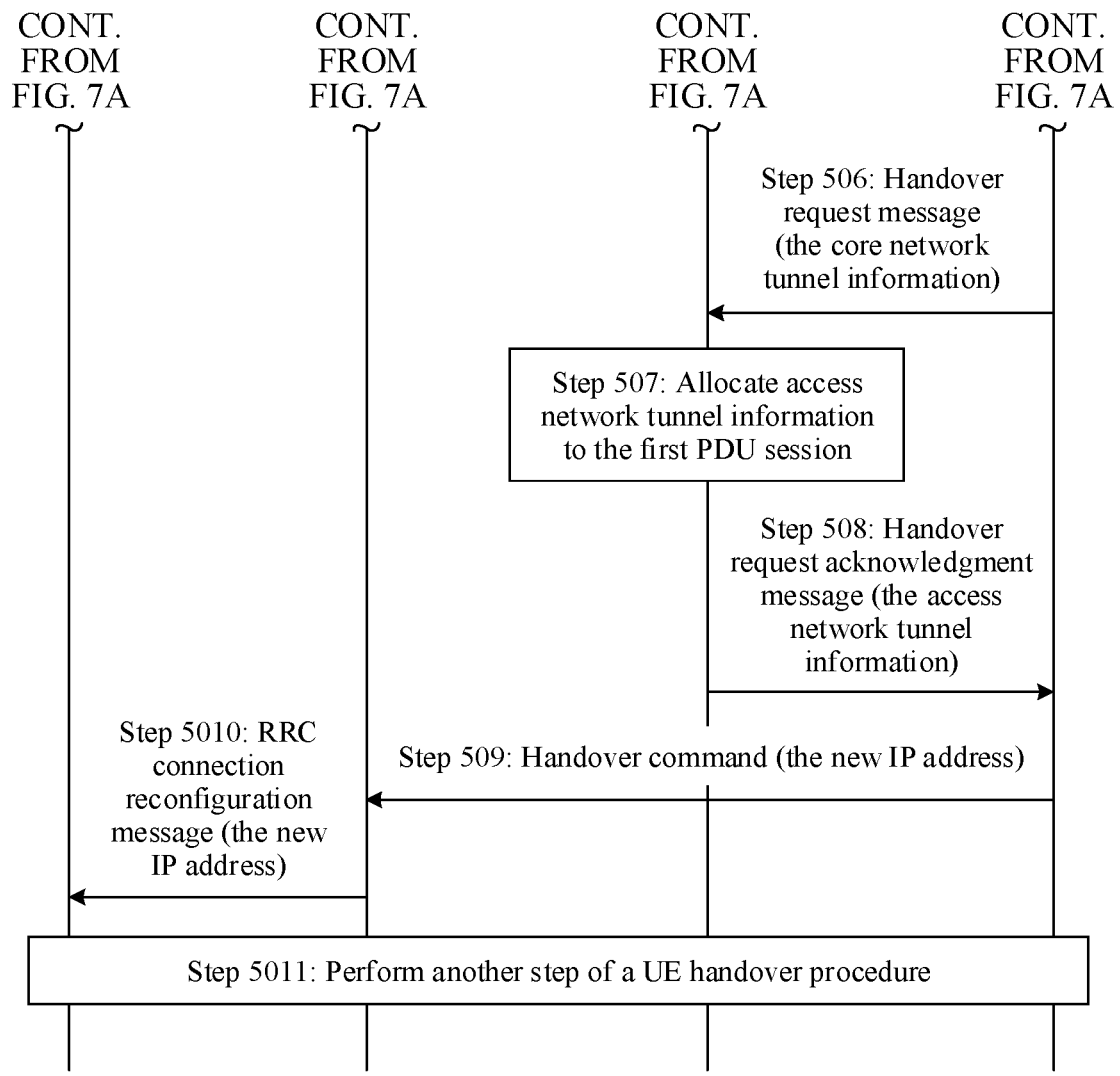

FIG. 7A and FIG. 7B are a schematic diagram of still another communication method according to an embodiment of this application. The method is applied to a scenario in which UE is handed over from a PNA 1 to a PNA 2. In the method shown in FIG. 7A and FIG. 7B, the PNA 1 is equivalent to the first network element in FIG. 2. The method includes the following steps.

Step 500*a* to step 503*a* in FIG. 7A and FIG. 7B are the same as step 100*a* to step 103*a* in FIG. 3A to FIG. 3C. For related descriptions in step 500*a* to step 503*a*, refer to the descriptions in step 100*a* to step 103*a*. Details are not described herein again. Step 503*b* in FIG. 7A and FIG. 7B is the same as step 403*b* in FIG. 6A and FIG. 6B. For descriptions in step 503*b*, refer to the descriptions in step 403*b*. Details are not described herein again. Step 504 in FIG. 7A and FIG. 7B is the same as step 104*b* in FIG. 3A to FIG. 3C. For related descriptions in step 504, refer to the descriptions in step 104*b*. Details are not described herein again. Step 505 in FIG. 7A and FIG. 7B is the same as step 405 in FIG. 6A and FIG. 6B. For related descriptions in step 505, refer to the descriptions in step 405. Details are not described herein again. Step 506 to step 508 in FIG. 7A and FIG. 7B are the same as step 106*b* to step 108*b* in FIG. 3A to FIG. 3C. For related descriptions in step 506 to step 508, refer to the descriptions in step 106*b* to step 108*b*. Details are not described herein again.

Step 509: The PNC sends a handover command to the PNA 1, where the handover command includes a new IP address allocated to a first PDU session after the first PDU session is handed over.

Step S010: The PNA 1 sends an RRC connection reconfiguration message to the UE, where the RRC connection reconfiguration message includes the new IP address, so that the new IP address of the first PDU session between the PNC and the UE is synchronized in time.

Step S011: Perform another step of a UE handover procedure.

According to the foregoing method, in the scenario in which the UE is handed over from the PNA 1 to the PNA 2, when it is determined that the PNA 2 does not support local offloading of a service corresponding to first service type information of the first PDU session, the first PDU session may be handed over from the PNA 1 to the PNC, so that a problem of a handover error occurs when the first PDU session is handed over to the PNA 2 that cannot process the session can be avoided, and a handover success rate can be improved. Further, the PNC may allocate the new IP address to the first PDU session, to avoid a case in which the first PDU session is unavailable because an old IP address is unavailable.

Figure 8A:
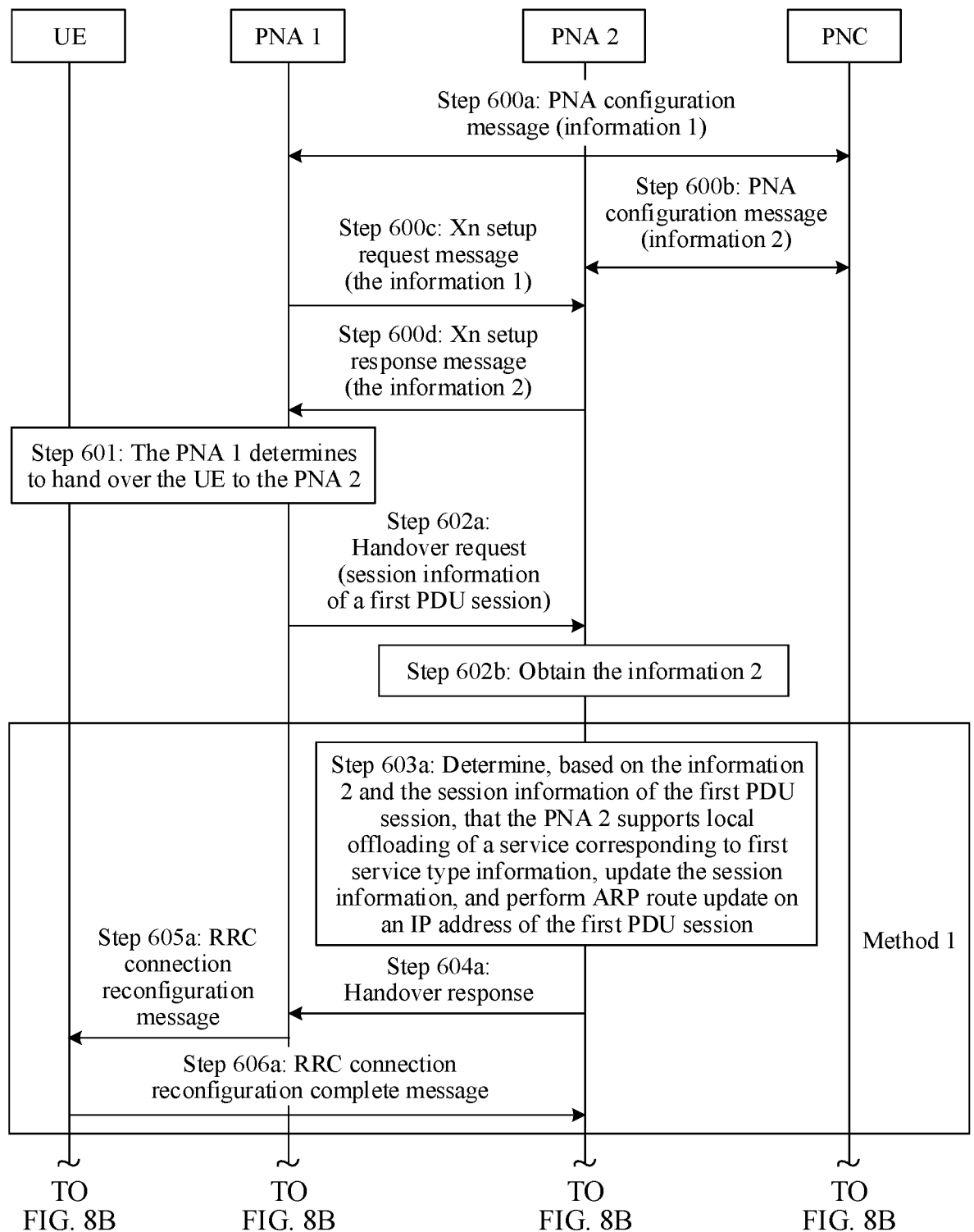
FIG. 8A and FIG. 8B are a schematic diagram of still another communication method according to an embodiment of this application.
Figure 8B:
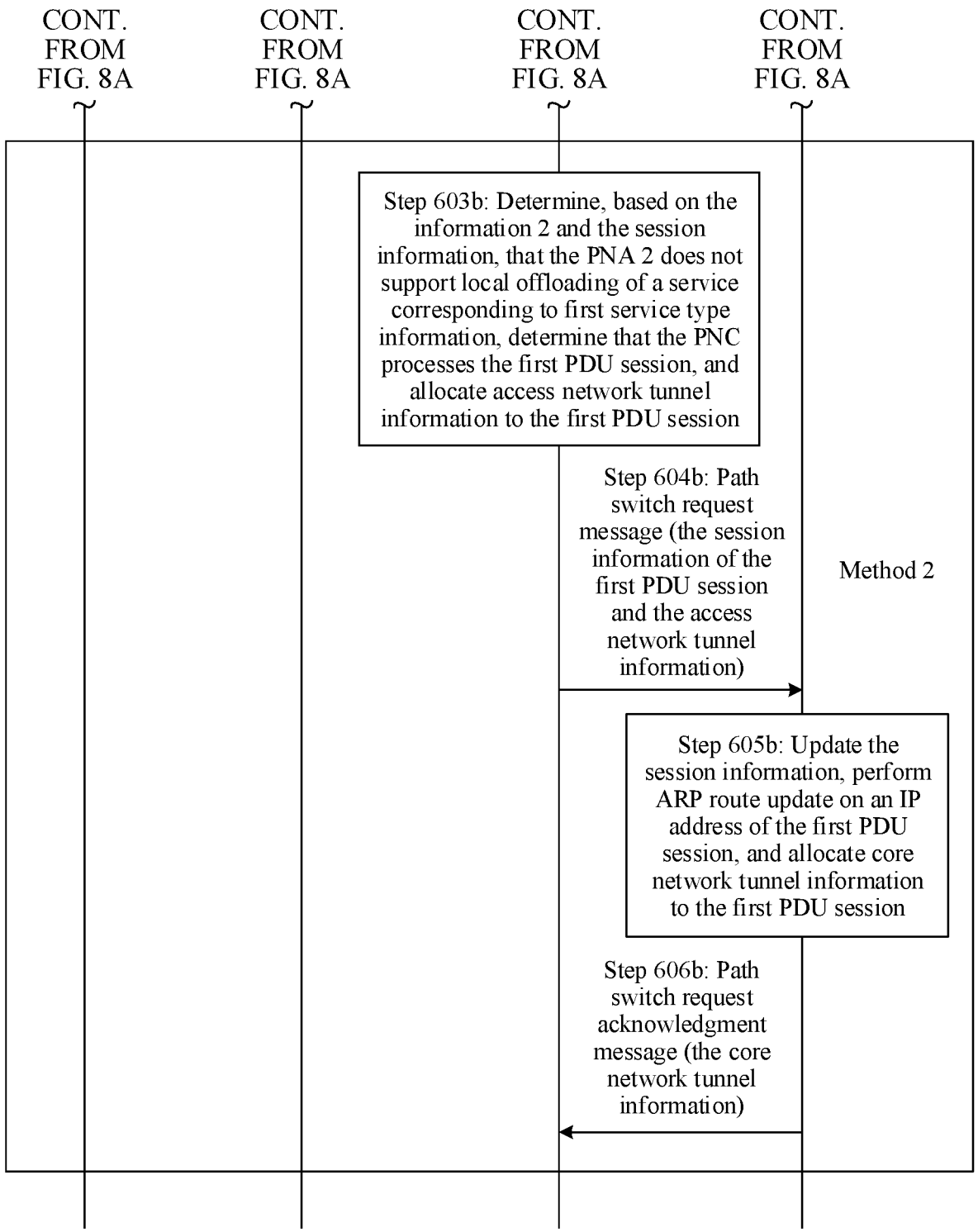

FIG. 8A and FIG. 8B are a schematic diagram of still another communication method according to an embodiment of this application. The method is applied to a scenario in which UE is handed over from a PNA 1 to a PNA 2. In the method shown in FIG. 8A and FIG. 8B, the PNA 2 is equivalent to the first network element in FIG. 2. The method includes the following steps.

Optionally, in a process of setting up an Xn interface connection between the PNA 1 and the PNA 2, the PNA 1 may send information 1 to the PNA 2 via an Xn setup request (Xn setup request) message, and the PNA 2 may send information 2 to the PNA 1 via an Xn setup response (Xn setup response) message. For details, refer to step 600*c* and step 600*d*. Meanings of the information 1 and the information 2 that appear in the specification are both consistent with the foregoing descriptions. Optionally, the information 1 about the PNA 1 may be configured by a PNC for the PNA 1. For details, refer to step 600*a*.

Step 602*a*: The PNA 1 sends a handover request (Xn HO request) to the PNA 2, where the handover request includes session information of a first PDU session. The session information of the first PDU session may be a whole set or a subset of context information of the first PDU session. In this step, the session information of the first PDU session includes first service type information and information other than the first service type information in the context information of the first PDU session. For example, the information other than the first service type information may include one or more of a UE identifier, a first PDU session identifier, a QoS parameter, and an IP address. In this example, the first PDU session is a session managed and controlled by the PNA 1 before the UE is handed over. That is, the first PDU session is a session locally routed from the PNA 1 before the UE is handed over.

Step 602*b*: The PNA 2 obtains the information 2. For example, the information 2 may be configured by the PNC for the PNA 2. For details, refer to step 600*b*. The information 2 may also be predefined. When the information 2 is predefined information, the PNA 2 may obtain the information 2 locally. It should be noted that a sequence of performing step 602*a* and step 602*b* is not limited in this application.

In this example, after obtaining the session information of the first PDU session and the information 2, the PNA 2 may determine, based on the information 2 and the session information of the first PDU session, whether the PNA 2 supports local offloading of a service corresponding to the first service type information. If the PNA 2 determines, based on the information 2 and the session information, that the PNA 2 supports the local offloading of the service corresponding to the first service type information, the PNA 2 determines that the PNA 2 processes the first PDU session. This corresponds to a method 1 in FIG. 8A and FIG. 8B. Refer to step 603*a* to step 606*a*. On the contrary, if the PNA 2 determines, based on the information 2 and the session information, that the PNA 2 does not support local offloading of a service corresponding to the first service type information, the PNA 2 determines that the PNC processes the first PDU session. This corresponds to a method 2 in FIG. 8A and FIG. 8B. Refer to step 603*b* to step 606*b*. It should be noted that, in this example, either the method 1 or the method 2 may be performed, or the method 1 and the method 2 may be performed in parallel. For example, the UE includes two PDU sessions that are a PDU session 1 and a PDU session 2. Session information of the PDU session 1 includes service type information 1, and session information of the PDU session 2 includes service type information 2. If the PNA 2 supports local offloading of services corresponding to the service type information 1 and the service type information 2, the method 1 is performed when the UE is handed over from the PNA 1 to the PNA 2. Alternatively, if the PNA 2 supports local offloading of a service corresponding to the service type information 1, and the PNA 2 does not support local offloading of a service corresponding to the service type information 2, the PNA 1 may perform the method 1 and the method 2 in parallel. Alternatively, if the PNA 2 does not support local offloading of services corresponding to the service type information 1 and the service type information 2, the method 2 is performed.

The method 1 is as follows.

Step 603*a*: The PNA 2 determines, based on the information 2 and the session information of the first PDU session, that the PNA 2 supports the local offloading of the service corresponding to the first service type information, and the PNA 2 may update the session information. For how to update the session information, refer to the foregoing descriptions. The PNA 2 may further perform ARP route update on the IP address of the first PDU session.

Step 604*a*: The PNA 2 sends a handover response (Xn HO response) to the PNA 1.

Step 605*a*: The PNA 1 sends an RRC connection reconfiguration message to the UE.

Step 606*a*: The UE sends an RRC connection reconfiguration complete message to the PNA 2. It may be understood as that the UE accesses the PNA 2 after performing step 606*a*.

According to the foregoing method 1, in the scenario in which the UE is handed over from the PNA 1 to the PNA 2, the session information of the first PDU session routed by the PNA 1 before handover may be sent to the PNA 2. Further, the PNA 2 determines whether the PNA 2 supports the local offloading of the service corresponding to the first service type information of the first PDU session. When it is determined that the PNA 2 supports the local offloading of the service corresponding to the first service type information of the first PDU session, the first PDU session may be handed over from the PNA 1 to the PNA 2. In this way, that the PNA 2 processes the first PDU session can achieve an objective of offloading from the PNC. This can not only reduce an end-to-end latency of a data service, but also reduce network pressure.

The method 2 is as follows.

Step 603*b*: The PNA 2 determines, based on the information 2 and the session information of the first PDU session, that the PNA 2 does not support the local offloading of the service corresponding to the first service type information, and the PNA 2 determines that the PNC processes the first PDU session, and may allocate access network tunnel information (AN tunnel info) to the first PDU session. For content included in the access network tunnel information, refer to the foregoing descriptions.

Step 604*b*: The PNA 2 sends a path switch request message to the PNC, where the path switch request message includes the session information of the first PDU session and the access network tunnel information. In addition, the message may further include an identifier of the PNA 2.

Step 605*b*: The PNC updates the session information, performs ARP route update on the IP address of the first PDU session, and allocates core network tunnel information (CN tunnel info) to the first PDU session, where for content included in the core network tunnel information, refer to the foregoing descriptions.

Optionally, before performing step 605*b*, the PNC may further determine, based on the pre-obtained information 2, the received session information of the first PDU session, and the identifier of the PNA 2, whether the PNA 2 supports the local offloading of the service corresponding to the first service type information. When determining that the PNA 2 does not support the local offloading of the service corresponding to the first service type information, the PNC performs step 605*b*; or when determining that the PNA 2 supports the local offloading of the service corresponding to the first service type information, the PNC may send the session information of the first PDU session to the PNA 2. For a processing procedure of the PNA 2, refer to the foregoing descriptions.

Step 606b: The PNC sends a path switch request acknowledgment (path switch request ack) message to the PNA 2, where the path switch request acknowledgment message includes the core network tunnel information. In addition, the PNC may further perform another step of handover. The another step is not shown in FIG. 8A and FIG. 8B.

According to the foregoing method 2, in the scenario in which the UE is handed over from the PNA 1 to the PNA 2, the session information of the first PDU session routed by the PNA 1 before handover may be sent to the PNA 2. Further, the PNA 2 determines whether the PNA 2 supports the local offloading of the service corresponding to the first service type information of the first PDU session. When it is determined that the PNA 2 does not support the local offloading of the service corresponding to the first service type information of the first PDU session, the first PDU session may be handed over from the PNA 1 to the PNC, so that a problem of a handover error occurs when the first PDU session is handed over to the PNA 2 that cannot process the session can be avoided, and a handover success rate can be improved.

Figure 9A:
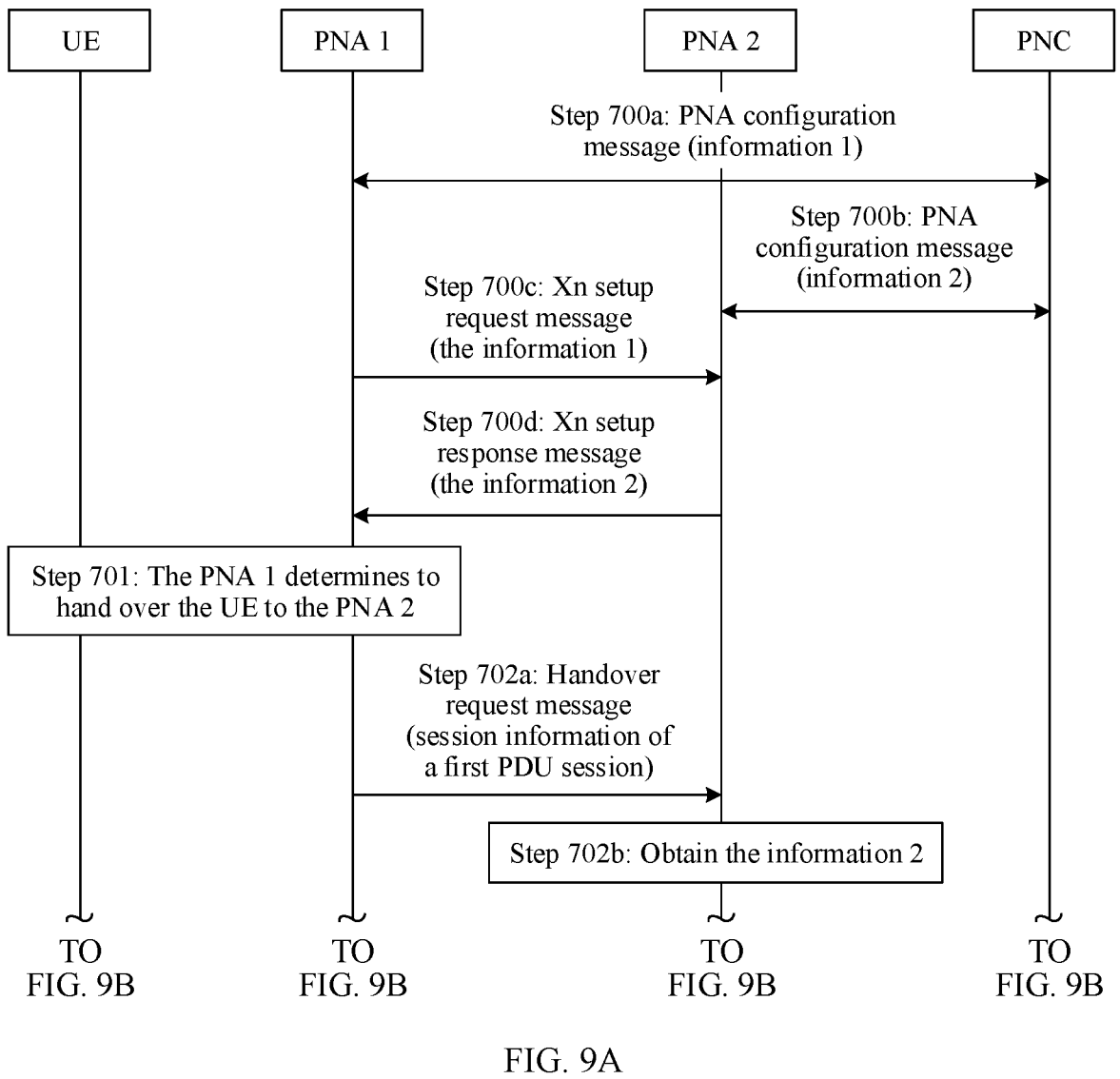
FIG. 9A to FIG. 9C are a schematic diagram of still another communication method according to an embodiment of this application.
Figure 9B:
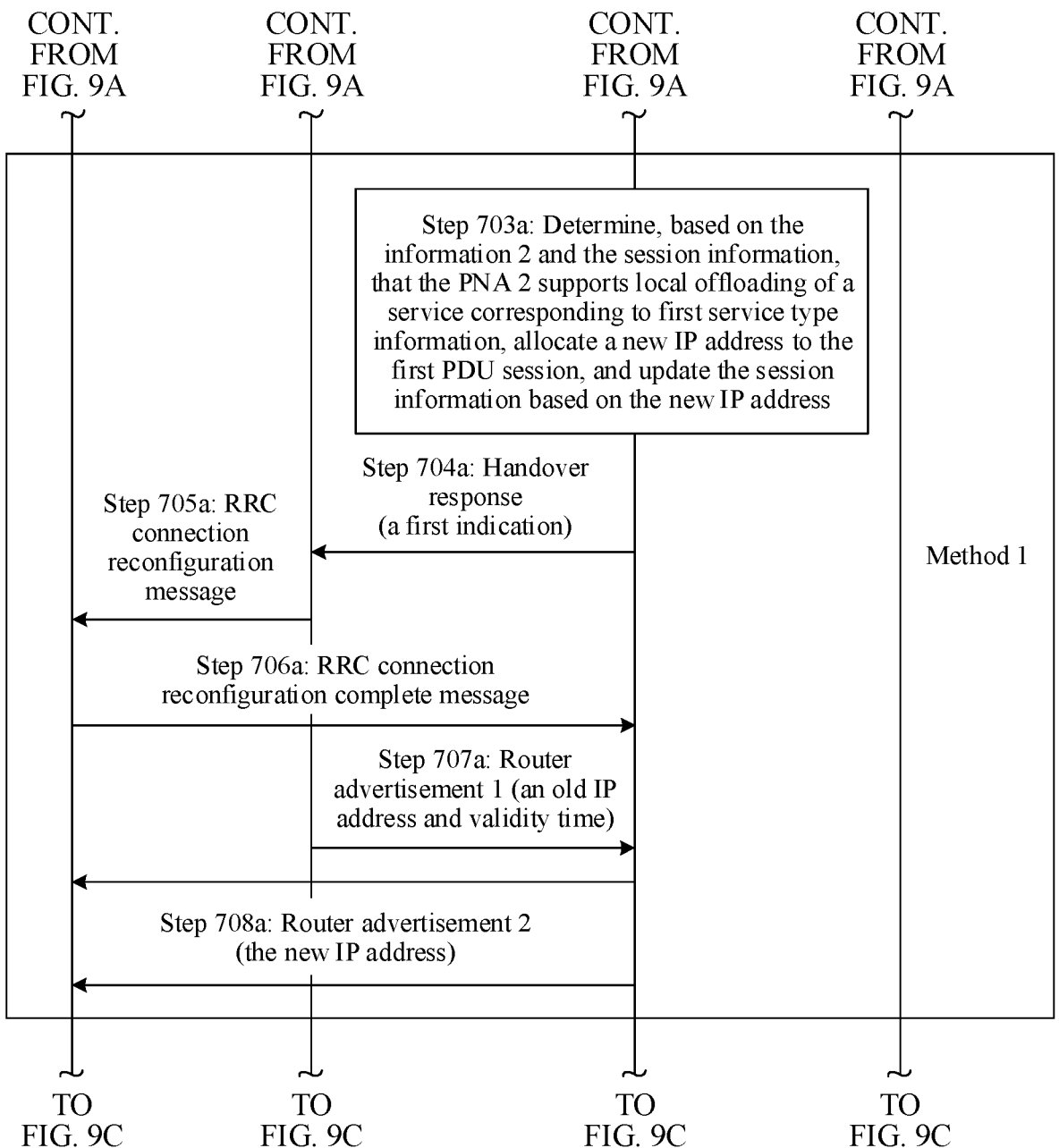
Figure 9C:
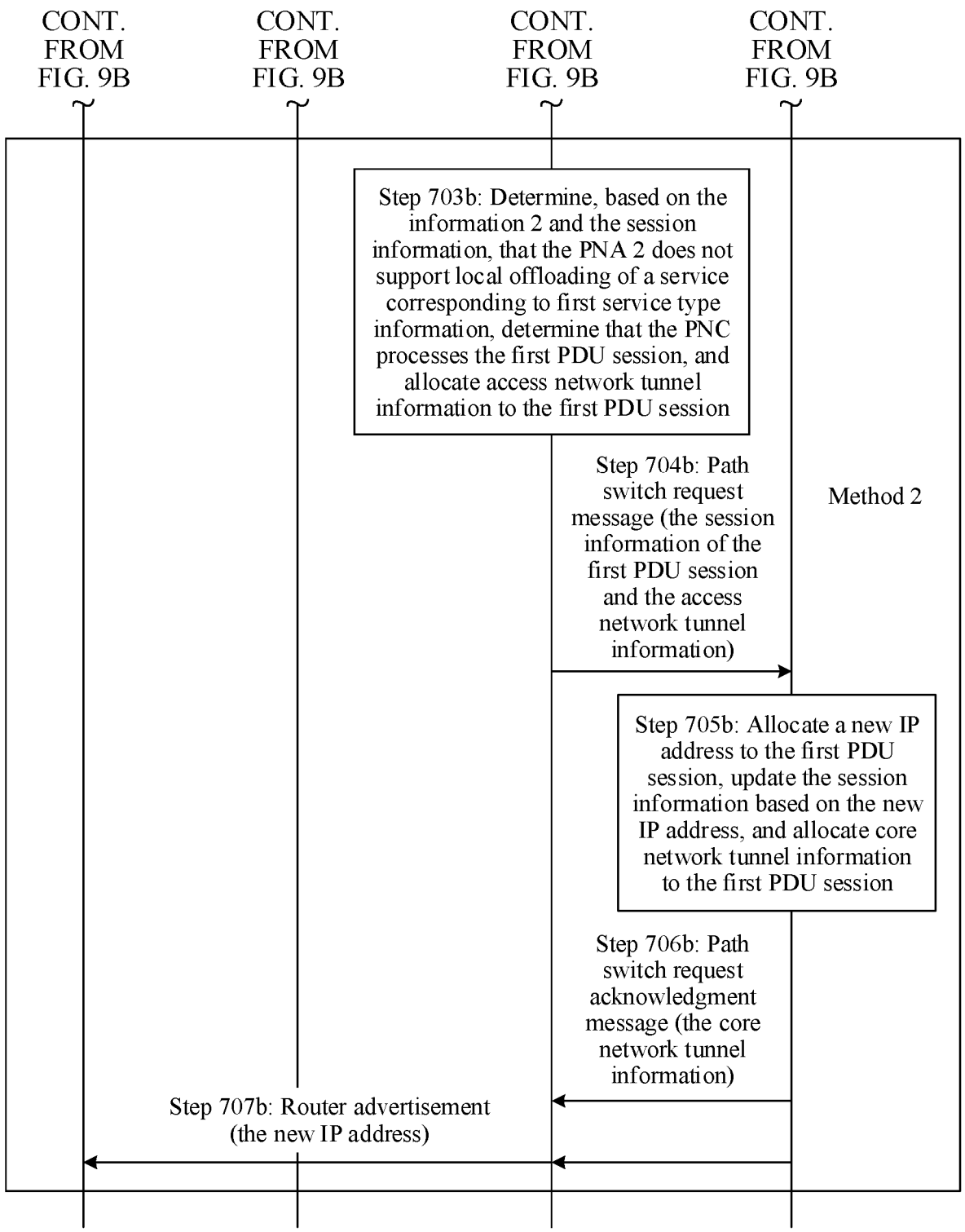

FIG. 9A to FIG. 9C are a schematic diagram of still another communication method according to an embodiment of this application. The method is applied to a scenario in which UE is handed over from a PNA 1 to a PNA 2. In the method shown in FIG. 9A to FIG. 9C, the PNA 2 is equivalent to the first network element in FIG. 2. The method includes the following steps.

Step 700a to step 702b in FIG. 9A to FIG. 9C are the same as step 600a to step 602b in FIG. 8A and FIG. 8B. For related descriptions in step 700a to step 702b, refer to the descriptions in step 600a to step 602b. Details are not described herein again.

In this example, after obtaining session information of a first PDU session and information 2, the PNA 2 may determine, based on the information 2 and the session information of the first PDU session, whether the PNA 2 supports local offloading of a service corresponding to first service type information. If the PNA 2 determines that the PNA 2 supports the local offloading of the service corresponding to the first service type information, the PNA 2 determines that the PNA 2 processes the first PDU session. This corresponds to a method 1 in FIG. 9A to FIG. 9C. Refer to step 703a to step 708a. On the contrary, if the PNA 2 determines that the PNA 2 does not support the local offloading of the service corresponding to the first service type information, the PNA 2 determines that a PNC processes the first PDU session. This corresponds to a method 2 in FIG. 9A to FIG. 9C. Refer to step 703b to step 707b. It should be noted that, in this example, either the method 1 or the method 2 may be performed, or the method 1 and the method 2 may be performed in parallel. For a case in which either the method 1 or the method 2 may be performed and a case in which the method 1 and the method 2 may be performed in parallel, refer to the related descriptions in FIG. 8A and FIG. 8B.

The method 1 is as follows.

Step 703a: The PNA 2 determines, based on the information 2 and the session information of the first PDU session, that the PNA 2 supports the local offloading of the service corresponding to the first service type information, and the PNA 2 may update the session information. For example, the PNA 2 may allocate a new IP address to the first PDU session, and update the session information based on the new IP address. For details about how to update the session information, refer to the foregoing descriptions.

Step 704a: The PNA 2 sends a handover response (Xn HO response) to the PNA 1. Optionally, the Xn HO response may carry a first indication, and the first indication is used to indicate that the new IP address has been allocated to the first PDU session.

Step 705a and step 706a are the same as step 605a and step 606a in FIG. 8A and FIG. 8B. For related descriptions in step 705a and step 706a, refer to the foregoing descriptions in step 605a and step 606a. Step 707a and step 708a are the same as step 209a and step 209b. For descriptions in step 707a and step 708a, refer to the descriptions in step 209a and step 209b.

According to the foregoing method 1, in the scenario in which the UE is handed over from the PNA 1 to the PNA 2, the session information of the first PDU session routed by the PNA 1 before handover may be sent to the PNA 2. Further, the PNA 2 determines whether the PNA 2 supports the local offloading of the service corresponding to the first service type information of the first PDU session. When it is determined that the PNA 2 supports the local offloading of the service corresponding to the first service type information of the first PDU session, the first PDU session may be handed over from the PNA 1 to the PNA 2. In this way, that the PNA 2 processes the first PDU session can achieve an objective of offloading from the PNC. This can not only reduce an end-to-end latency of a data service, but also reduce network pressure. Further, the PNA 2 may allocate the new IP address to the first PDU session, to avoid a case in which the first PDU session is unavailable because an old IP address is unavailable.

The method 2 is as follows.

Step 703b and step 704b are the same as step 603b and step 604b. For descriptions in step 703b and step 704b, refer to the descriptions in step 603b and step 604b.

Step 705b: The PNC updates the session information, for example, allocates a new IP address to the first PDU session, and updates the session information based on the new IP address. For details about how to update the session information, refer to the foregoing descriptions. In addition, the PNC allocates core network tunnel information (CN tunnel info) to the first PDU session.

Optionally, before performing step 705b, the PNC may further determine, based on the pre-obtained information 2, the received session information of the first PDU session, and an identifier of the PNA 2, whether the PNA 2 supports the local offloading of the service corresponding to the first service type information. When determining that the PNA 2 does not support the local offloading of the service corresponding to the first service type information, the PNC performs step 705b; or when determining that the PNA 2 supports the local offloading of the service corresponding to the first service type information, the PNC may send the session information of the first PDU session to the PNA 2. For a processing procedure of the PNA 2, refer to the foregoing descriptions.

Step 706b is the same as step 606b. For descriptions in step 706b, refer to the descriptions in step 606b.

Step 707b: The PNC may send a router advertisement to the UE through the PNA 2, to notify the UE of the new IP address. For example, the PNC sends the router advertisement carrying the new IP address to the PNA 2, and the PNA 2 forwards the router advertisement to the UE after receiving the router advertisement. In addition, the PNC may further perform another step of handover. The another step is not shown in FIG. 9A to FIG. 9C.

According to the foregoing method 2, in the scenario in which the UE is handed over from the PNA 1 to the PNA 2, the session information of the first PDU session routed by the PNA 1 before handover may be sent to the PNA 2. Further, the PNA 2 determines whether the PNA 2 supports the local offloading of the service corresponding to the first service type information of the first PDU session. When it is determined that the PNA 2 does not support the local offloading of the service corresponding to the first service type information of the first PDU session, the first PDU session may be handed over from the PNA 1 to the PNC, so that a problem of a handover error occurs when the first PDU session is handed over to the PNA 2 that cannot process the session can be avoided, and a handover success rate can be improved. Further, the PNC may allocate the new IP address to the first PDU session, to avoid a case in which the first PDU session is unavailable because an old IP address is unavailable.

Figure 10A:
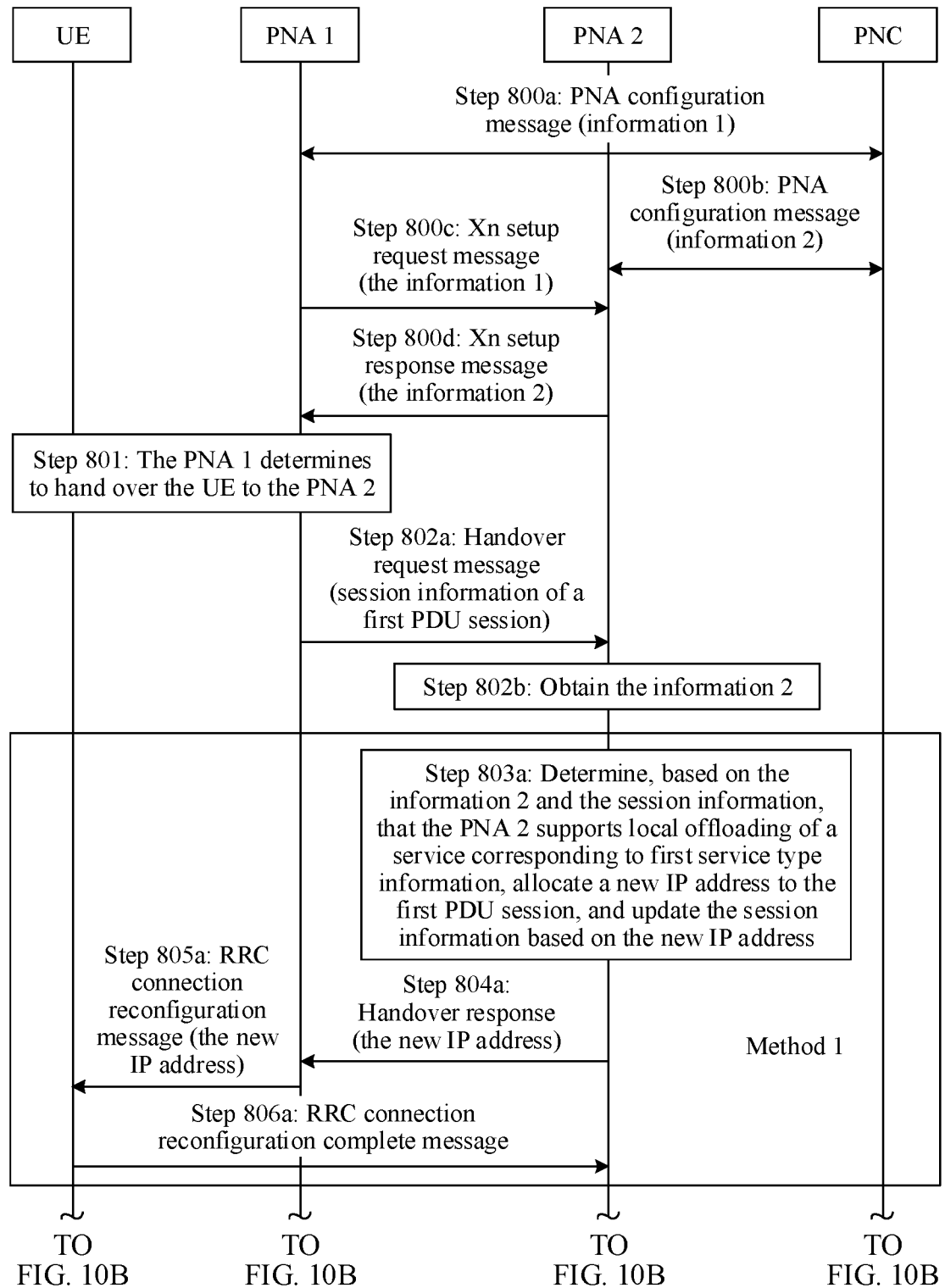
FIG. 10A and FIG. 10B are a schematic diagram of still another communication method according to an embodiment of this application.
Figure 10B:
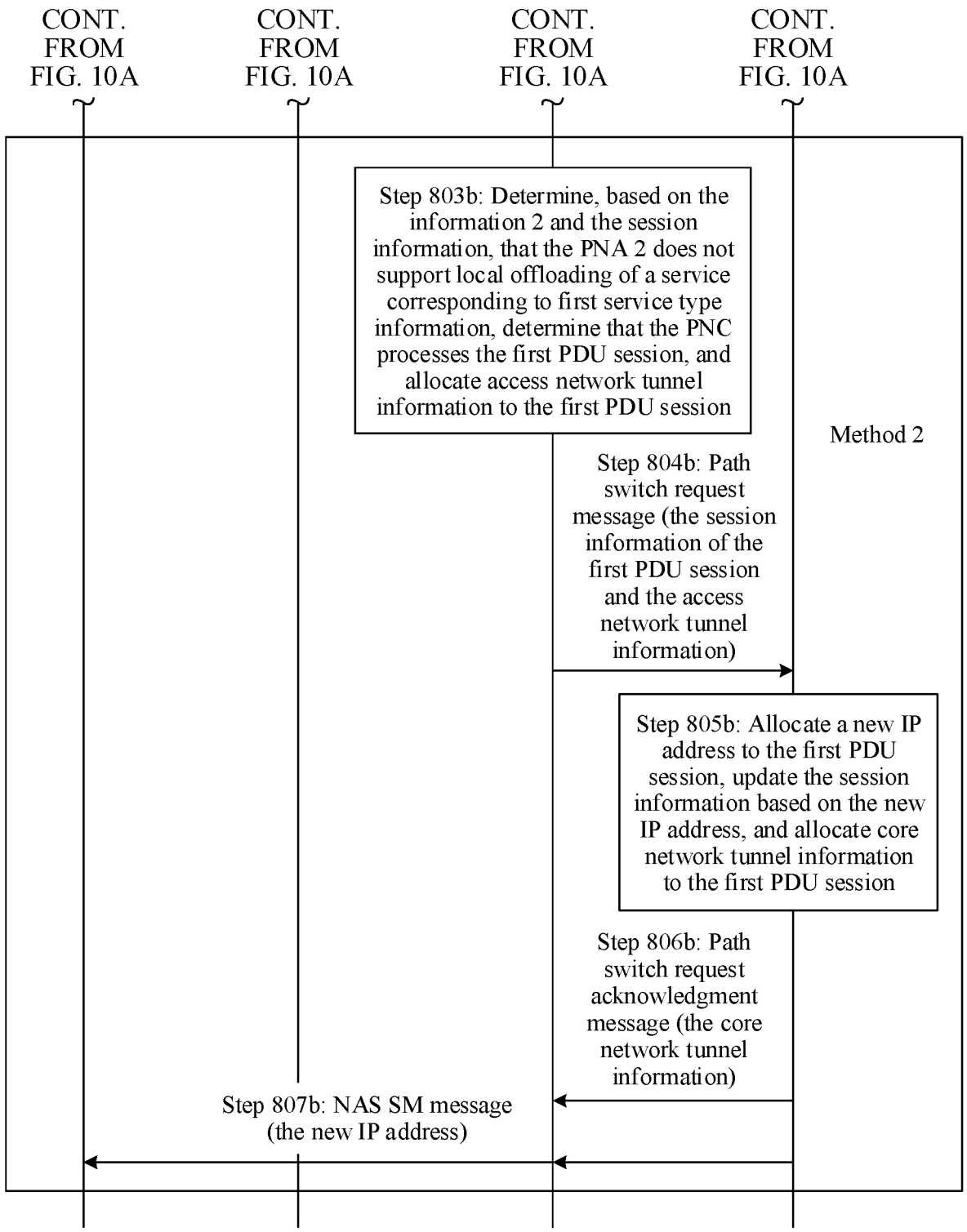

FIG. 10A and FIG. 10B are a schematic diagram of still another communication method according to an embodiment of this application. The method is applied to a scenario in which UE is handed over from a PNA 1 to a PNA 2. In the method shown in FIG. 10A and FIG. 10B, the PNA 2 is equivalent to the first network element in FIG. 2. The method includes the following steps.

Step 800a to step 802b in FIG. 10A and FIG. 10B are the same as step 600a to step 602b in FIG. 8A and FIG. 8B. For related descriptions in step 800a to step 802b, refer to the descriptions in step 600a to step 602b. Details are not described herein again.

In this example, after obtaining session information of a first PDU session and information 2, the PNA 2 may determine, based on the information 2 and the session information of the first PDU session, whether the PNA 2 supports local offloading of a service corresponding to first service type information. If the PNA 2 determines that the PNA 2 supports the local offloading of the service corresponding to the first service type information, the PNA 2 determines that the PNA 2 processes the first PDU session. This corresponds to a method 1 in FIG. 10A and FIG. 10B. Refer to step 803a to step 806a. On the contrary, if the PNA 2 determines that the PNA 2 does not support the local offloading of the service corresponding to the first service type information, the PNA 2 determines that a PNC processes the first PDU session. This corresponds to a method 2 in FIG. 10A and FIG. 10B. Refer to step 803b to step 807b. It should be noted that, in this example, either the method 1 or the method 2 may be performed, or the method 1 and the method 2 may be performed in parallel. For a case in which either the method 1 or the method 2 may be performed and a case in which the method 1 and the method 2 may be performed in parallel, refer to the related descriptions in FIG. 8A and FIG. 8B.

The method 1 is as follows.

Step 803a is the same as step 703a. For descriptions in step 803a, refer to the descriptions in step 703a.

Step 804a: The PNA 2 sends an Xn HO response to the PNA 1, where the Xn HO response includes a new IP address allocated to the first PDU session after the first PDU session is handed over.

Step 805a: The PNA 1 sends an RRC connection reconfiguration message to the UE, where the RRC connection reconfiguration message includes the new IP address.

Step 806a: The UE sends an RRC connection reconfiguration complete message to the PNA 2. It may be understood as that the UE accesses the PNA 2 after performing step 806a.

According to the foregoing method 1, in the scenario in which the UE is handed over from the PNA 1 to the PNA 2, when it is determined that the PNA 2 supports the local offloading of the service corresponding to the first service type information of the first PDU session, the first PDU session may be handed over from the PNA 1 to the PNA 2. In this way, that the PNA 2 processes the first PDU session can achieve an objective of offloading from the PNC. This can not only reduce an end-to-end latency of a data service, but also reduce network pressure. Further, the PNA 2 may allocate the new IP address to the first PDU session, to avoid a case in which the first PDU session is unavailable because an old IP address is unavailable.

The method 2 is as follows.

Step 803b and step 804b are the same as step 603b and step 604b. For descriptions in step 803b and step 804b, refer to the descriptions in step 603b and step 604b. Step 805b and step 806b are the same as step 705b and step 706b. For descriptions in step 805b and step 806b, refer to the foregoing descriptions in step 705b and step 706b.

Step 807b: The PNC may send, to the UE through the PNA 2, a NAS SM message that carries a new IP address, to notify the UE of the new IP address of the first PDU session. For example, the PNC sends the NAS SM message to the PNA 2, and the PNA 2 forwards the NAS SM message to the UE after receiving the NAS SM message.

According to the foregoing method 2, in the scenario in which the UE is handed over from the PNA 1 to the PNA 2, when it is determined that the PNA 2 does not support the local offloading of the service corresponding to the first service type information of the first PDU session, the first PDU session may be handed over from the PNA 1 to the PNC, so that a problem of a handover error occurs when the first PDU session is handed over to the PNA 2 that cannot process the session can be avoided, and a handover success rate can be improved. Further, the PNC may allocate the new IP address to the first PDU session, to avoid a case in which the first PDU session is unavailable because an old IP address is unavailable.

Figure 11A:
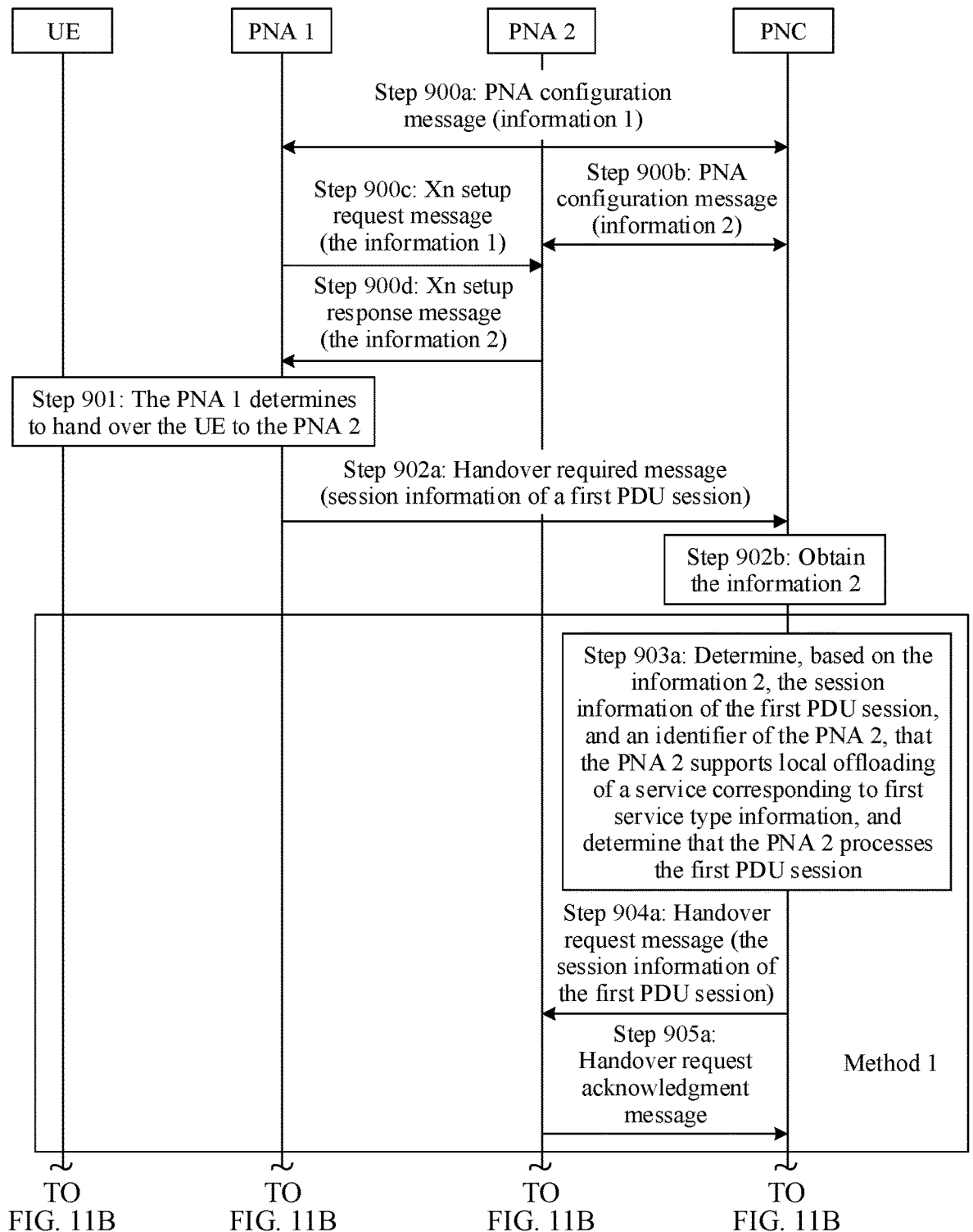
FIG. 11A and FIG. 11B are a schematic diagram of still another communication method according to an embodiment of this application.
Figure 11B:
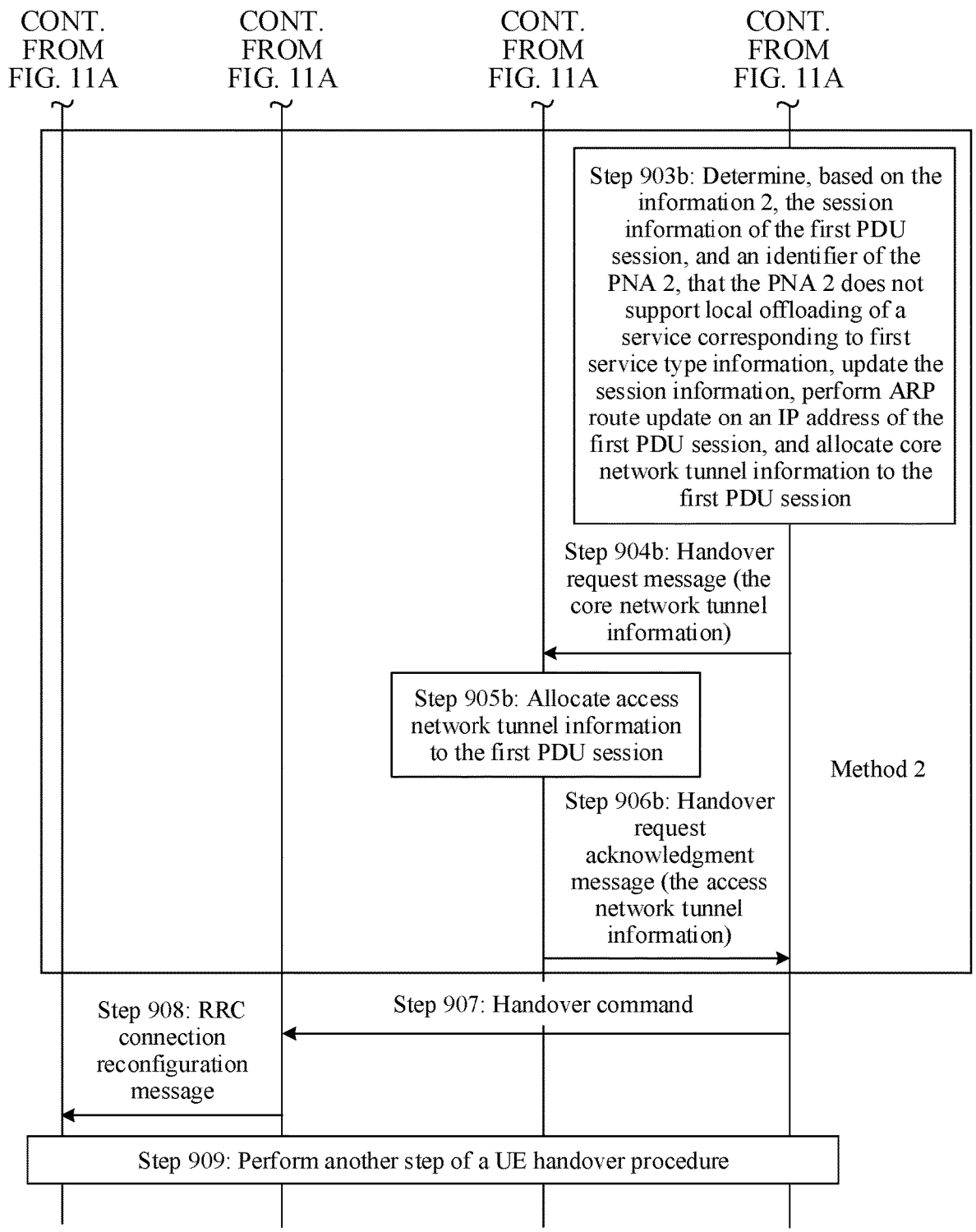

FIG. 11A and FIG. 11B are a schematic diagram of still another communication method according to an embodiment of this application. The method is applied to a scenario in which UE is handed over from a PNA 1 to a PNA 2. In the method shown in FIG. 11A and FIG. 11B, a PNC is equivalent to the first network element in FIG. 2. The method includes the following steps.

Optionally, the PNC may respectively configure information 1 and information 2 for the PNA 1 and the PNA 2 by using PNA configuration messages. For details, refer to step 900a and step 900b.

Optionally, in a process of setting up an Xn interface connection between the PNA 1 and the PNA 2, the PNA 1 may send the information 1 to the PNA 2 via an Xn setup request (Xn setup request) message, and the PNA 2 may send the information 2 to the PNA 1 via an Xn setup response (Xn setup response) message. For details, refer to step 900c and step 900d.

Step 901: The PNA 1 determines to hand over the UE to the PNA 2.

Step 902a: The PNA 1 sends a handover required message (N2 HO required) to the PNC, where the handover required message includes session information of a first PDU session. The session information of the first PDU session may be a whole set or a subset of context information of the first PDU session. The session information of the first PDU session includes first service type information and information other than the first service type information in the context information of the first PDU session. For example, the information other than the first service type information may include one or more of a UE identifier, a first PDU session identifier, a QoS parameter, and an IP address. In this example, the first PDU session is a session managed and controlled by the PNA 1 before the UE is handed over. In addition, the N2 HO required may further include an identifier of the PNA 2.

Step 902b: The PNC obtains the information 2. For example, the PNC may obtain the information 2 from the PNA 2, or the information 2 may be predefined. When the information 2 is predefined information, the PNC may obtain the information 2 locally.

In this example, after obtaining the session information of the first PDU session and the information 2, the PNC may determine, based on the information 2 and the session information of the first PDU session, whether the PNA 2 supports local offloading of a service corresponding to the first service type information. If the PNC determines that the PNA 2 supports the local offloading of the service corresponding to the first service type information, the PNC determines that the PNA 2 processes the first PDU session. This corresponds to a method 1 in FIG. 11A and FIG. 11B. Refer to step 903a to step 905a and step 907 to step 909. On the contrary, if the PNC determines that the PNA 2 does not support the local offloading of the service corresponding to the first service type information, the PNC determines that the PNC processes the first PDU session. This corresponds to a method 2 in FIG. 11A and FIG. 11B. Refer to step 903b to step 906b and step 907 to step 909. It should be noted that, in this example, either the method 1 or the method 2 may be performed, or the method 1 and the method 2 may be performed in parallel. For example, the UE includes two PDU sessions that are a PDU session 1 and a PDU session 2. Session information of the PDU session 1 includes service type information 1, and session information of the PDU session 2 includes service type information 2. If the PNA 2 supports local offloading of services corresponding to the service type information 1 and the service type information 2, the method 1 is performed. Alternatively, if the PNA 2 supports local offloading of a service corresponding to the service type information 1, and does not support local offloading of a service corresponding to the service type information 2, the method 1 and the method 2 may be performed in parallel. Alternatively, if the PNA 2 does not support local offloading of services corresponding to the service type information 1 and the service type information 2, the method 2 is performed.

The method 1 is as follows.

Step 903a: The PNC determines, based on the information 2, the session information of the first PDU session, and the identifier of the PNA 2, that the PNA 2 supports the local offloading of the service corresponding to the first service type information, and the PNC determines that the PNA 2 processes the first PDU session.

Step 904a: The PNC sends a handover request message to the PNA 2, where the handover request message includes the session information of the first PDU session. For a processing procedure after the PNA 2 receives the session information of the first PDU session, refer to the foregoing descriptions. Details are not described again.

Step 905a: The PNA 2 sends a handover request acknowledgment message to the PNC. In addition, another step of handover may be further performed. The another step is not shown in FIG. 11A and FIG. 11B.

According to the foregoing method 1, the first PDU session may be handed over to the PNA 2. In this way, that the PNA 2 processes the first PDU session can achieve an objective of offloading from the PNC. This can not only reduce an end-to-end latency of a data service, but also reduce network pressure.

The method 2 is as follows.

Step 903b: The PNC determines, based on the information 2, the session information of the first PDU session, and the identifier of the PNA 2, that the PNA 2 does not support the local offloading of the service corresponding to the first service type information, and the PNC updates the session information, performs ARP route update on the IP address of the first PDU session, and allocates core network tunnel information (CN tunnel info) to the first PDU session. For content included in the core network tunnel information, refer to the foregoing descriptions.

Step 904b: The PNC sends a handover request message to the PNA 2, where the handover request message includes the core network tunnel information. The handover request messages in step 904a and step 904b may be a same message.

Step 905b: The PNA 2 allocates access network tunnel information (AN tunnel info) to the first PDU session.

Step 906b: The PNA 2 sends a handover request acknowledgment message to the PNC, where the handover request acknowledgment message includes the AN tunnel info.

In this example, the following steps are applicable to both the method 1 and the method 2.

Step 907: The PNC sends a handover command to the PNA 1.

Step 908: The PNA 1 sends an RRC connection reconfiguration message to the UE.

Step 909: Perform another step of a UE handover procedure.

According to the foregoing method 2, the first PDU session may be handed over to the PNC, so that a problem of a handover error occurs when the first PDU session is handed over to the PNA 2 that cannot process the session can be avoided, and a handover success rate can be improved.

Figure 12A:
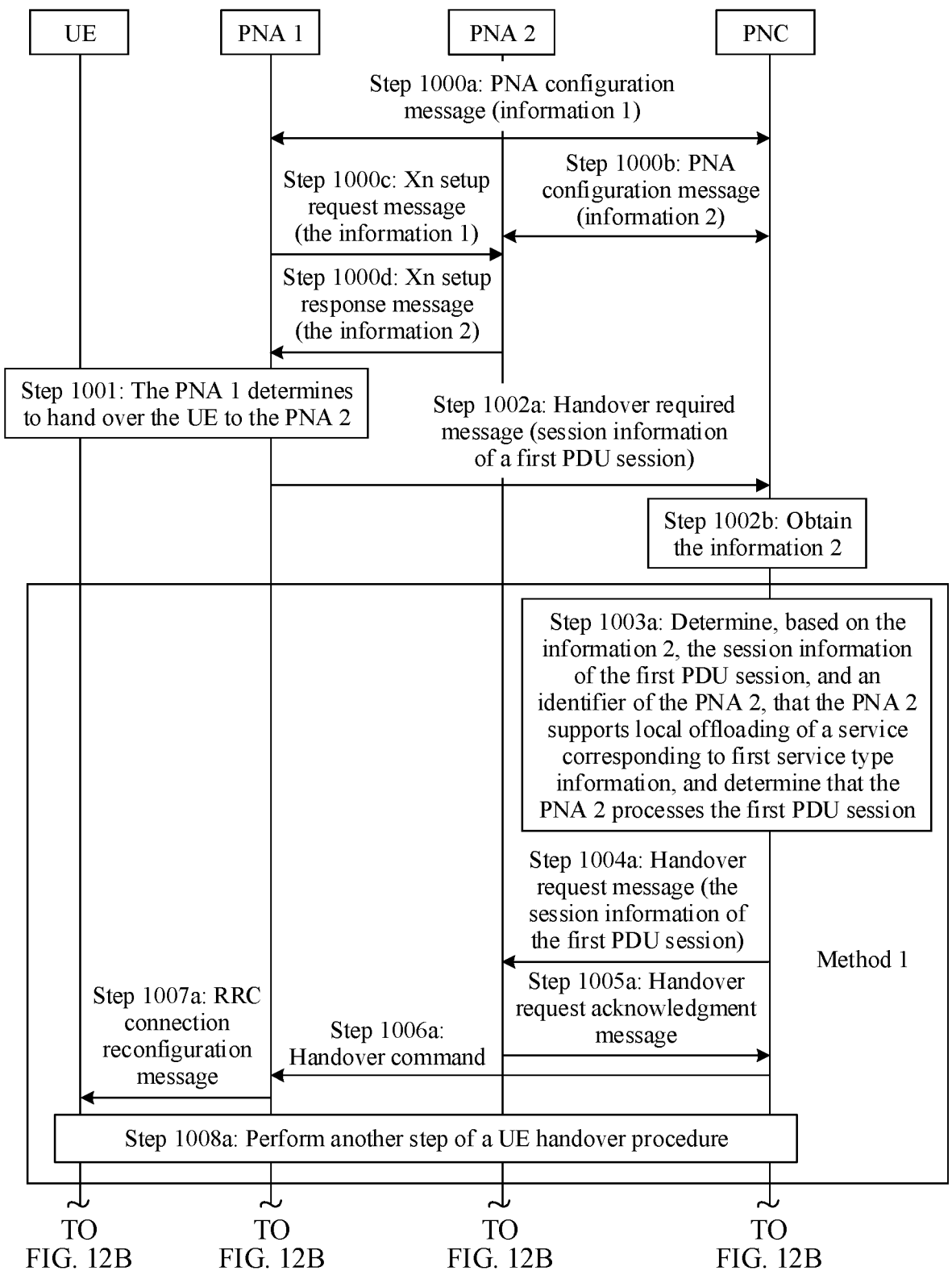
FIG. 12A and FIG. 12B are a schematic diagram of still another communication method according to an embodiment of this application.
Figure 12B:
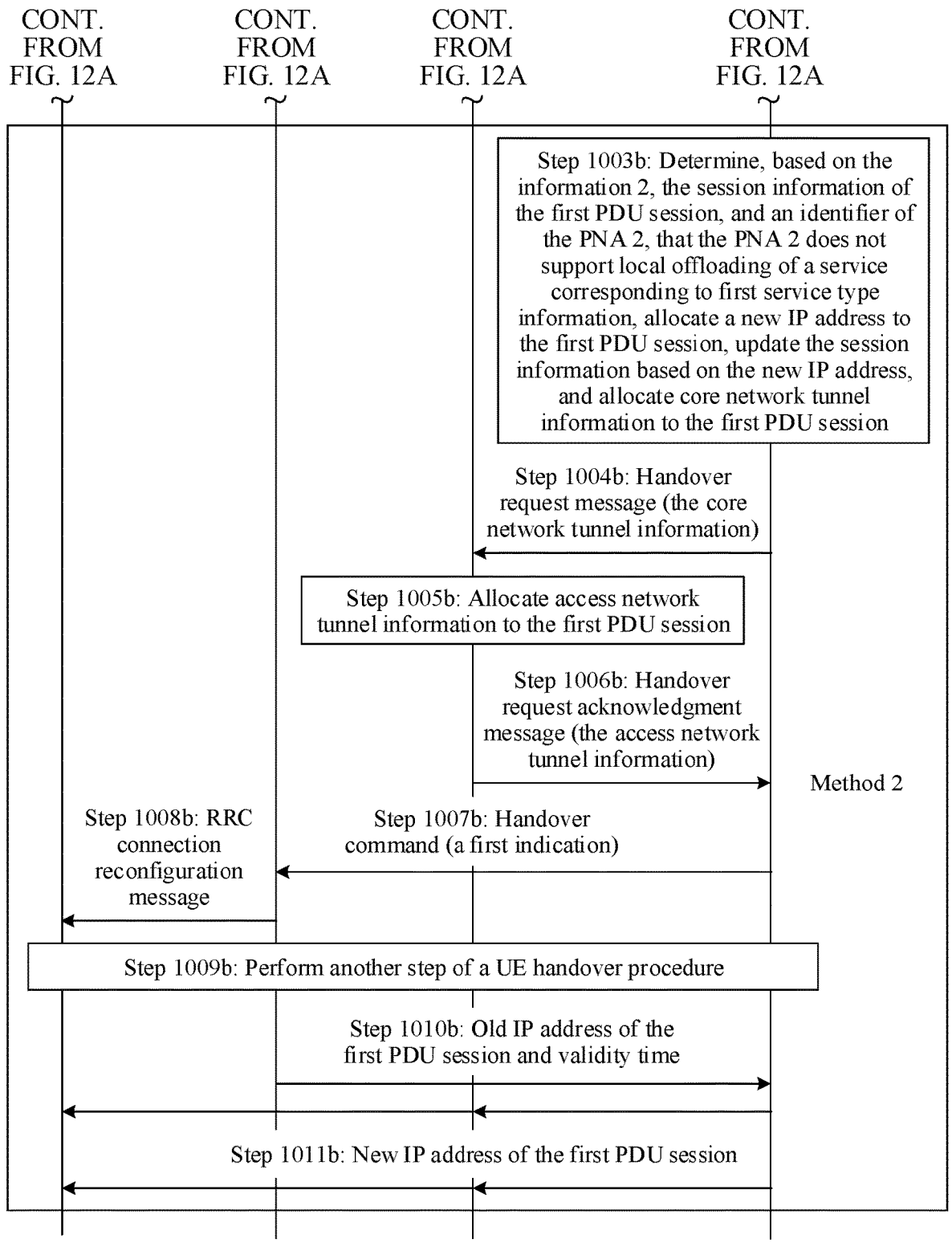

FIG. 12A and FIG. 12B are a schematic diagram of still another communication method according to an embodiment of this application. The method is applied to a scenario in which UE is handed over from a PNA 1 to a PNA 2. In the method shown in FIG. 12A and FIG. 12B, a PNC is equivalent to the first network element in FIG. 2. The method includes the following steps.

Step 1000a to step 1002b in FIG. 12A and FIG. 12B are the same as step 900a to step 902b in FIG. 11A and FIG. 11B. For related descriptions in step 1000a to step 1002b, refer to the descriptions in step 900a to step 902b. Details are not described herein again.

In this example, after obtaining session information of a first PDU session and information 2, the PNC may determine, based on the information 2 and the session information of the first PDU session, whether the PNA 2 supports local offloading of a service corresponding to first service type information. If the PNC determines that the PNA 2 supports the local offloading of the service corresponding to the first service type information, the PNC determines that the PNA 2 processes the first PDU session. This corresponds to a method 1 in FIG. 12A and FIG. 12B. Same steps are performed in a method 1 in FIG. 12A and FIG. 12B and the method 1 in FIG. 11A and FIG. 11B. For details, refer to the foregoing descriptions. On the contrary, if the PNC determines that the PNA 2 does not support the local offloading of the service corresponding to the first service type information, the PNC determines that the PNC processes the first PDU session. This corresponds to a method 2 in FIG. 12A and FIG. 12B. Refer to step 1003*b* to step 1011*b*.

The method 2 in this example is as follows.

Step 1003*b*: The PNC determines, based on the information 2, the session information of the first PDU session, and an identifier of the PNA 2, that the PNA 2 does not support the local offloading of the service corresponding to the first service type information, and the PNC updates the session information. The PNC updates the session information, for example, allocates a new IP address to the first PDU session, and updates the session information based on the new IP address. In addition, the PNC allocates CN tunnel info to the first PDU session.

Step 1004*b* to step 1006*b* are the same as step 904*b* to step 906*b*. For related descriptions in step 1004*b* to step 1006*b*, refer to the descriptions in step 904*b* to step 906*b*.

Step 1007*b*: The PNC sends a handover command to the PNA 1, where the handover command carries a first indication, and the first indication is used to indicate that the new IP address has been allocated to the first PDU session.

Step 1008*b*: The PNA 1 sends an RRC connection reconfiguration message to the UE.

Step 1009*b*: Perform another step of a UE handover procedure. For example, the another step may include: sending, by the UE, an RRC connection reconfiguration complete message to the PNA 2. After the another step of the UE handover procedure is performed, the UE accesses the PNA 2.

Step 1010*b* and step 1011*b* are the same as step 4012*a* and step 4012*b*. For descriptions in step 1010*b* and step 1011*b*, refer to the descriptions in step 4012*a* and step 4012*b*. Details are not described herein again.

According to the foregoing method 2, the first PDU session may be handed over to the PNC, so that a problem of a handover error occurs when the first PDU session is handed over to the PNA 2 that cannot process the session can be avoided, and a handover success rate can be improved. Further, the PNC may allocate the new IP address to the first PDU session, to avoid a case in which the first PDU session is unavailable because an old IP address is unavailable.

Figure 13A:
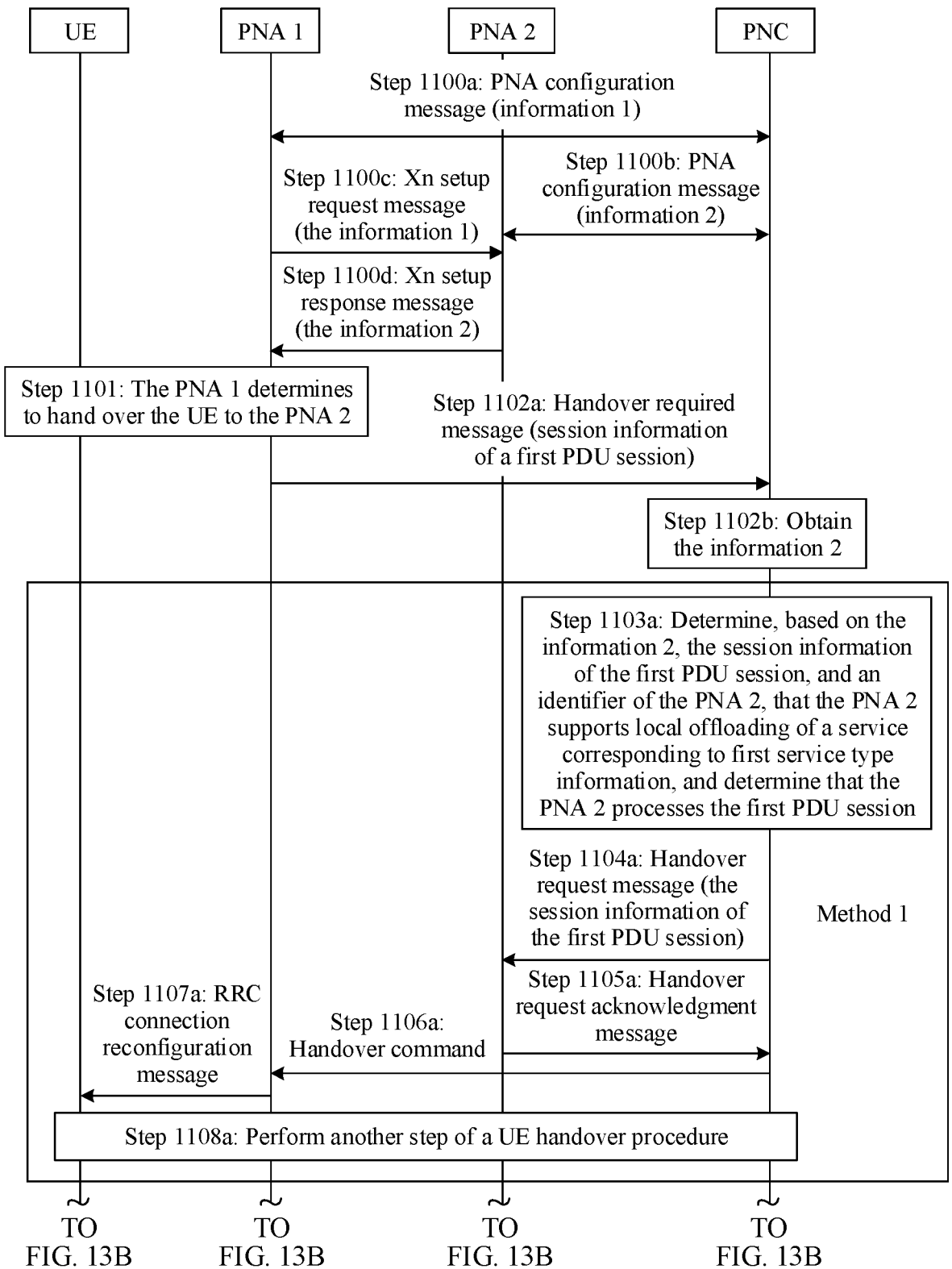
FIG. 13A and FIG. 13B are a schematic diagram of still another communication method according to an embodiment of this application.
Figure 13B:
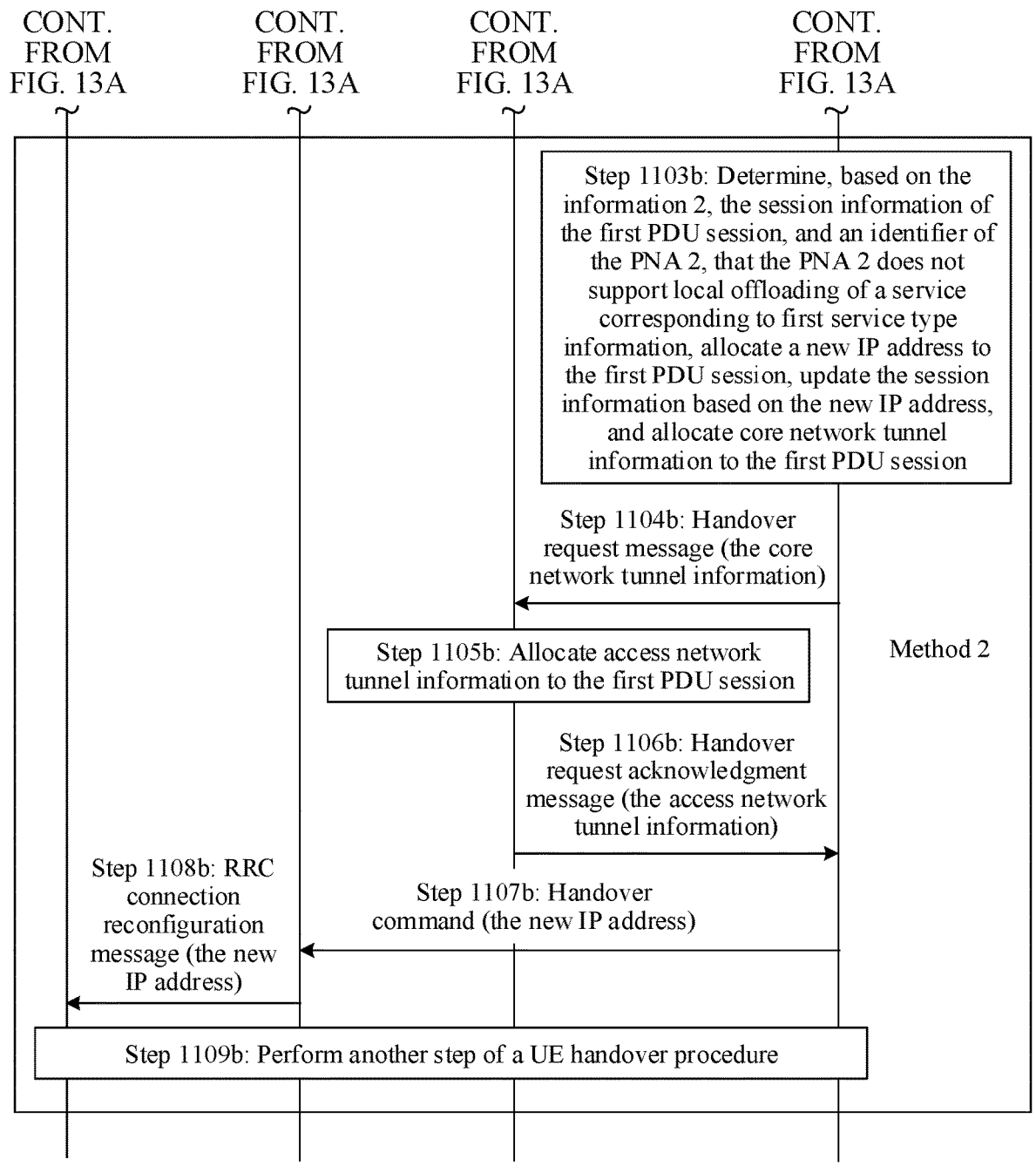

FIG. 13A and FIG. 13B are a schematic diagram of still another communication method according to an embodiment of this application. The method is applied to a scenario in which UE is handed over from a PNA 1 to a PNA 2. In the method shown in FIG. 13A and FIG. 13B, a PNC is equivalent to the first network element in FIG. 2. The method includes the following steps.

Step 1100*a* to step 1102*b* in FIG. 13A and FIG. 13B are the same as step 900*a* to step 902*b* in FIG. 11A and FIG. 11B. For related descriptions in step 1100*a* to step 1102*b*, refer to the descriptions in step 900*a* to step 902*b* in FIG. 11A and FIG. 11B. Details are not described herein again.

In this example, after obtaining session information of a first PDU session and information 2, the PNC may determine, based on the information 2 and the session information of the first PDU session, whether the PNA 2 supports local offloading of a service corresponding to first service type information. If the PNC determines that the PNA 2 supports the local offloading of the service corresponding to the first service type information, the PNC determines that the PNA 2 processes the first PDU session. This corresponds to a method 1 in FIG. 13A and FIG. 13B. Same steps are performed in a method 1 in FIG. 13A and FIG. 13B and the method 1 in FIG. 11A and FIG. 11B. For details, refer to the foregoing descriptions. On the contrary, if the PNC determines that the PNA 2 does not support the local offloading of the service corresponding to the first service type information, the PNC determines that the PNC processes the first PDU session. This corresponds to a method 2 in FIG. 13A and FIG. 13B. Refer to step 1103*b* to step 1109*b*.

The method 2 in this example is as follows.

Step 1103*b* to step 1106*b* are the same as step 1003*b* to step 1006*b*. For descriptions in step 1103*b* to step 1106*b*, refer to the foregoing descriptions in step 1003*b* to step 1006*b*.

Step 1107*b*: The PNC sends a handover command to the PNA 1, where the handover command includes a new IP address of the first PDU session. Optionally, the handover command may further include a first indication, and the first indication is used to indicate that the new IP address has been allocated to the first PDU session.

Step 1108*b*: The PNA 1 sends an RRC connection reconfiguration message to the UE, where the RRC connection reconfiguration message includes the new IP address of the first PDU session.

Step 1109*b*: Perform another step of a UE handover procedure. For example, the another step may include: sending, by the UE, an RRC connection reconfiguration complete message to the PNA 2. According to this method, the PNC may allocate the new IP address to the first PDU session, to avoid a case in which the first PDU session is unavailable because an old IP address is unavailable.

Figure 14:
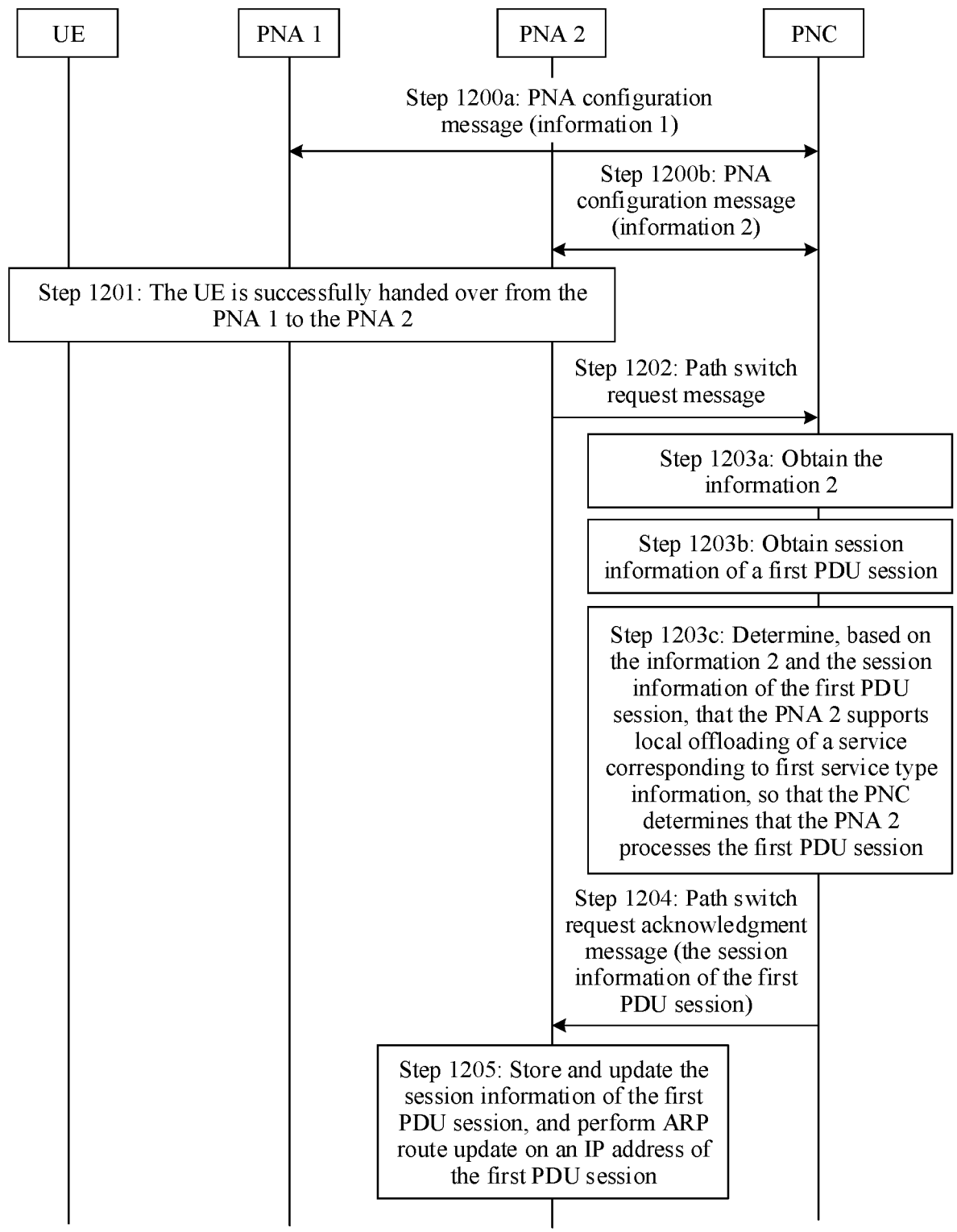
FIG. 14 is a schematic diagram of still another communication method according to an embodiment of this application.

FIG. 14 is a schematic diagram of still another communication method according to an embodiment of this application. The method is applied to a scenario in which UE is handed over from a PNA 1 to a PNA 2. In the method shown in FIG. 14, a PNC is equivalent to the first network element in FIG. 2. The method includes the following steps.

Optionally, the PNC may respectively configure information 1 and information 2 for the PNA 1 and the PNA 2 by using PNA configuration messages. For details, refer to step 1200*a* and step 1200*b*.

Step 1201: The UE is successfully handed over from the PNA 1 to the PNA 2.

Step 1202: The PNA 2 sends a path switch request message to the PNC, where the message may include an identifier of the PNA 2.

Step 1203*a*: The PNC obtains the information 2. For example, the predefined information 2 may be obtained locally, or the information 2 may be obtained from the PNA 2. This is not limited.

Step 1203*b*: The PNC obtains session information of a first PDU session, where the session information may include first service type information. In this example and the following examples, the first PDU session is a session managed and controlled by the PNC before the UE is handed over. That is, the first PDU session is a session locally routed from the PNC before the UE is handed over. A sequence of performing step 1203*a* and step 1203*b* is not limited. It should be noted that the session information of the first PDU session in this example and the following examples may be a whole set or a subset of context information of the first PDU session.

Step 1203*c*: The PNC determines, based on the information 2 and the session information of the first PDU session, that the PNA 2 supports local offloading of a service corresponding to the first service type information, the PNC determines that the PNA 2 process the first PDU session, and a data anchor of the first PDU session may be transferred to the PNA 2.

Step 1204: The PNC sends a path switch request acknowledgment (path switch request ack) message to the PNA 2, where the path switch request acknowledgment message includes the session information of the first PDU session. In this case, the session information may further include information other than the first service type information in the context information of the first PDU session in addition to the first service type information. For example, the information other than the first service type information may include one or more of a terminal identifier, a first session identifier, a QoS parameter, and an IP address.

Step 1205: The PNA 2 stores and updates the session information of the first PDU session, and performs ARP route update on the IP address of the first PDU session. For how to update the session information of the first PDU session, refer to the foregoing descriptions.

According to the foregoing method, in the scenario in which the UE is handed over from the PNA 1 to the PNA 2, when it is determined that the PNA 2 supports local offloading of a service corresponding to the first service type information of the first PDU session, the first PDU session may be handed over from the PNC to the PNA 2. In this way, that the PNA 2 processes the first PDU session can achieve an objective of offloading from the PNC. This can not only reduce an end-to-end latency of a data service, but also reduce network pressure.

Figure 15:
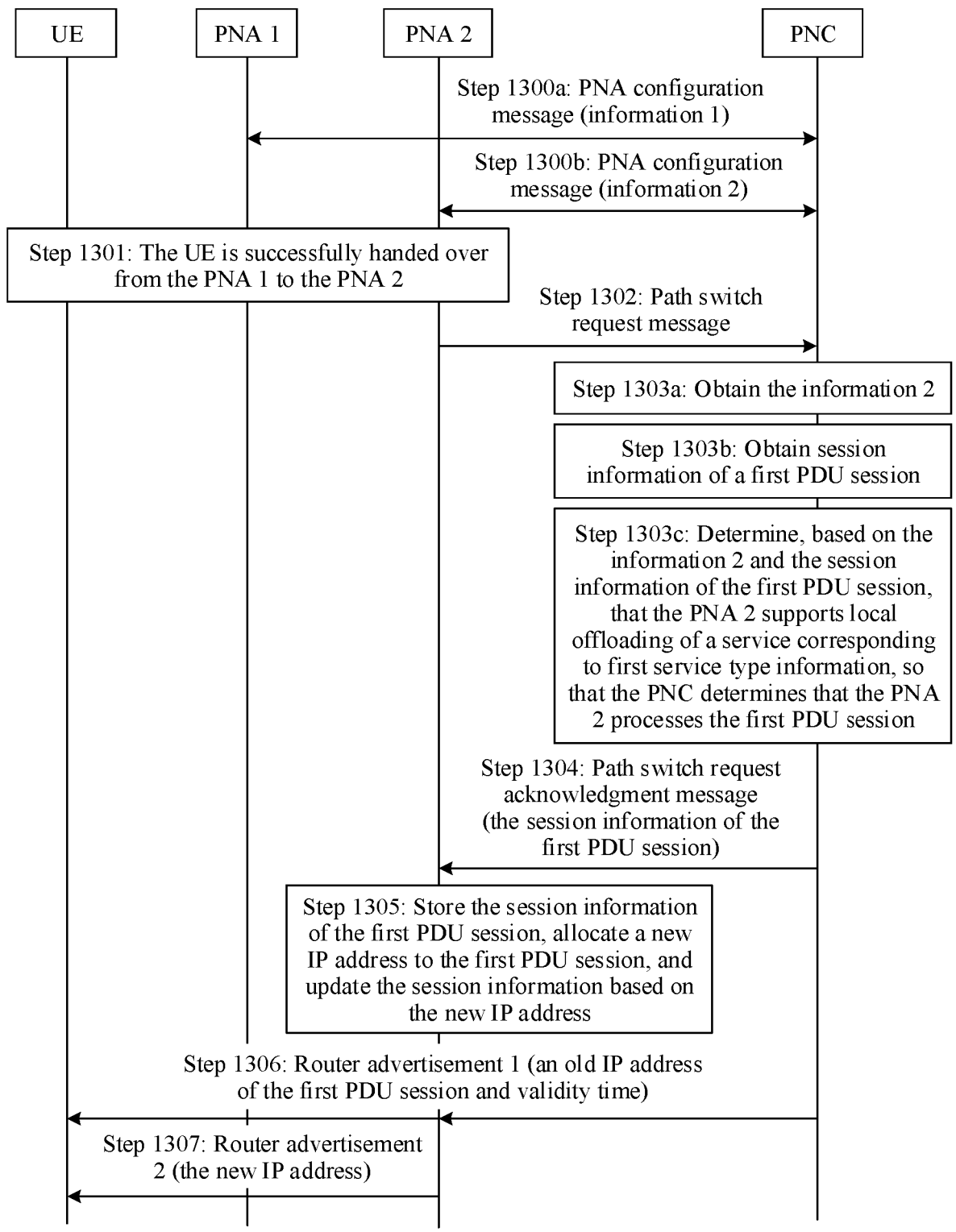
FIG. 15 is a schematic diagram of still another communication method according to an embodiment of this application.

FIG. 15 is a schematic diagram of still another communication method according to an embodiment of this application. The method is applied to a scenario in which UE is handed over from a PNA 1 to a PNA 2. In the method shown in FIG. 15, a PNC is equivalent to the first network element in FIG. 2. The method includes the following steps.

Step 1300*a* to step 1304 in FIG. 15 are the same as step 1200*a* to step 1204 in FIG. 14. For related descriptions in step 1300*a* to step 1304, refer to the descriptions in step 1200*a* to step 1204 in FIG. 14. Details are not described herein again.

The following describes how this example differs from the foregoing example.

Step 1305: The PNA 2 stores and updates session information of a first PDU session. For example, updating the session information includes updating an IP address of the first PDU session. For example, the PNA 2 may allocate anew IP address to the first PDU session, and update the session information based on the new IP address. For how to update the session information, refer to the foregoing descriptions.

Optionally, after allocating the new IP address to the first PDU session, the PNA 2 may further send a first indication to the PNC, where the first indication is used to indicate that the new IP address has been allocated to the first PDU session, so that the PNC sends validity time of an old IP address of the first PDU session to the UE accordingly. In this example and the following examples, the old IP address of the first PDU session is an IP address before the first PDU session is handed over.

Step 1306: The PNC sends a router advertisement 1 to the UE through the PNA 2, to notify the UE of the validity time of the old IP address of the first PDU session. For example, the PNC may send the router advertisement 1 to the PNA 2, where the router advertisement 1 carries the old IP address of the first PDU session and the validity time of the old IP address of the first PDU session. After receiving the router advertisement 1, the PNA 2 forwards the router advertisement 1 to the UE.

Step 1307: The PNA 2 sends a router advertisement 2 to the UE, where the router advertisement 2 carries the new IP address of the first PDU session, to notify the UE of the new IP address of the first PDU session.

According to the foregoing method, in the scenario in which the UE is handed over from the PNA 1 to the PNA 2, when it is determined that the PNA 2 supports local offloading of a service corresponding to first service type information of the first PDU session, the first PDU session may be handed over from the PNC to the PNA 2. In this way, that the PNA 2 processes the first PDU session can achieve an objective of offloading from the PNC. This can not only reduce an end-to-end latency of a data service, but also reduce network pressure. Further, the PNA 2 may allocate the new IP address to the first PDU session, to avoid a case in which the first PDU session is unavailable because the old IP address is unavailable.

Figure 16:
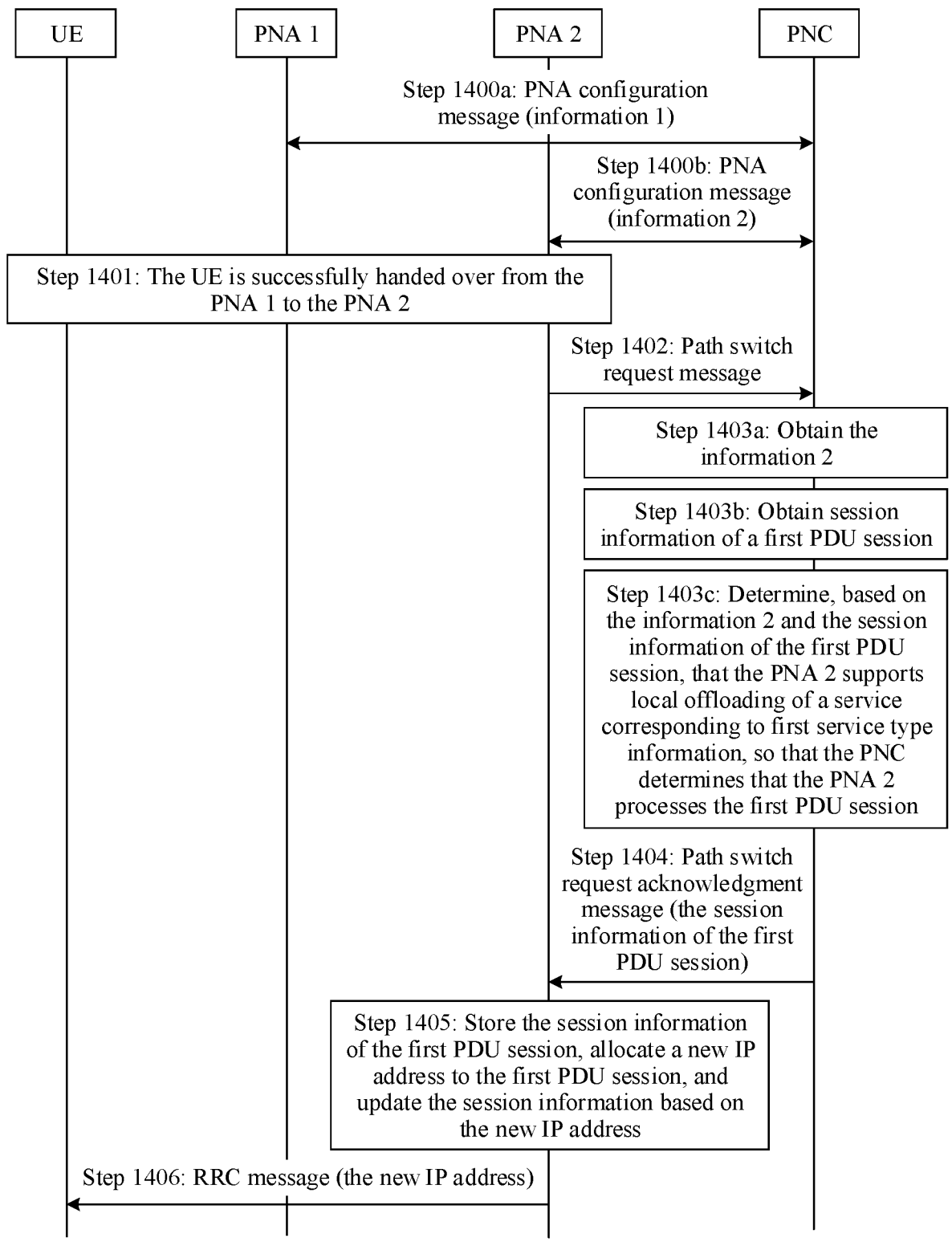
FIG. 16 is a schematic diagram of still another communication method according to an embodiment of this application.

FIG. 16 is a schematic diagram of still another communication method according to an embodiment of this application. The method is applied to a scenario in which UE is handed over from a PNA 1 to a PNA 2. In the method shown in FIG. 16, a PNC is equivalent to the first network element in FIG. 2. The method includes the following steps.

Step 1400*a* to step 1404 in FIG. 16 are the same as step 1200*a* to step 1204 in FIG. 14. For related descriptions in step 1400*a* to step 1404, refer to the descriptions in step 1200*a* to step 1204 in FIG. 14. Details are not described herein again. Step 1405 in FIG. 16 is the same as step 1305 in FIG. 15. For related descriptions in step 1405, refer to the descriptions in step 1305. Details are not described again.

The following describes how this example differs from the foregoing example.

Step 1406: The PNA 2 sends, to the UE by using an RRC message, a new IP address allocated to a first PDU session, to notify the UE of the new IP address of the first PDU session. In addition, the PNA 2 may send a first indication to the PNC, to indicate that the new IP address has been allocated to the first PDU session, so that the PNC sends validity time of an old IP of the first PDU session to the UE.

According to the foregoing method, in the scenario in which the UE is handed over from the PNA 1 to the PNA 2, when it is determined that the PNA 2 supports local offloading of a service corresponding to first service type information of the first PDU session, the first PDU session may be handed over from the PNC to the PNA 2. In this way, that the PNA 2 processes the first PDU session can achieve an objective of offloading from the PNC. This can not only reduce an end-to-end latency of a data service, but also reduce network pressure. Further, the PNA 2 may allocate the new IP address to the first PDU session, to avoid a case in which the first PDU session is unavailable because the old IP address is unavailable.

Figure 17A:
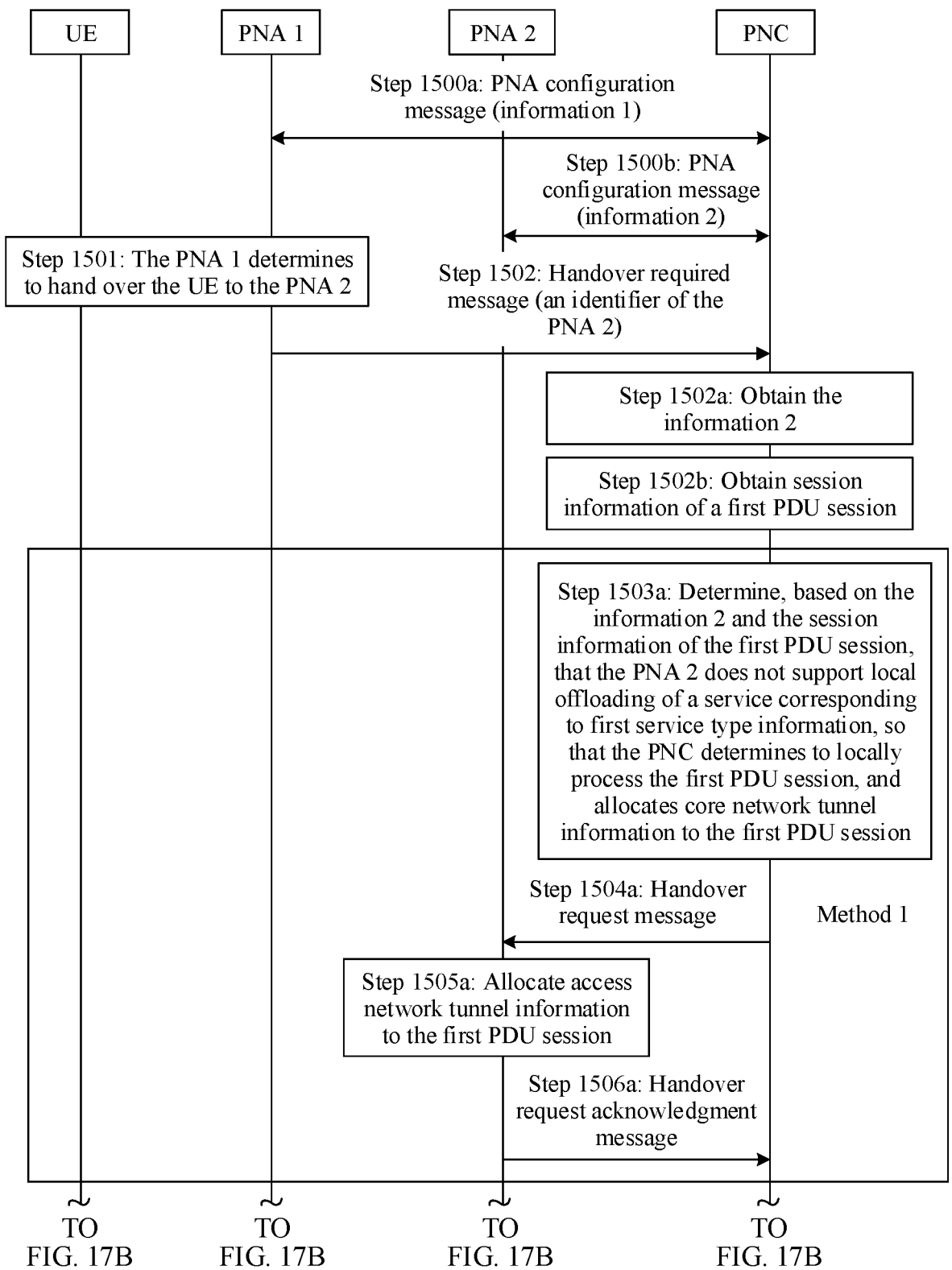
FIG. 17A and FIG. 17B are a schematic diagram of still another communication method according to an embodiment of this application.
Figure 17B:
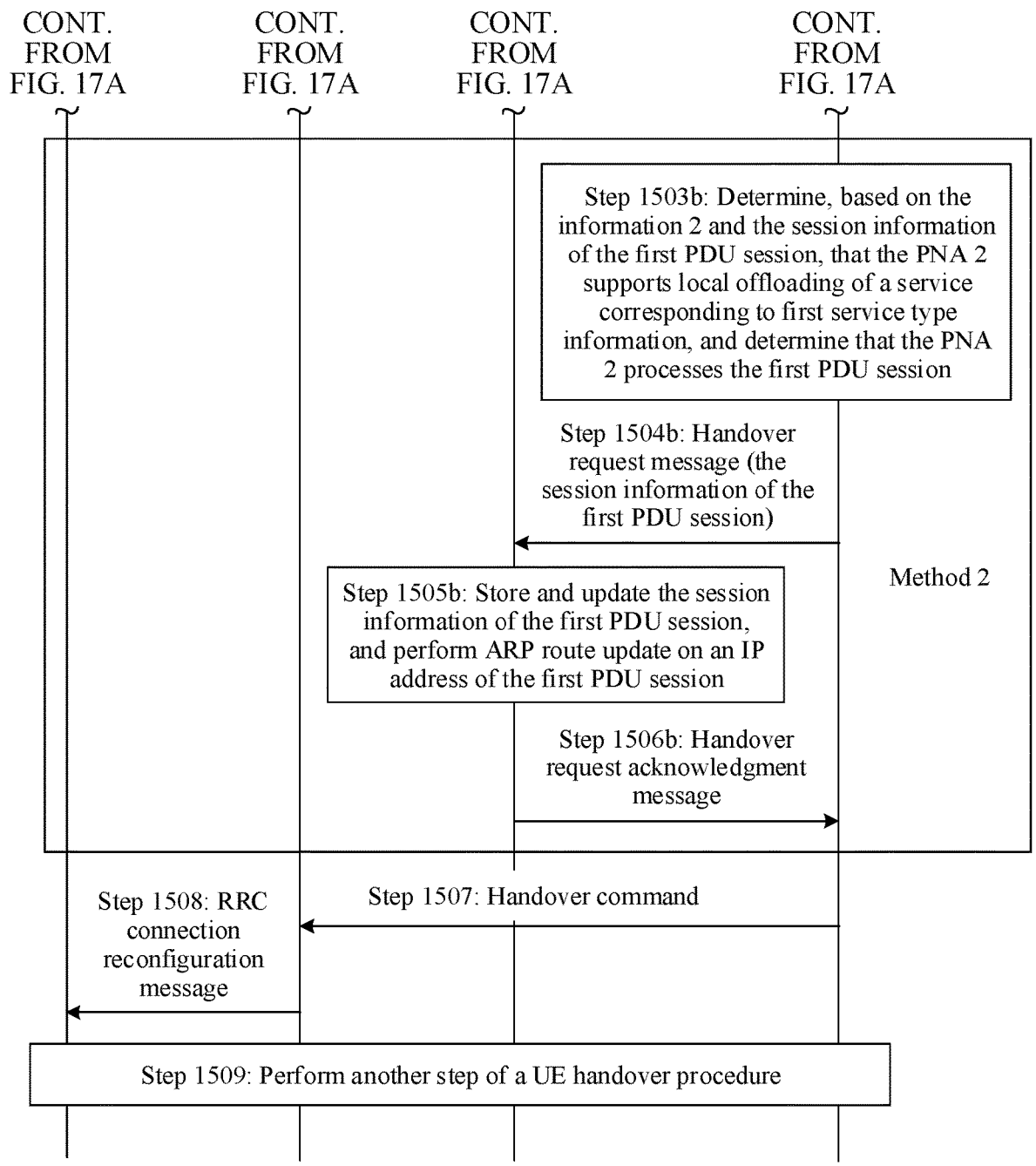

FIG. 17A and FIG. 17B are a schematic diagram of still another communication method according to an embodiment of this application. The method is applied to a scenario in which UE is handed over from a PNA 1 to a PNA 2. In the method shown in FIG. 17A and FIG. 17B, a PNC is equivalent to the first network element in FIG. 2. The method includes the following steps.

Step 1500*a* and step 1500*b* in FIG. 17A and FIG. 17B are the same as step 1200*a* and step 1200*b* in FIG. 14. For related descriptions in step 1500*a* and step 1500*b*, refer to the descriptions in step 1200*a* and step 1200*b*. Details are not described herein again.

The following describes how this example differs from the foregoing example.

Step 1501: The PNA 1 determines to hand over the UE to the PNA 2.

Step 1502: The PNA 1 sends a handover required message (N2 HO required) to the PNC, where the handover required message carries an identifier of the PNA 2.

Step 1502*a* and step 1502*b* in FIG. 17A and FIG. 17B are the same as step 1203*a* and step 1203*b* in FIG. 14. For descriptions in step 1502*a* and step 1502*b*, refer to the descriptions in step 1203*a* and step 1203*b*. Details are not described herein again.

In this example, after obtaining information 2 and session information of a first PDU session, the PNC may determine, based on the information 2 and the session information, whether the PNA 2 supports local offloading of a service corresponding to first service type information. If the PNA 2 does not support the local offloading of the service corresponding to the first service type information, the following method 1 is performed; or if the PNA 2 supports the local offloading of the service corresponding to the first service type information, the following method 2 is performed.

Method 1:

Step 1503*a*: The PNC determines, based on the information 2 and the session information of the first PDU session, that the PNA 2 does not support the local offloading of the service corresponding to the first service type information, and the PNC determines to locally process the first PDU session, and may allocate core network tunnel information to the first PDU session. For content included in the core network tunnel information, refer to the foregoing descriptions.

Step 1504*a*: The PNC sends a handover request message (N2 HO request) to the PNA 2, where the message may include the core network tunnel information.

Step 1505*a*: The PNA 2 allocates access network tunnel information to the first PDU session.

Step 1506*a*: The PNA 2 sends a handover request acknowledgment message (N2 HO request ack) to the PNC, where the message may include the access network tunnel information.

Method 2:

Step 1503*b*: The PNC determines, based on the information 2 and the session information of the first PDU session, that the PNA 2 supports the local offloading of the service corresponding to the first service type information, and determines that the PNA 2 processes the first PDU session.

Step 1504*b*: The PNC sends a handover request message (N2 HO request) to the PNA 2, where the handover request message includes the session information of the first PDU session. In this case, the session information may further include information other than the first service type information in context information of the first PDU session in addition to the first service type information. For example, the information other than the first service type information may include one or more of a terminal identifier, a first session identifier, a QoS parameter, and an IP address.

Step 1505*b*: The PNA 2 stores and updates the session information of the first PDU session, and performs ARP route update on the IP address of the first PDU session. For how to update the session information of the first PDU session, refer to the foregoing descriptions.

Step 1506*b*: The PNA 2 sends a handover request acknowledgment message (N2 HO request ack) to the PNC.

In this example, the following steps are applicable to both the method 1 and the method 2.

Step 1507: The PNC sends a handover command to the PNA 1.

Step 1508: The PNA 1 sends an RRC connection reconfiguration message to the UE.

Step 1509: Perform another step of a UE handover procedure.

Figure 18A:
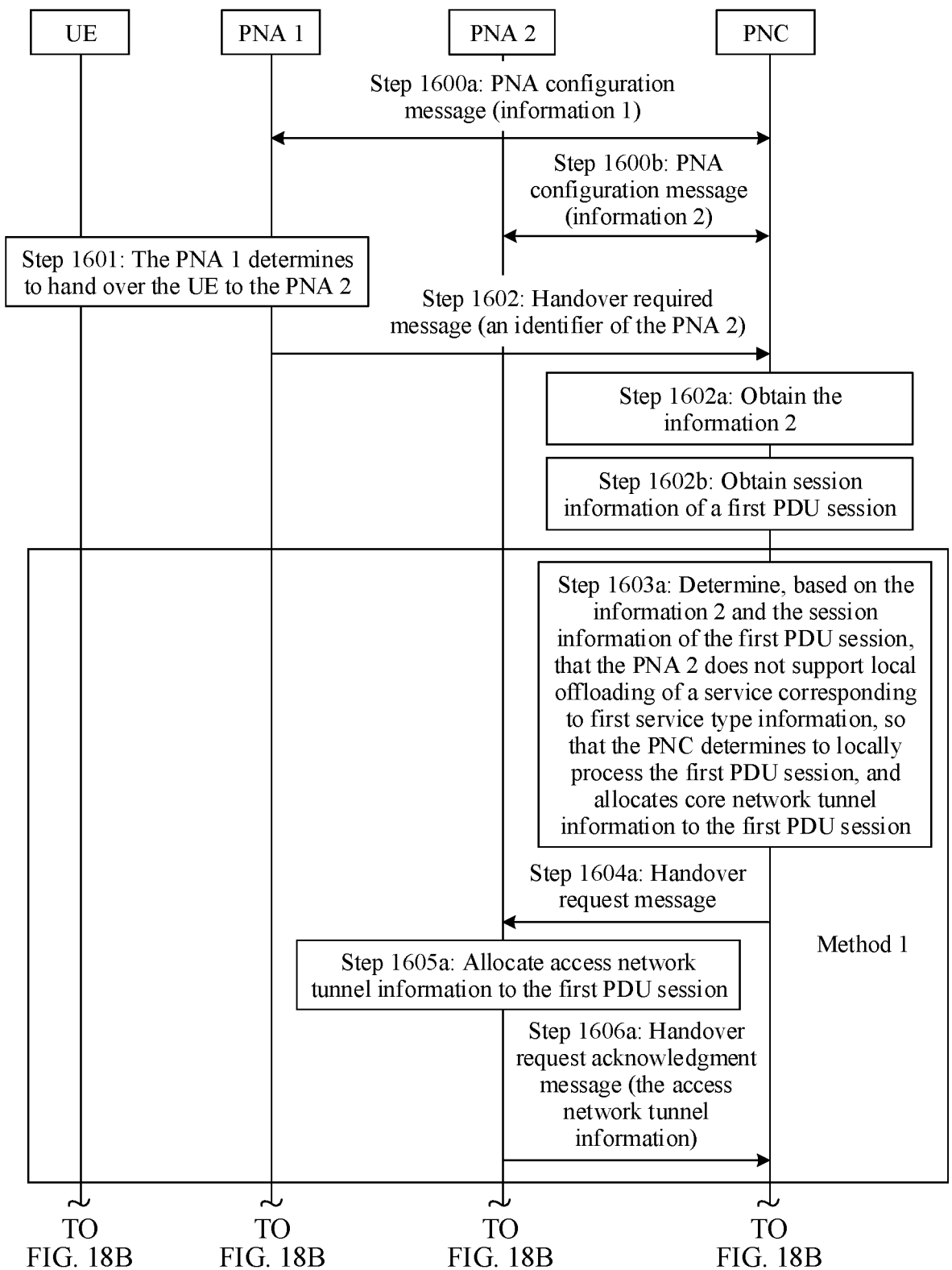
FIG. 18A and FIG. 18B are a schematic diagram of still another communication method according to an embodiment of this application.
Figure 18B:
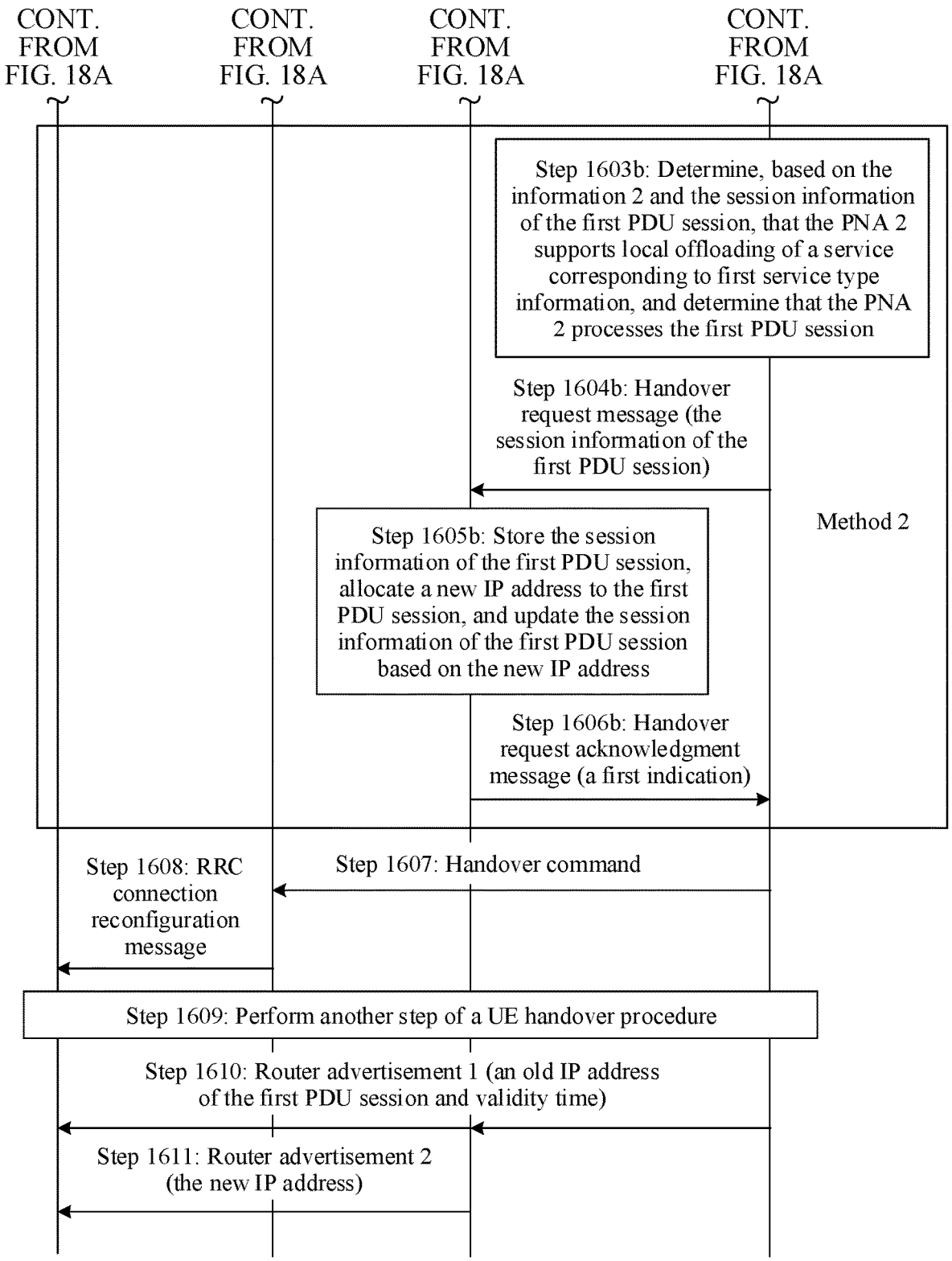

FIG. 18A and FIG. 18B are a schematic diagram of still another communication method according to an embodiment of this application. The method is applied to a scenario in which UE is handed over from a PNA 1 to a PNA 2. In the method shown in FIG. 18A and FIG. 18B, a PNC is equivalent to the first network element in FIG. 2. The method includes the following steps.

Step 1600*a* and step 1600*b* in FIG. 18A and FIG. 18B are the same as step 1200*a* and step 1200*b* in FIG. 14. For related descriptions in step 1600*a* and step 1600*b*, refer to the descriptions in step 1200*a* and step 1200*b*. Details are not described herein again. Step 1601 to step 1602*b* in FIG. 18A and FIG. 18B are the same as step 1501 to step 1502*b* in FIG. 17A and FIG. 17B. Steps performed in a method 1 in FIG. 18A and FIG. 18B and the method 1 in FIG. 17A and FIG. 17B are the same. For details, refer to the related descriptions in FIG. 17A and FIG. 17B. Details are not described again.

The following describes how this example differs from the foregoing example.

Method 2:

Step 1603*b* and step 1604*b* are the same as step 1503*b* and step 1504*b*. For descriptions in step 1603*b* and step 1604*b*, refer to the descriptions in step 1503*b* and step 1504*b*.

Step 1605*b*: The PNA 2 stores session information of a first PDU session, allocates a new IP address to the first PDU session, and updates the session information of the first PDU session based on the new IP address.

Step 1606*b*: The PNA 2 sends a handover request acknowledgment message (N2 HO request ack) to the PNC. Optionally, the message may include a first indication, and the first indication is used to indicate that the new IP address has been allocated to the first PDU session.

In this example, the following steps are applicable to both the method 1 and the method 2.

Step 1607: The PNC sends a handover command to the PNA 1.

Step 1608: The PNA 1 sends an RRC connection reconfiguration message to the UE.

Step 1609: Perform another step of a UE handover procedure. For example, the another step may include: sending, by the UE, an RRC connection reconfiguration complete message to the PNA 2. After the another step of the UE handover procedure is performed, the UE accesses the PNA 2.

Step 1610: The PNC sends a router advertisement 1 to the UE through the PNA 2, to notify the UE of validity time of an old IP address of the first PDU session. For example, the PNC may send the router advertisement 1 to the PNA 2, where the router advertisement 1 carries the old IP address of the first PDU session and the validity time of the old IP address of the first PDU session. After receiving the router advertisement 1, the PNA 2 forwards the router advertisement 1 to the UE.

Step 1611: The PNA 2 sends a router advertisement 2 to the UE, where the router advertisement 2 carries the new IP address of the first PDU session, to notify the UE of the new IP address of the first PDU session.

Figure 19A:
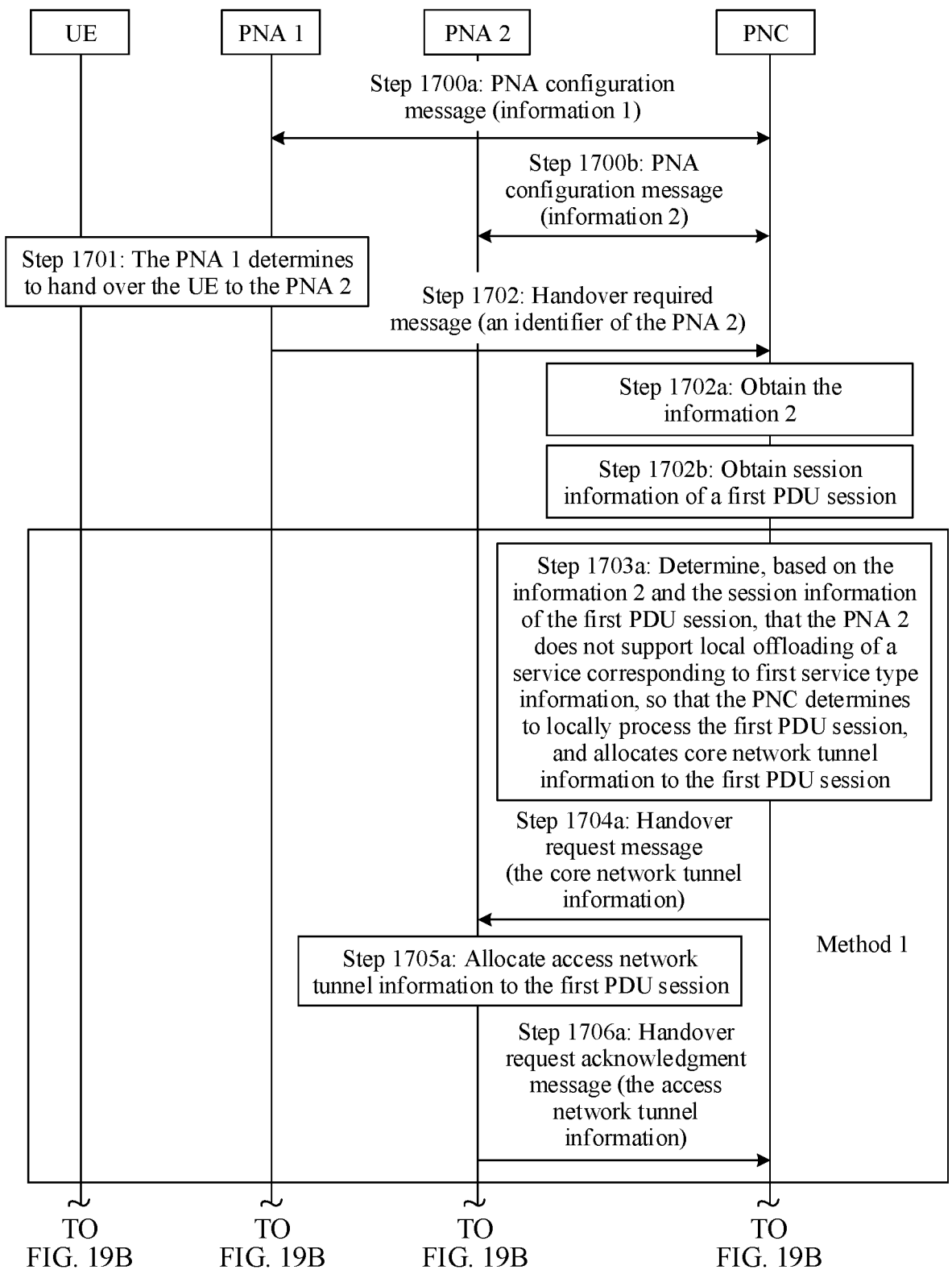
FIG. 19A and FIG. 19B are a schematic diagram of still another communication method according to an embodiment of this application.
Figure 19B:
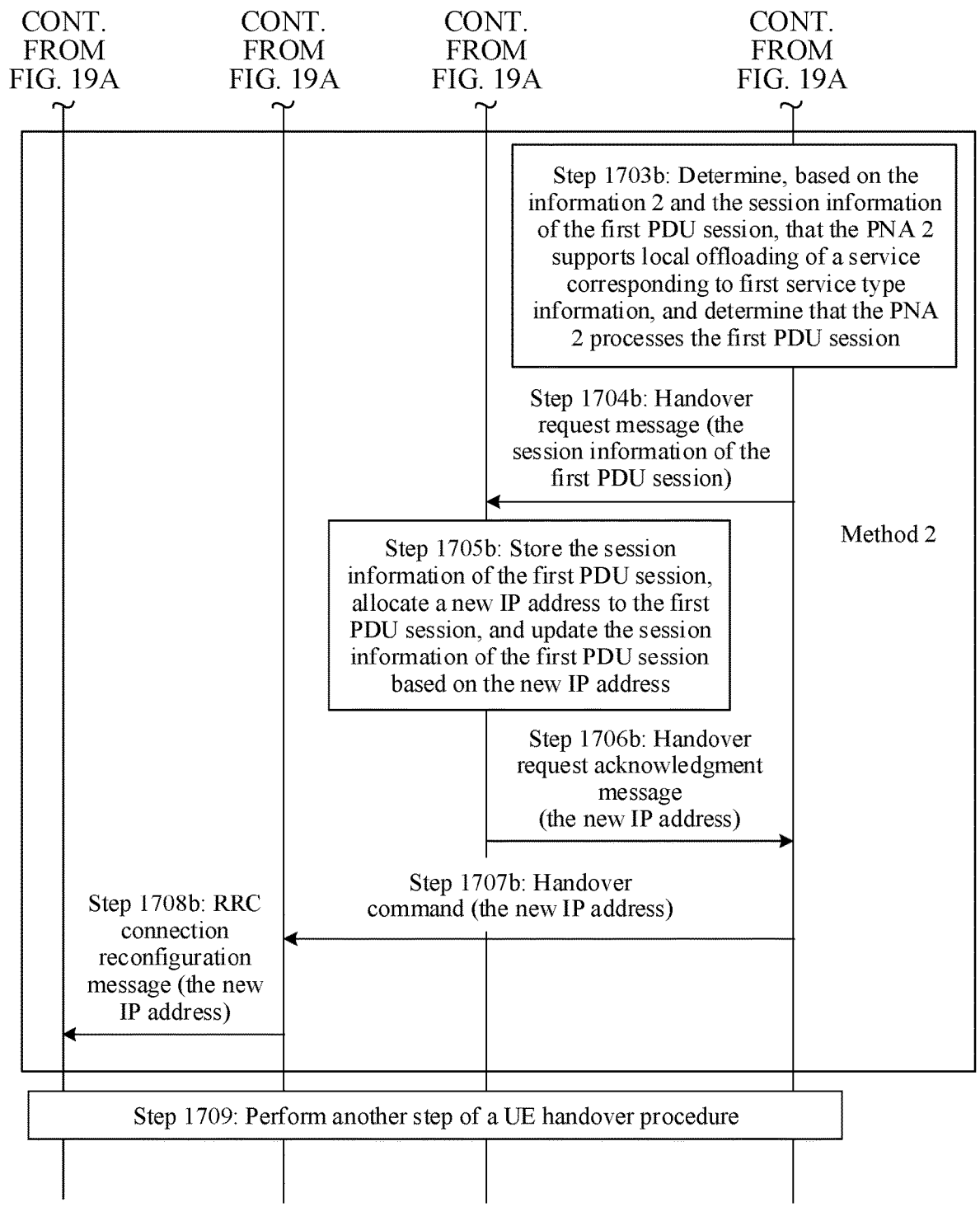

FIG. 19A and FIG. 19B are a schematic diagram of still another communication method according to an embodiment of this application. The method is applied to a scenario in which UE is handed over from a PNA 1 to a PNA 2. In the method shown in FIG. 19A and FIG. 19B, a PNC is equivalent to the first network element in FIG. 2. The method includes the following steps.

Step 1700*a* and step 1700*b* in FIG. 19A and FIG. 19B are the same as step 1200*a* and step 1200*b* in FIG. 14. For related descriptions in step 1700*a* and step 1700*b*, refer to the descriptions in step 1200*a* and step 1200*b*. Details are not described herein again. Step 1701 to step 1702*b* in FIG. 19A and FIG. 19B are the same as step 1501 to step 1502*b* in FIG. 17A and FIG. 17B. Steps performed in a method 1 in FIG. 19A and FIG. 19B and the method 1 in FIG. 17A and FIG. 17B are the same. For details, refer to the related descriptions in FIG. 17A and FIG. 17B. Details are not described again.

The following describes how this example differs from the foregoing example.

Method 2:

Step 1703*b* and step 1704*b* are the same as step 1503*b* and step 1504*b*. For descriptions in step 1703*b* and step 1704*b*, refer to the descriptions in step 1503*b* and step 1504*b*. Step 1705*b* is the same as step 1605*b*. For details, refer to the descriptions in step 1605*b*.

Step 1706*b*: The PNA 2 sends a handover request acknowledgment message to the PNC, where the handover request acknowledgment message includes a new IP address of the first PDU session. Optionally, the PNA 2 may carry a first indication in the handover request acknowledgment message sent to the PNC, and the first indication is used to indicate that the new IP address has been allocated to the first PDU session.

Step 1707*b*: The PNC sends a handover command to the PNA 1, where the handover command includes the new IP address of the first PDU session.

Step 1708*b*: The PNA 1 sends an RRC connection reconfiguration message to the UE, where the RRC connection reconfiguration message includes the new IP address of the first PDU session.

In this example, step 1709 may be further performed for the method 1 and the method 2.

Step 1709: Perform another step of a UE handover procedure. For example, the another step may include: sending, by the UE, an RRC connection reconfiguration complete message to the PNA 2.

The foregoing mainly describes the solutions provided in the embodiments of this application from a perspective of interaction between the target access network element, the source access network element, and the core network element. It may be understood that, to implement the foregoing functions, the source access network element, the target access network element, and the core network element include corresponding hardware structures and/or software modules for performing the functions. With reference to the units and algorithm steps of the examples described in the embodiments disclosed in this application, the embodiments of this application can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation falls beyond the scope of the technical solutions in the embodiments of this application.

In the embodiments of this application, the target access network element, the source access network element, and the core network element may be divided into function units based on the foregoing method examples. For example, each function unit may be obtained through division based on each corresponding function, or two or more functions may be integrated into one processing unit. The integrated unit may be implemented in a form of hardware, or may be implemented in a form of a software function unit.

Based on a same inventive concept, the embodiments of this application further provide an apparatus configured to implement any one of the foregoing methods. For example, an apparatus is provided, and includes units (or means) configured to implement the steps performed by the target access network element in any one of the foregoing methods. For another example, another apparatus is further provided, and includes units (or means) configured to implement the steps performed by the source access network element in any one of the foregoing methods. For another example, another apparatus is further provided, and includes units (or means) configured to implement the steps performed by the core network element in any one of the foregoing methods.

Figure 20:
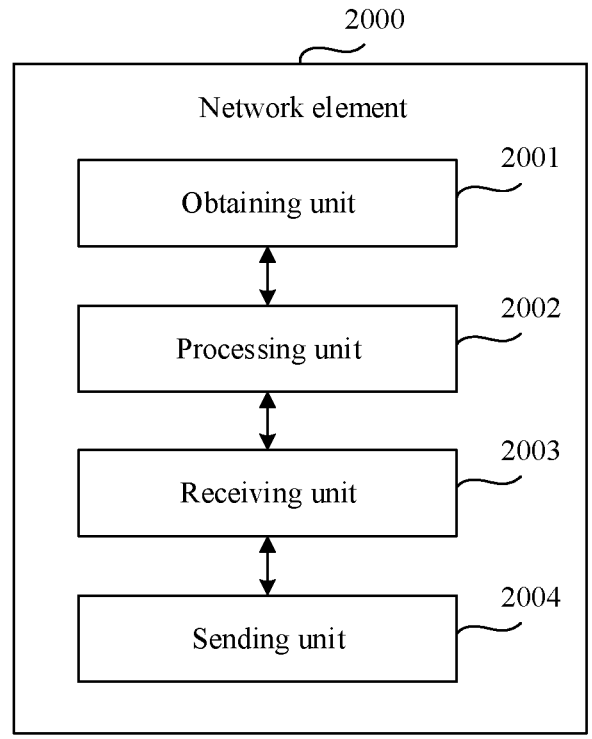
FIG. 20 is a schematic diagram of a structure of a network element according to an embodiment of this application.

An embodiment of this application provides a network element 2000. FIG. 20 is a schematic diagram of a structure of a network element 2000 according to an embodiment of this application. Refer to FIG. 20, the network element 2000 may include an obtaining unit 2001 and a processing unit 2002. During implementation, the network element 2000 may further include a receiving unit 2003 and a sending unit 2004.

The network element 2000 may be applied to a first network element, and the first network element may be used in a scenario in which a terminal is handed over from a source access network element to a target access network element.

In a possible implementation, the obtaining unit 2001 may be configured to perform step S101 and step 102 in FIG. 2 in the foregoing method example. The processing unit 2002 may be configured to perform step S103 in FIG. 2 in the foregoing method example. The following describes scenarios and designs that are based on this implementation.

In a first possible scenario, the network element 2000 is the target access network element, and the first session is a session managed and controlled by the source access network element before the terminal is handed over. The following designs are based on this scenario.

In a possible design, the receiving unit 2003 may be configured to receive the session information from the source access network element or a core network element.

In a possible design, the obtaining unit 2001 may be further configured to obtain the preconfigured first information locally.

In a possible design, the receiving unit 2003 may be further configured to receive the first information from the core network element.

In a possible design, after determining that the target access network element processes the first session, the processing unit 2002 may be further configured to update the session information of the first session. For example, the processing unit 2002 may be configured to allocate a new IP address to the first session, and update the session information based on the new IP address. The sending unit 2004 may be configured to notify the source access network element, the terminal, or the core network element of the new IP address.

In a possible design, the sending unit 2004 may be further configured to send a first indication to the source access network element, where the first indication is used to indicate that the new IP address has been allocated to the first session.

In a possible design, the processing unit 2002 may be further configured to perform ARP route update on an IP address of the first session.

In a second possible scenario, the network element 2000 is a core network element, and the first session is a session managed and controlled by the source access network element before the terminal is handed over. The following designs are based on this scenario.

In a possible design, the receiving unit 2003 may be configured to receive the session information from the source access network element.

In a possible design, the sending unit 2004 may be configured to send the session information to the target access network element after the processing unit 2002 determines that the target access network element processes the first session.

In a third possible scenario, the network element 2000 is the source access network element, and the first session is a session managed and controlled by the source access network element before the terminal is handed over. The following design is based on this scenario.

In a possible design, the sending unit 2004 may be configured to send the session information to the target access network element after the processing unit 2002 determines that the target access network element processes the first session.

In a fourth possible scenario, the network element 2000 is a core network element, and the first session is a session managed and controlled by the core network element before the terminal is handed over. The following designs are based on this scenario.

In a possible design, the sending unit 2004 may be configured to send the session information to the target access network element after the processing unit 2002 determines that the target access network element processes the first session.

In a possible design, the receiving unit 2003 may be configured to receive a path switch request from the target access network element. Based on this design, the sending unit 2004 may send the session information to the target access network element in the following manner: The sending unit 2004 sends a path switch request acknowledgment message to the target access network element, where the path switch request acknowledgment message includes the session information.

In a possible design, the receiving unit 2003 may be further configured to receive a handover required message from the source access network element, where the handover required message includes an identifier of the target access network element, and the handover required message is used to request to hand over the terminal to the target access network element. Based on this design, the sending unit 2004 may send the session information to the target access network element in the following manner: The sending unit 2004 sends a handover request message to the target access network element, where the handover request message includes the session information.

The following designs are based on the second possible scenario to the fourth possible scenario.

In a possible design, the obtaining unit 2001 may be configured to obtain the preconfigured first information locally.

In a possible design, the receiving unit 2003 may be configured to receive the first information from the target access network element.

In a possible design, the receiving unit 2003 may be further configured to receive the new IP address of the first session from the target access network element. The sending unit 2004 may be configured to send the new IP address of the first session to the terminal.

In a possible design, the receiving unit 2003 may be further configured to receive the first indication from the target access network element, where the first indication is used to indicate that the new IP address has been allocated to the first session. The sending unit 2004 may be further configured to send validity time of an old IP address of the first session to the terminal according to the first indication.

The following designs are based on the first possible scenario to the fourth possible scenario.

In a possible design, the first information and the first service type information each may include at least one piece of the following service type identification information: NSSAI, a DNN, or an App-ID.

In a possible design, the first information further includes a local support indication, and the local support indication is used to indicate that the target access network element supports local offloading of a service corresponding to the service type identification information.

In a possible design, the processing unit 2002 may determine, based on the first information and the session information in the following manner, that the target access network element supports local offloading of the service corresponding to the first service type information: if the first service type information matches the service type information that is of the local offloading supported by the target access network element and that is indicated by the first information, determining that the target access network element supports the local offloading of the service corresponding to the first service type information, and further determining that the target access network element processes the first session.

In a possible design, the first information and the first service type information each include the NSSAI and the DNN. Based on this design, the processing unit 2002 may determine, in the following manner, that the target access network element processes the first session: if the NSSAI and the DNN that are included in the first service type information respectively match the NSSAI and the DNN that are included in the first information, determining that the target access network element supports the local offloading of the service corresponding to the first service type information, and further determining that the target access network element processes the first session.

In a possible design, the first information and the first service type information each include the NSSAI, the DNN, and the APP ID. Based on this design, the processing unit 2002 may determine, in the following manner, that the target access network element processes the first session: if the NSSAI, the DNN, and the APP ID that are included in the first service type information respectively match the NSSAI, the DNN, and the APP ID that are included in the first information, determining that the target access network element supports the local offloading of the service corresponding to the first service type information, and further determining that the target access network element processes the first session.

In another possible implementation, the obtaining unit 2001 may be configured to perform steps such as step S101 and step 102 in FIG. 2 in the foregoing method example. The processing unit 2002 may be configured to perform step S104 in FIG. 2 in the foregoing method example. The following describes scenarios and designs that are based on this implementation.

In a first possible scenario, the network element 2000 is the target access network element, and the first session is a session managed and controlled by the source access network element before the terminal is handed over. The following designs are based on this scenario.

In a possible design, the receiving unit 2003 may be configured to receive the session information from the source access network element.

In a possible design, the sending unit 2004 may be configured to send the session information and access network tunnel information of the first session to the core network element after the processing unit 2002 determines that the core network element processes the first session.

In a possible design, the receiving unit 2003 may be further configured to receive core network tunnel information of the first session from the core network element.

In a possible design, the obtaining unit 2001 may be configured to obtain the preconfigured first information locally.

In a possible design, the receiving unit 2003 may be further configured to receive the first information from the core network element.

In a second possible scenario, the network element 2000 is the core network element, and the first session is a session managed and controlled by the source access network element before the terminal is handed over. The following designs are based on this scenario.

In a possible design, the receiving unit 2003 may be configured to receive the session information from the source access network element.

In a possible design, the processing unit 2002 may be further configured to update the session information. For example, the processing unit 2002 may update the session information in the following manner: allocating a new IP address to the first session, and updating the session information based on the new IP address. The sending unit 2004 may be configured to send the new IP address to the source access network element or the terminal.

In a possible design, the sending unit 2004 may be further configured to send a first indication to the source access network element, where the first indication is used to indicate that the new IP address has been allocated to the first session.

In a possible design, the processing unit 2002 may be further configured to perform ARP route update on an IP address of the first session.

In a possible design, the sending unit 2004 may be further configured to send core network tunnel information of the first session to the target access network element after the processing unit 2002 determines that the core network element processes the first session.

In a possible design, the receiving unit 2003 may be further configured to receive access network tunnel information of the first session from the target access network element.

In a third possible scenario, the network element 2000 is the source access network element, and the first session is a session managed and controlled by the source access network element before the terminal is handed over. The following design is based on this scenario.

In a possible design, the sending unit 2004 may be configured to send the session information to the core network element after the processing unit 2002 determines that the core network element processes the first session.

The following designs are based on the second possible scenario and the third possible scenario.

In a possible design, the obtaining unit 2001 may be further configured to obtain the preconfigured first information locally.

In a possible design, the receiving unit 2003 may be configured to receive the first information from the target access network element.

The following designs are based on the first possible scenario and the third possible scenario.

In a possible design, the receiving unit 2003 may be configured to receive the new IP address of the first session from the core network element. The sending unit 2004 may be configured to send the new IP address of the first session to the terminal.

In a possible design, the receiving unit 2003 may be configured to receive the first indication from the core network element, where the first indication is used to indicate that the new IP address has been allocated to the first session. The sending unit 2004 may be configured to send validity time of an old IP address of the first session to the terminal according to the first indication.

The following designs are based on the first possible scenario to the third possible scenario.

In a possible design, the first information and the first service type information each may include at least one piece of the following service type identification information: NSSAI, a DNN, or an App ID.

In a possible design, the first information further includes a local support indication, and the local support indication is used to indicate that the target access network element supports local offloading of a service corresponding to the service type identification information.

In a possible design, the processing unit 2002 may determine, based on the first information and the session information in the following manner, that the target access network element does not support the local offloading of the service corresponding to the first service type information: if the first service type information does not match the service type information that is of the local offloading supported by the target access network element and that is indicated by the first information, determining that the target access network element does not support the local offloading of the service corresponding to the first service type information, and further determining that the core network element processes the first session.

In a possible design, the first information and the first service type information each include the NSSAI and the DNN. Based on this design, the processing unit 2002 may determine, in the following manner, that the core network element processes the first session: if the NSSAI and the DNN that are included in the first service type information do not match the NSSAI and the DNN that are included in the first information, determining that the target access network element does not support the local offloading of the service corresponding to the first service type information, and further determining that the core network element processes the first session.

In a possible design, the first information and the first service type information each include the NSSAI, the DNN, and the APP ID. Based on this design, the processing unit 2002 may determine, in the following manner, that the core network element processes the first session: if the NSSAI, the DNN, and the APP ID that are included in the first service type information do not match the NSSAI, the DNN, and the APP ID that are included in the first information, determining that the target access network element does not support the local offloading of the service corresponding to the first service type information, and further determining that the core network element processes the first session.

In still another possible implementation, the network element 2000 is the target access network element. The receiving unit 2003 may be configured to receive session information of a first session of the terminal from the first network element, where the session information includes first service type information, and the target access network element supports local offloading of a service corresponding to the first service type information. The processing unit 2002 may be configured to update the session information. The following describes scenarios and designs that are based on this implementation.

In a possible design, the first network element is a core network element, and the first session is a session managed and controlled by the source access network element before the terminal is handed over.

In a possible design, the first network element is the source access network element, and the first session is a session managed and controlled by the source access network element before the terminal is handed over.

In a possible design, the first network element is a core network element, and the first session is a session managed and controlled by the core network element before the terminal is handed over.

In a possible design, the processing unit 2002 may be further configured to allocate a new IP address to the first session, and update the session information based on the new IP address. The sending unit 2004 may be configured to send the new IP address to the first network element or the terminal.

In a possible design, the sending unit 2004 may be further configured to send a first indication to the first network element, where the first indication is used to indicate that the new IP address has been allocated to the first session, so that the first network element sends validity time of an old IP address of the first session to the terminal according to the first indication.

In a possible design, the processing unit 2002 may be further configured to perform ARP route update on an IP address of the first session.

In a possible design, the sending unit 2004 may be further configured to send a path switch request to the core network element. Based on this design, the receiving unit 2003 may receive the session information of the first session from the first network element in the following manner: receiving a path switch request acknowledgment message from the core network element, where the path switch request acknowledgment message includes the session information.

In a possible design, the receiving unit 2003 may receive the session information of the first session from the first network element in the following manner: receiving a handover request message from the core network element, where the handover request message includes the session information.

In still another possible implementation, the network element 2000 is a core network element. The receiving unit 2003 may be configured to receive session information of a first session of the terminal and access network tunnel information of the first session from the target access network element, where the session information includes first service type information, the first session is a session managed and controlled by the source access network element before the terminal is handed over, and the target access network element does not support local offloading of a service corresponding to the first service type information. The sending unit 2004 may be configured to send core network tunnel information of the first session to the target access network element.

In still another possible implementation, the network element 2000 is the target access network element. The receiving unit 2003 may be configured to receive core network tunnel information of a first session of the terminal from a core network element, where the first session is a session managed and controlled by the source access network element before the terminal is handed over, session information of the first session includes first service type information, and the target access network element does not support local offloading of a service corresponding to the first service type information. The sending unit 2004 may be configured to send access network tunnel information of the first session to the core network element.

In still another possible implementation, the network element 2000 is a core network element. The receiving unit 2003 may be configured to receive session information of a first session of the terminal from the source access network element, where the session information includes first service type information, the first session is a session managed and controlled by the source access network element before the terminal is handed over, and the target access network element does not support local offloading of a service corresponding to the first service type information. The processing unit 2002 may be configured to update the session information. The following describes possible designs that are based on this implementation.

In a possible design, the processing unit 2002 may be configured to allocate a new IP address to the first session, and update the session information based on the new IP address. The sending unit 2004 may be configured to send the new IP address to the source access network element or the terminal.

In a possible design, the sending unit 2004 may be further configured to send a first indication to the source access network element, where the first indication is used to indicate that the new IP address has been allocated to the first session, so that the source access network element sends validity time of an old IP address of the first session to the terminal according to the first indication.

In a possible design, the processing unit 2002 may be further configured to perform ARP route update on an IP address of the first session.

It should be understood that division into the units in the apparatuses is merely logical function division. During actual implementation, all or some of the units may be integrated into one physical entity or may be physically separated. In addition, all the units in the apparatuses may be implemented in a form of software invoked by a processing element, or may be implemented in a form of hardware; or some units may be implemented in a form of software invoked by a processing element, and some units may be implemented in a form of hardware. For example, each unit may be a separately disposed processing element, or may be integrated into a chip of the apparatus for implementation. Alternatively, each unit may be stored in the memory in a form of a program to be invoked by a processing element of the apparatus to perform a function of the unit. In addition, all or some of the units may be integrated together, or may be implemented independently. The processing element herein may also be referred to as a processor, and may be an integrated circuit having a signal processing capability. In an implementation process, the steps in the foregoing methods or the foregoing units may be implemented by using a hardware integrated logic circuit of the processor element, or may be implemented in a form of software invoked by the processing element.

In an example, a unit in any one of the foregoing apparatuses may be one or more integrated circuits configured to implement the foregoing methods, for example, one or more application specific integrated circuits (ASIC), one or more microprocessors (DSP), one or more field programmable gate arrays (FPGA), or a combination of at least two of the integrated circuit forms. For another example, when a unit in the apparatus may be implemented by a program scheduled by a processing element, the processing element may be a general purpose processor, for example, a central processing unit (CPU) or another processor that can invoke the program. For another example, the units may be integrated and implemented in a form of a system-on-a-chip (SOC).

The foregoing receiving unit is an interface circuit of the apparatus, and is configured to receive a signal from another apparatus. For example, when the apparatus is implemented in a form of a chip, the receiving unit is an interface circuit that is of the chip and that is configured to receive a signal from another chip or apparatus. The foregoing sending unit is an interface circuit of the apparatus, and is configured to send a signal to another apparatus. For example, when the apparatus is implemented in a form of a chip, the sending unit is an interface circuit that is of the chip and that is configured to send a signal to another chip or apparatus.

Figure 21:
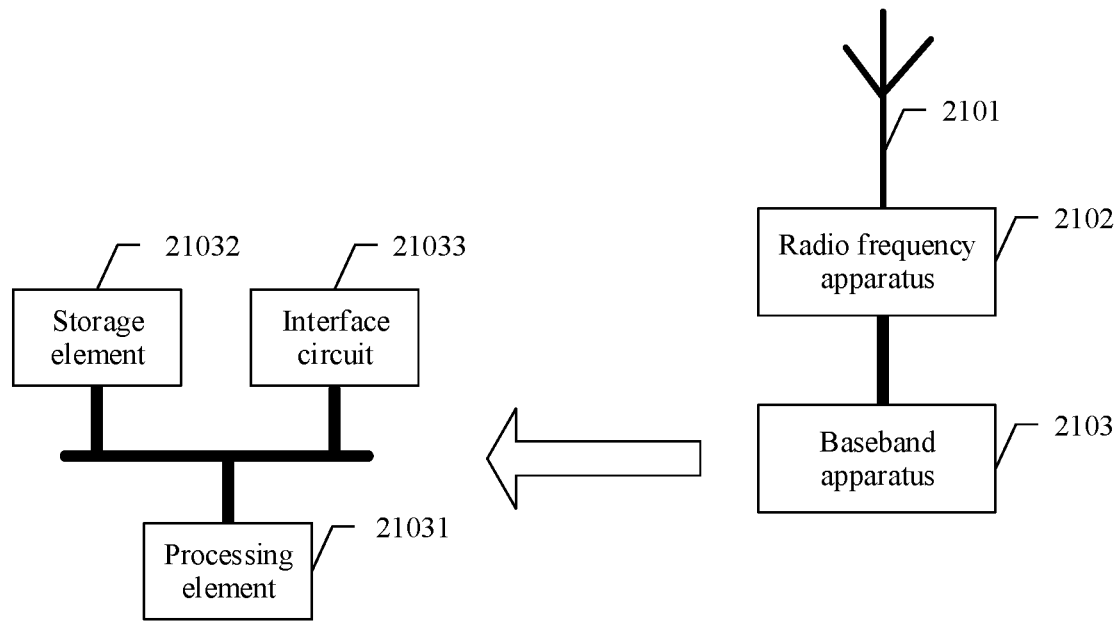
FIG. 21 is a schematic diagram of a structure of an access network element according to an embodiment of this application.

FIG. 21 is a schematic diagram of a structure of an access network element according to an embodiment of this application. The access network element is configured to implement operations of the source access network element or the target access network element in the foregoing embodiments. As shown in FIG. 21, the access network element includes an antenna 2101, a radio frequency apparatus 2102, and a baseband apparatus 2103. The antenna 2101 is connected to the radio frequency apparatus 2102. In an uplink direction, the radio frequency apparatus 2102 receives, by using the antenna 2101, information sent by a terminal, and sends, to the baseband apparatus 2103 for processing, the information sent by the terminal. In a downlink direction, the baseband apparatus 2103 processes information about the terminal, and sends the information to the radio frequency apparatus 2102. The radio frequency apparatus 2102 processes the information about the terminal, and then sends the processed information to the terminal by using the antenna 2101.

The baseband apparatus 2103 may include one or more processing elements 21031, for example, include a main control CPU and another integrated circuit. In addition, the baseband apparatus 2103 may further include a storage element 21032 and an interface circuit 21033. The storage element 21032 is configured to store a program and data. The interface circuit 21033 is configured to exchange information with the radio frequency apparatus 2102, and the interface circuit is, for example, a common public radio interface (CPRI). The foregoing apparatus used in the access network element may be located on the baseband apparatus 2103. For example, the foregoing apparatus used in the access network element may be a chip on the baseband apparatus 2103. The chip includes at least one processing element and an interface circuit. The processing element is configured to perform the steps in any method performed by the access network element. The interface circuit is configured to communicate with another apparatus. In an implementation, units of the access network element that implement the steps in the foregoing methods may be implemented by a processing element scheduling a program. For example, the apparatus used in the access network element includes a processing element and a storage element. The processing element invokes a program stored in the storage element, to perform the methods performed by the access network element in the foregoing method embodiments. The storage element may be a storage element located on a same chip as the processing element, that is, an on-chip storage element, or may be a storage element located on a different chip from the processing element, that is, an off-chip storage element.

In another implementation, units of the apparatus used in the access network element that implement the steps in the foregoing methods may be configured as one or more processing elements. These processing elements are disposed on the baseband apparatus. The processing element herein may be an integrated circuit, for example, one or more ASICs, one or more DSPs, one or more FPGAs, or a combination of these types of integrated circuits. The integrated circuits may be integrated together to form a chip.

Units of the access network element that implement the steps in the foregoing methods may be integrated together, and are implemented in a form of a system-on-a-chip (SOC). For example, the baseband apparatus includes the SOC chip, configured to implement the foregoing methods. At least one processing element and a storage element may be integrated into the chip, and the processing element invokes a program stored in the storage element to implement the foregoing methods performed by the access network element. Alternatively, at least one integrated circuit may be integrated into the chip, to implement the foregoing methods performed by the access network element. Alternatively, with reference to the foregoing implementations, functions of some units may be implemented by a processing element invoking a program, and functions of some units may be implemented by an integrated circuit.

It can be learned that the foregoing apparatus used in the access network element may include at least one processing element and an interface circuit. The at least one processing element is configured to perform any method performed by the access network element provided in the foregoing method embodiments. The processing element may perform some or all steps performed by the access network element, in a first manner, to be specific, by invoking the program stored in the storage element; or may perform some or all steps performed by the access network element, in a second manner, to be specific, by using a hardware integrated logic circuit in the processor element in combination with instructions; or may certainly perform, by combining the first manner and the second manner, some or all steps performed by the access network element.

As described above, the processing element herein may be a general purpose processor, for example, a CPU, or may be one or more integrated circuits configured to implement the foregoing methods, for example, one or more ASICs, one or more microprocessors DSPs, one or more FPGAs, or a combination of at least two of the integrated circuit forms.

The storage element may be one memory, or may be a general term of a plurality of storage elements.

Figure 22:
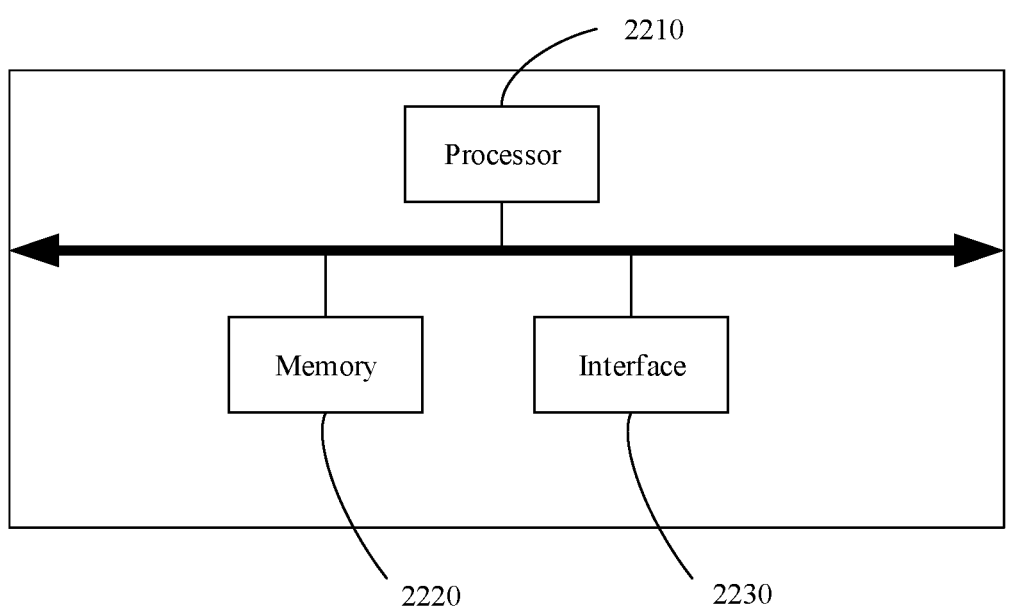
FIG. 22 is a schematic diagram of a structure of a core network element according to an embodiment of this application.

FIG. 22 is a schematic diagram of a structure of a core network element according to an embodiment of this application. The core network element may be the core network element in the foregoing embodiments, and is configured to implement operations of the core network element in the foregoing embodiments. As shown in FIG. 22, the core network element includes a processor 2210 and an interface 2230. There may be a plurality of processors 2210. The processor 2210 may perform operations of the processing unit 2002 when the network element 2000 is a core network element, and the interface 2230 may perform operations of the receiving unit 2003 and/or the sending unit 2004 when the network element 2000 is the core network element. Optionally, the core network element may further include a memory 2220, and the memory 2220 is configured to store a program and data. The processor 2210 may be an integrated circuit having a signal processing capability, for example, a CPU. Alternatively, functions of the foregoing units may be implemented by one or more integrated circuits configured to implement the foregoing methods, for example, one or more ASICs, one or more microprocessors DSPs, one or more FPGAs, or a combination of at least two of the integrated circuits. Alternatively, the foregoing implementations may be combined.

Based on a same concept as the foregoing method embodiment, an embodiment of this application further provides a computer-readable storage medium, storing some instructions. When these instructions are invoked and executed by a computer, the computer may be enabled to complete the method in any one of the foregoing method embodiments or the possible designs of the foregoing method embodiments. In this embodiment of this application, the computer-readable storage medium is not limited. For example, the computer-readable storage medium may be a random-access memory (RAM) or a read-only memory (ROM).

Based on a same concept as the foregoing method embodiment, this application further provides a computer program product. When being invoked and executed by a computer, the computer program product can complete the method in any one of the foregoing method embodiments and the possible designs of the foregoing method embodiments.

Based on a same concept as the foregoing method embodiment, this application further provides a chip. The chip is coupled to a transceiver, and is configured to complete the method in any one of the foregoing method embodiments and the possible implementations of the foregoing method embodiments. "Coupling" means that two components are directly or indirectly combined with each other. The combination may be fixed or movable, and the combination may allow communication of fluid, electricity, an electrical signal, or another type of signal between the two parts.

All or some of the foregoing embodiments may be implemented by using software, hardware, firmware, or any combination thereof. When the software is used to implement the embodiments, all or a part of the embodiments may be implemented in a form of a computer program product. The computer program product includes one or more computer instructions. When the computer program instructions are loaded and executed on a computer, the procedure or functions according to the embodiments of the present disclosure are completely or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The various illustrative logical units and circuits described in the embodiments of this application may implement or operate the described functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors with a digital signal processor core, or any other similar configuration.

The steps of the methods or algorithms described in the embodiments of this application may be implemented by directly embedded hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may be connected to the processor, so that the processor can read information from the storage medium and write information to the storage medium. Optionally, the storage medium may alternatively be integrated into a processor. The processor and the storage medium may be disposed in the ASIC, and the ASIC may be disposed in a terminal device. Optionally, the processor and the storage medium may alternatively be disposed in different components of the terminal device.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

Although the present disclosure is described with reference to specific features and the embodiments thereof, various modifications and combinations may be made to them without departing from the spirit and scope of the present disclosure. Correspondingly, the specification and accompanying drawings are merely example descriptions of the present disclosure defined by the appended claims, and are considered as any of or all modifications, variations, combinations or equivalents that cover the scope of the present disclosure. A person skilled in the art can make various modifications and variations to the present disclosure without departing from the spirit and scope of the present disclosure. The present disclosure is intended to cover these modifications and variations of the present

What is claimed is:

1. A communication method, applied to a scenario in which a terminal is handed over from a source access network element to a target access network element, and comprising:
　　obtaining, by a first network element, session information of a first session of the terminal, wherein the session information comprises first service type information;
　　obtaining, by the first network element, first information, wherein the first information indicates service type information of local offloading supported by the target access network element; and
　　determining, based on the first information and the session information, that the target access network element supports local offloading of a service corresponding to the first service type information, and determining, by the first network element, that the target access network element processes the first session.

2. A communication method, applied to a scenario in which a terminal is handed over from a source access network element to a target access network element, and comprising:
　　obtaining, by a first network element, session information of a first session of the terminal, wherein the session information comprises first service type information;
　　obtaining, by the first network element, first information, wherein the first information indicates service type information of local offloading supported by the target access network element; and
　　determining, based on the first information and the session information, that the target access network element does not support local offloading of a service corresponding to the first service type information, and determining, by the first network element, that a core network element processes the first session.

3. The method according to claim 1, wherein the first network element is the target access network element, and the first session is a session managed and controlled by the source access network element before the terminal is handed over.

4. The method according to claim 3, wherein that the target access network element obtains the session information of the first session of the terminal comprises:
　　receiving, by the target access network element, the session information from the source access network element or a core network element.

5. The method according to claim 3, wherein after the target access network element determines that the target access network element processes the first session, the method further comprises:
　　updating, by the target access network element, the session information of the first session.

6. The method according to claim 5, wherein the updating, by the target access network element, the session information of the first session comprises:
　　allocating, by the target access network element, a new internet protocol (IP) address to the first session, and updating the session information based on the new IP address; and
　　sending, by the target access network element, the new IP address to the source access network element, the terminal, or a core network element.

7. The method according to claim 6, wherein the method further comprises:
　　sending, by the target access network element, a first indication to the source access network element, wherein the first indication indicates that the new IP address has been allocated to the first session.

8. The method according to claim 3, wherein the method further comprises:
　　performing, by the target access network element, address resolution protocol (ARP) route update on an IP address of the first session.

9. The method according to claim 3, wherein the method further comprises:
　　determining, based on the first information and the session information, that the target access network element does not support the local offloading of the service corresponding to the first service type information, and determining, by the target access network element, that a core network element processes the first session; and
　　sending, by the target access network element, the session information and access network tunnel information of the first session to the core network element.

10. The method according to claim 1, wherein the first network element is a core network element, and the first session is a session managed and controlled by the source access network element before the terminal is handed over.

11. The method according to claim 10, wherein that the core network element obtains the session information of the first session of the terminal comprises:
　　receiving, by the core network element, the session information from the source access network element.

12. The method according to claim 1, wherein the first network element is a core network element, and the first session is a session managed and controlled by the core network element before the terminal is handed over.

13. The method according to claim 12, wherein after the core network element determines that the target access network element processes the first session, the method further comprises:
　　sending, by the core network element, the session information to the target access network element.

14. The method according to claim 10, wherein the method further comprises:
　　receiving, by the core network element, a new internet protocol (IP) address of the first session from the target access network element; and
　　sending, by the core network element, the new IP address of the first session to the terminal.

15. The method according to claim 14, wherein the method further comprises:
　　receiving, by the core network element, a first indication from the target access network element, wherein the first indication indicates that the new IP address has been allocated to the first session; and
　　sending, by the core network element, validity time of an old IP address of the first session to the terminal according to the first indication.

16. The method according to claim 2, wherein the method further comprises:
　　receiving, by the first network element, a new internet protocol (IP) address of the first session from the core network element; and
　　sending, by the first network element, the new IP address of the first session to the terminal.

17. The method according to claim 1, wherein the first information and the first service type information each comprise at least one piece of the following service type identification information:
- network slice selection assistance information (NSSAI);
- a data network name (DNN); or
- an application identifier (App ID).

18. The method according to claim 17, wherein the first information further comprises a local support indication, and the local support indication indicates that the target access network element supports local offloading of a service corresponding to the service type identification information.

19. The method according to claim 17, wherein the determining, based on the first information and the session information, that the target access network element supports local offloading of a service corresponding to the first service type information comprises:
- in response to the first service type information matching the service type information that is of the local offloading supported by the target access network element and that is indicated by the first information, determining, by the first network element, that the target access network element supports the local offloading of the service corresponding to the first service type information, and determining, by the first network element, that the target access network element processes the first session.

20. A communication apparatus, wherein the apparatus is used in a target access network element, applied in a scenario in which a terminal is handed over from a source access network element to the target access network element, and comprises a processor, wherein the processor is configured to:
- obtain session information of a first session of the terminal, wherein the session information comprises first service type information;
- obtain first information, wherein the first information indicates service type information of local offloading supported by the target access network element; and
- determine based on the first information and the session information, that the target access network element does not support local offloading of a service corresponding to the first service type information, and determine that a core network element processes the first session.

* * * * *